(12) United States Patent
Nurishi

(10) Patent No.: US 6,995,920 B2
(45) Date of Patent: Feb. 7, 2006

(54) ANAMORPHIC CONVERTER

(75) Inventor: Ryuji Nurishi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/815,203

(22) Filed: Mar. 30, 2004

(65) Prior Publication Data

US 2004/0196570 A1    Oct. 7, 2004

(30) Foreign Application Priority Data

Apr. 4, 2003  (JP)  ............................. 2003-101657
Apr. 9, 2003  (JP)  ............................. 2003-105210

(51) Int. Cl.
  *B02B 13/08*   (2006.01)
  *B02B 13/12*   (2006.01)
  *B02B 15/02*   (2006.01)
(52) U.S. Cl. .................... 359/668; 359/670; 359/675
(58) Field of Classification Search ................ 359/668, 359/670, 675
See application file for complete search history.

(56) References Cited

U.S. PATENT DOCUMENTS 3,990,785 A    11/1976   Hirose
5,648,871 A *  7/1997   Okuyama et al. ........... 359/557
5,668,666 A    9/1997   Suzuki

FOREIGN PATENT DOCUMENTS

GB    873824    7/1961
GB    885151    12/1961

* cited by examiner

Primary Examiner—Scott J. Sugarman
(74) Attorney, Agent, or Firm—Morgan & Finnegan, LLP

(57) ABSTRACT

To obtain an anamorphic converter of the rear converter system which is especially most suitable for a converter for the cinema and excellent in optical performance, and in which an effective image surface of an imaging optical system can be sufficiently utilized. The anamorphic converter includes at least an anamorphic lens disposed on an image side of an imaging optical system, and in the anamorphic converter, when a focal length conversion magnification in an arbitrary cross section X containing an optical axis of the anamorphic converter is assigned $\beta x$, a focal length conversion magnification in a cross section Y containing an optical axis and being perpendicular to the cross section X is assigned $\beta y$, an aspect ratio of an image pickup range in an image surface of the imaging optical system is assigned AR1, and an aspect ratio of an effective area of image pickup means is assigned AR2, the following relationship is established:

$$0.9 < (AR1 \times \beta x)/(AR2 \times \beta y) < 1.1.$$

36 Claims, 34 Drawing Sheets

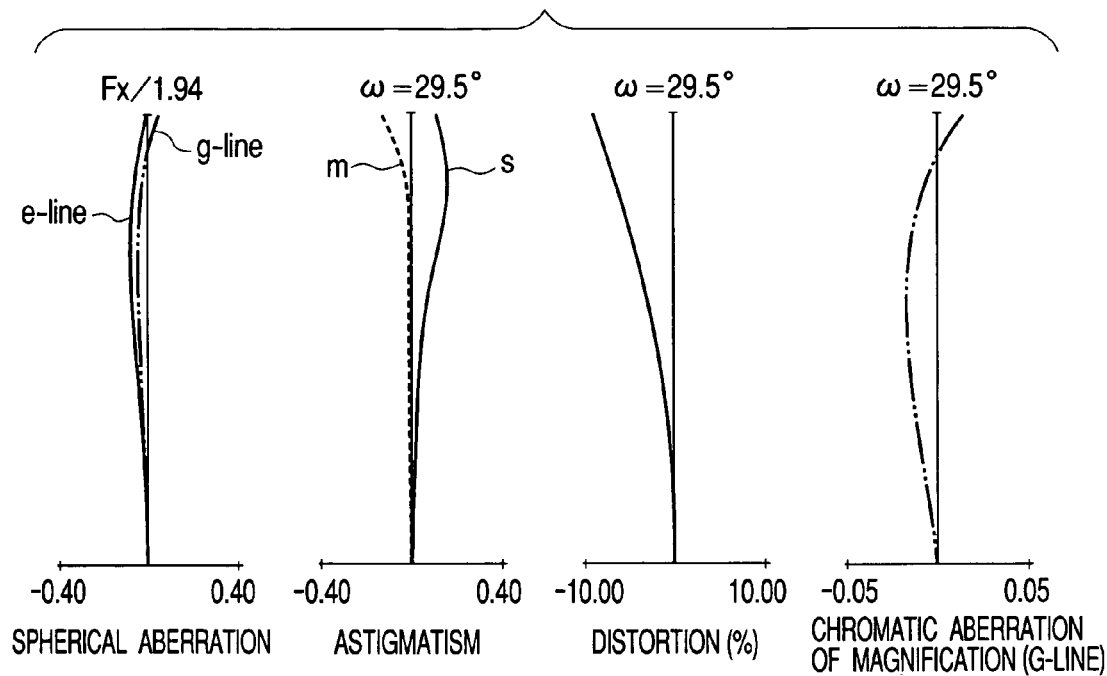
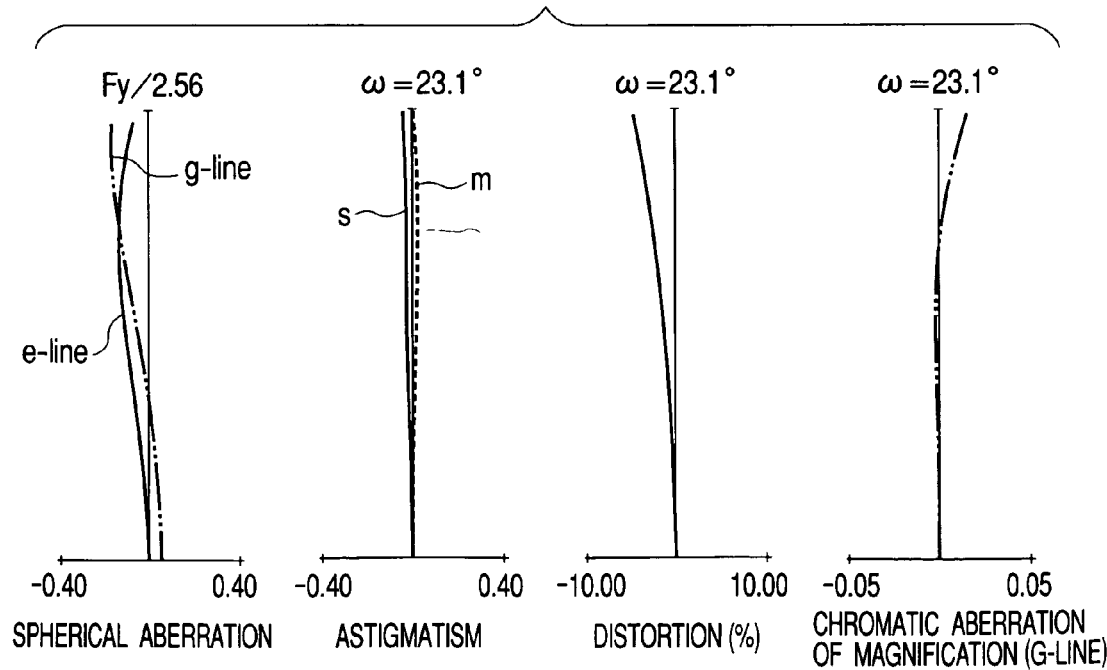

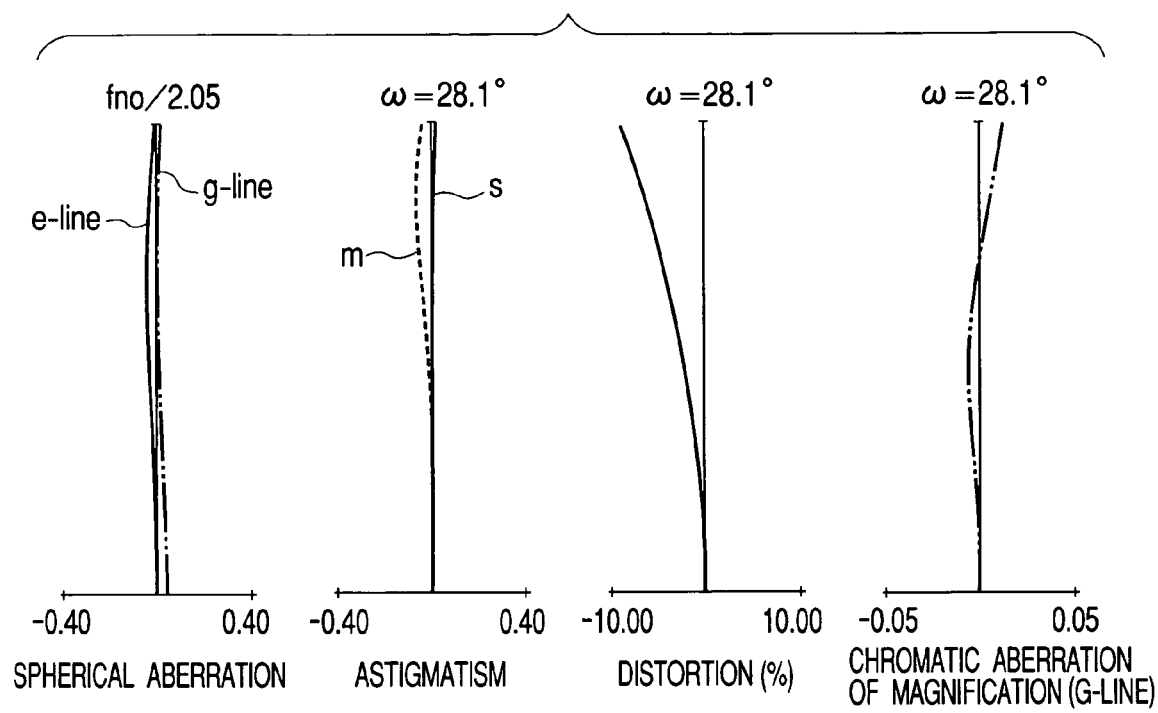
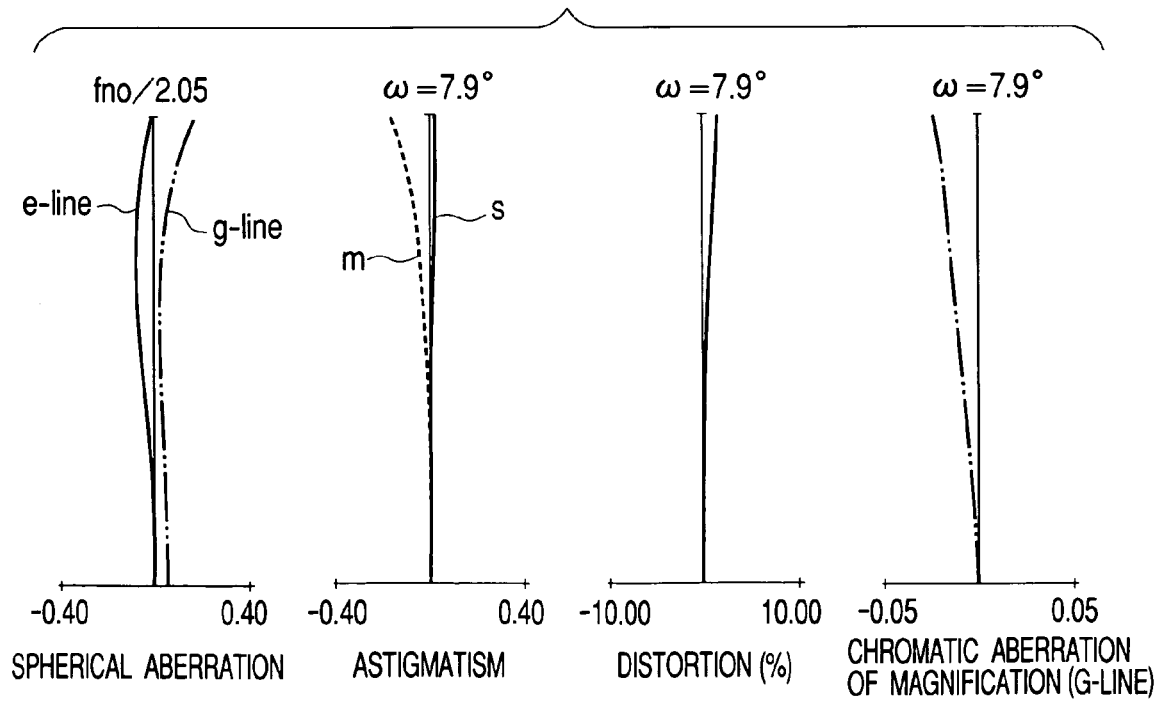

ANAMORPHIC CONVERTER

BACKGROUND OF THE INVENTION

1. Field of the Invention

The present invention relates to an anamorphic converter suitable for a film camera, a television camera, a video camera or the like which is disposed on an image side of an imaging optical system in order to convert an aspect ratio to photograph an image having an aspect ratio different from that of an image pickup element, a lens device using the same, and an image pickup device such as a film camera, a television camera, or a video camera using the same.

2. Related Background Art

As a technique for converting an aspect ratio of an image to record and reproduce the resultant image, up to this time, various techniques have been proposed. In particular, for use in a motion picture, a system in which an image is optically compressed horizontally using an anamorphic lens to be photographed on a film, and during the reproduction, the image on the film is optically horizontally magnified to be projected using an anamorphic lens as well is generally used as a system for recording and reproducing an image in compliance with the CinemaScope form having an aspect ratio of 2.35:1. As an anamorphic converter, a large number of front converters each mounted on a side of an object of an imaging optical system were proposed (refer to Japanese Patent Application Laid-Open Nos. 48-24048, 2-13916, 3-25407, 5-188271, 5-188272, 6-82691 and Japanese Patent No. 2,817,074 for example).

In addition, a rear converter mounted to an image side of an imaging optical system was proposed (refer to Japanese Patent No. 3,021,985 for example).

In recent years, promotion of high image quality of the video technique has progressed, and a digital cinema system for making a film of a scene with an HDTV (High Definition Television) system is in the progress of being popularized. In a digital cinema system, an image pickup element having an aspect ratio of 16:9 (1.78:1) is generally used. However, for the photographing complying with the CinemaScope form having the aspect ratio of 2.35:1, there has been demanded an anamorphic converter for effectively utilizing pixels on an image pickup element to enhance image quality.

It is required for an anamorphic converter for the cinema that the suitable aspect ratio conversion is made, no eclipse is generated, an effective image surface of an imaging optical system can be sufficiently utilized, reduction in a quantity of marginal ray is less, and high optical performance is provided throughout zooming and focusing.

As described in Japanese Patent Application Laid-Open Nos. 2-13916, 6-82691, and Japanese Patent No. 2,817,074, the front converter type has advantages that a structure is simple, and an effective diameter is ensured irrespective of a conversion ratio to avoid generation of the eclipse. On the other hand, there is encountered a problem that the size is large, and a change in astigmatism due to focusing occurs.

In addition, as a technique for correction of astigmatism due to focusing, there were proposed the techniques described in Japanese Patent Application Laid-Open Nos. 48-24048, 3-25407, 5-188271 and 5-188272. In these techniques, however, there is encountered a problem that correction means within a converter must be driven in conjunction with focusing in an imaging optical system, and hence a complicated mechanism is required.

The rear converter type has an advantage that there occurs no change in astigmatism due to focusing. However, a problem arises that when a conversion magnification on a vertical side and a conversion magnification are not suitably set, the eclipse is generated and a field angle of an imaging optical system is changed so that an effective image surface can not be sufficiently utilized.

As the rear converter type, there are a system having no primary image formation as shown in FIG. 31, and a system having primary image formation as shown in FIG. 32.

In FIGS. 31 and 32, $\alpha 1$ is an emission inclination angle of axial marginal ray from an imaging optical system, and $\alpha 2$ and $\alpha 3$ are emission inclination angles of axial marginal ray from an anamorphic converter AC.

In case of the rear converter type having no primary image formation, as shown in FIG. 31, an axial marginal ray from the imaging optical system needs to be made nearly afocal with a negative lens. At the same time, since an off-axial chief ray is leapt up, an off-axial chief ray emission height hb2 from a converter final surface becomes large. Hence, a problem occurs that vignetting is increased to reduce a quantity of axial marginal ray, and an off-axial chief ray emission inclination angle $\alpha b2$ is increased to shorten an exit pupil, and thus an influence of the color shading by a color separation optical system becomes easy to be generated.

The system having no primary image formation, i.e., the rear converter in which both focal length conversion magnifications $\beta x$ and $\beta y$ are positive values is proposed in JP 3,021,985 B. In this case, however, since the rear converter is prescribed so that a positive refracting power is obtained in a horizontal direction, and a negative refracting power is obtained in a vertical direction, the rear converter has an effect of lengthening a focal length in addition to an effect of converting an aspect ratio. As a result, there is a problem that a field angle becomes narrow, and if the field angle is tried to be ensured, then an image pickup means having a larger image size is required, and if the image pickup means having the larger image size is used, then an exit pupil position becomes relatively short so that an exit angle of an off-axial chief ray of a peripheral portion of a screen becomes large, and hence the shading or the like is generated.

SUMMARY OF THE INVENTION

In the light of the foregoing, it is an object of the present invention to provide an anamorphic converter of a rear converter system which is especially most suitable for a converter for the cinema, and which is miniature and excellent in optical performance.

According to a first aspect of the present invention, there is provided an anamorphic converter including at least an anamorphic lens disposed on an image side of an imaging optical system, in which when a focal length conversion magnification in an arbitrary cross section X containing an optical axis of the anamorphic converter is assigned $\beta x$, a focal length conversion magnification in a cross section Y containing an optical axis and being perpendicular to the cross section X is assigned $\beta y$, an aspect ratio of an image pickup range in an image surface of the imaging optical system is assigned AR1, and an aspect ratio of an effective area of image pickup means is assigned AR2, the following relationship is established:

$$0.9 < (AR1 \times \beta x)/(AR2 \times \beta y) < 1.1$$

According to a second aspect of the present invention, in the anamorphic converter according to the first aspect of the invention, the anamorphic lens is provided within an afocal group.

According to a third aspect of the present invention, in the anamorphic converter according to the first aspect of the invention, both βx and βy are positive values, and the anamorphic converter has positive refracting powers in the cross section X and in the cross section Y.

According to a fourth aspect of the present invention, the anamorphic converter according to the third aspect of the invention further includes, from the imaging optical system side in a stated order, a first group of lenses having a negative refracting power, a second group of lenses including at least two or more anamorphic lenses, and a third group of lenses having a positive refracting power.

According to a fifth aspect of the present invention, in the anamorphic converter according to the third aspect of the invention, the following relationship is established:

$$1 \leq (AR2^2+1) \times \beta y/(AR1^2+1) < 2.6$$

According to a sixth aspect of the present invention, in the anamorphic converter according to the first aspect of the invention, both βx and βy are negative values, and the anamorphic converter further includes at least one negative lens and two or more anamorphic lenses.

According to a seventh aspect of the present invention, there is provided an anamorphic converter including at least an anamorphic lens disposed on an image side of an imaging optical system, in which when a focal length conversion magnification in an arbitrary cross section X containing an optical axis of the anamorphic converter is assigned βx, and a focal length conversion magnification in a cross section Y containing an optical axis and being perpendicular to the cross section X is assigned βy, both βx and βy are negative values.

According to an eighth aspect of the present invention, there is provided a lens device, including:

the anamorphic converter according to any one of the first to seventh aspects of the invention; and the imaging optical system disposed on an object side with respect to the anamorphic converter.

According to a ninth aspect of the present invention, there is provided an image pickup device, including:

the anamorphic converter according to any one of the first to seventh aspects of the invention;

an imaging optical system disposed on an object side with respect to the anamorphic converter; and image pickup means disposed on the object side with respect to the anamorphic converter.

According to a tenth aspect of the present invention, there is provided an anamorphic converter including at least an anamorphic lens disposed on an image side of an imaging optical system, in which when a focal length conversion magnification in an arbitrary cross section X containing an optical axis of the anamorphic converter is assigned βx, a focal length conversion magnification in a cross section Y containing an optical axis and being perpendicular to the cross section X is assigned βy, an aspect ratio of an image pickup range in an image surface of the imaging optical system is assigned AR1, and an aspect ratio of an effective area of image pickup means is assigned AR2, the following relationships are established:

$$0.9 < (AR1 \times \beta x)/(AR2 \times \beta y) < 1.1$$

$$(AR2^2+1) \times \beta y^2/(AR1^2+1) < 1$$

According to an eleventh aspect of the present invention, in the anamorphic converter according to the tenth aspect of the invention, the anamorphic lens is provided within an afocal group.

According to a twelfth aspect of the present invention, in the anamorphic converter according to the tenth aspect of the invention, both βx and βy are positive values, and the anamorphic converter has positive refracting powers in the cross section X and in the cross section Y.

According to a thirteenth aspect of the present invention, the anamorphic converter according to the twelfth aspect of the invention further includes, from the imaging optical system side in a stated order, a first group of lenses having a negative refracting power, a second group of lenses including at least two or more anamorphic lenses, and a third group of lenses having a positive refracting power.

According to a fourteenth aspect of the present invention, in the anamorphic converter according to the tenth aspect of the invention, both βx and βy are negative values, and the anamorphic converter further includes at least one negative lens and two or more anamorphic lenses.

According to a fifteenth aspect of the present invention, there is provided a lens device, including:

the anamorphic converter according to any one of the tenth to fourteenth aspects of the invention; and the imaging optical system disposed on an object side with respect to the anamorphic converter.

According to a sixteenth aspect of the present invention, there is provided an image pickup device, including:

the anamorphic converter according to any one of the tenth to fourteenth aspects of the invention;

the imaging optical system disposed on an object side with respect to the anamorphic converter; and image pickup means disposed on the object side with respect to the anamorphic converter.

BRIEF DESCRIPTION OF THE DRAWINGS

FIG. 2 is a longitudinal aberration view of Numerical Example 1 in the X direction under a condition in which fx is 9.7 mm, fy is 12.9 mm, and an object distance is 2.5 m;

FIG. 3 is a longitudinal aberration view of Numerical Example 1 in the Y direction under a condition in which fx is 9.7 mm, fy is 12.9 mm, and an object distance is 2.5 m;

FIG. 53 is a longitudinal aberration view under a condition in which f is 10.3 mm and the object distance is 2.5 m before insertion of the anamorphic converter of Numerical Examples 4, 5, and 6;

FIG. 54 is a longitudinal aberration view under a condition in which f is 39.5 mm and the object distance is 2.5 m before insertion of the anamorphic converter of Numerical Examples 4, 5, and 6;

DETAILED DESCRIPTION OF THE PREFERRED EMBODIMENTS (Operation 1)

Aspect 1

An anamorphic converter according to the present invention includes at least an anamorphic lens disposed on an image side of an imaging optical system, and the anamorphic converter is characterized in that when a focal length conversion magnification in an arbitrary cross section X containing an optical axis of the anamorphic converter is assigned $\beta x$, a focal length conversion magnification in a cross section Y containing an optical axis and being perpendicular to the cross section X is assigned $\beta y$, an aspect ratio of an image pickup range in an image surface of the imaging optical system is assigned AR1, and an aspect ratio of an effective area of image pickup means is assigned AR2, the following relationship is established:

$$0.9 < (AR1 \times \beta x)/(AR2 \times \beta y) < 1.1$$

Aspect 1 is concerned with a condition under which the conversion magnification of the anamorphic converter is suitably prescribed to thereby carry out the suitable conversion of an aspect ratio without generation of an eclipse.

Figure 15:
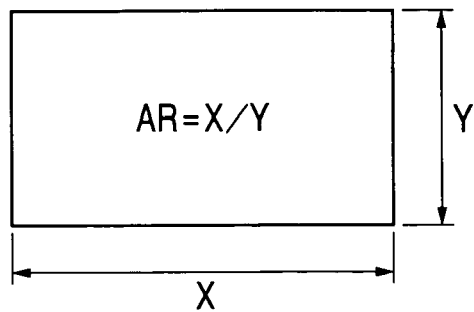
FIG. 15 is a conceptual diagram of an aspect ratio.

Equation 1 exhibits with a condition under which the suitable aspect ratio conversion is carried out. When as shown in FIG. 15, a transverse length of an image surface is assigned X, a longitudinal length of the image surface is assigned Y, an-aspect ratio AR is expressed by Equation 2:

$$AR = X/Y \qquad (2)$$

Figure 16:
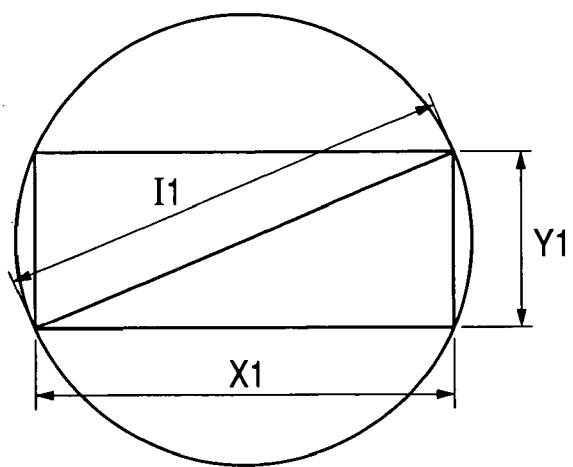
FIG. 16 is a conceptual diagram of an image circle and an image pickup range in an image surface of an imaging optical system.
Figure 17:
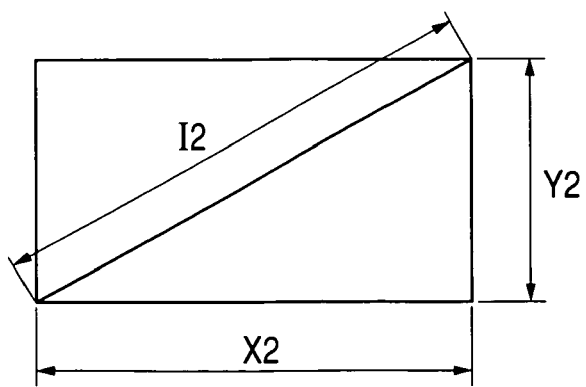
FIG. 17 is a conceptual diagram of an image circle and an image pickup range after conversion made by a converter of the present invention.

A schematic diagram of an image pickup range of an imaging optical system is shown in FIG. 16, and a schematic diagram of an image pickup range of an image pickup means is shown in FIG. 17. When from FIG. 16, a transverse length of a size of an effective picture of the image pickup range in the image surface of the imaging optical system is assigned X1, a longitudinal length of the size of that effective picture is assigned Y1, and an aspect ratio is assigned AR1, and from FIG. 17, a transverse length of the image pickup range of the image pickup means is assigned X2, a longitudinal length of that image pickup range is assigned Y2, and an aspect ratio is assigned AR2, a ratio of AR1/AR2 is expressed by Equation 3:

$$AR1/AR2 = (X1 \times Y2)/(X2 \times Y1) \qquad (3)$$

Figure 18:
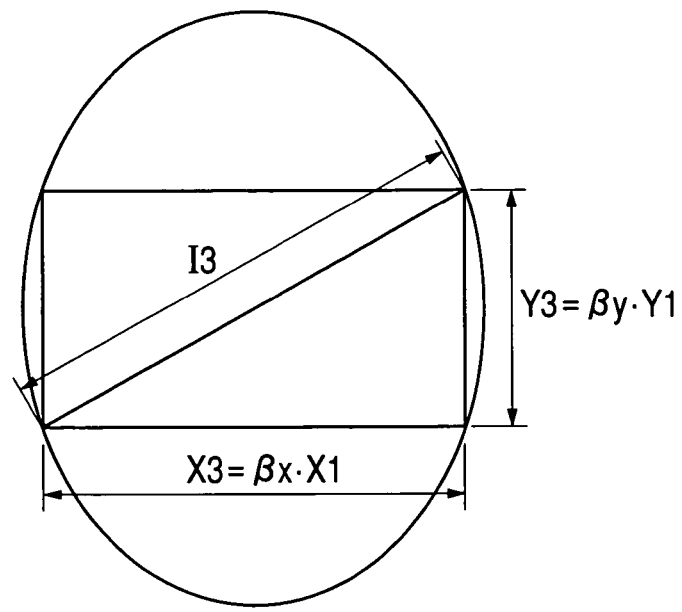
FIG. 18 is a conceptual diagram of an effective area of an image pickup means.

In addition, a conceptual diagram of an image pickup range after the conversion of the aspect ratio made by the anamorphic converter is shown in FIG. 18. In order that the aspect ratio may be suitably converted, it is desirable that a conversion magnifications $\beta x$ of the anamorphic converter in a transverse direction, and a conversion magnification $\beta y$ of the anamorphic converter in a longitudinal direction are expressed by Equations 4 and 5, respectively:

$$\beta x = X2/X1 \qquad (4)$$

$$\beta y = Y2/Y1 \qquad (5)$$

From Equations 3 to 5, the condition for ideal aspect ratio conversion is expressed as follows:

$$(AR1 \times \beta x)/(AR2 \times \beta y) = 1 \qquad (6)$$

Since in actual, an influence of an error of about 10% is visually small, Equation 1 is met to thereby allow the suitable aspect ratio conversion to be realized.

Figure 19:
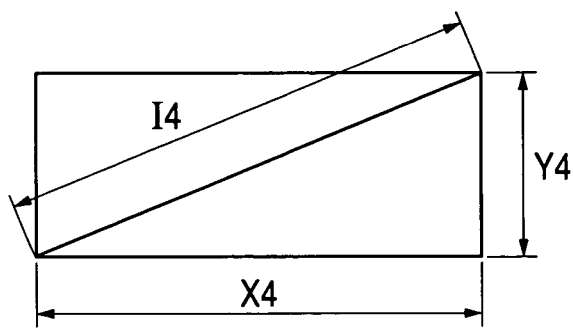
FIG. 19 is a conceptual diagram of a display area of an output image in projecting an image.

Also, a conceptual diagram of an output image in projecting an image is shown in FIG. 19. It is necessary that in projecting an image, the conversion of the aspect ratio reverse to that in capturing an image is carried out to return the current aspect ratio back to the original aspect ratio. Consequently, a transverse length X4 and a longitudinal length Y4 in FIG. 19 are expressed as follows, respectively:

$$X4 = \beta x' \times X2 \qquad (7)$$

$$Y4 = \beta y' \times Y2 \qquad (8)$$

Here, the conversion magnifications $\beta x'$ and $\beta y'$, when an arbitrary constant is assigned m, are expressed as follows, respectively:

$$\beta x' = m/\beta x \qquad (9)$$

$$\beta y' = m/\beta y \qquad (10)$$

Aspect 2

There is provided an anamorphic converter according to Aspect 1, in which the anamorphic lens is provided within an afocal group.

Aspect 3

There is provided an anamorphic converter according to Aspect 1 or 2, characterized in that both βx and βy are positive values, and the anamorphic converter has positive refracting powers in the cross section X and in the cross section Y.

Aspect 4

There is provided an anamorphic converter according to Aspect 3, further including, from the imaging optical system side in a stated order, a first group of lenses having a negative refracting power, a second group of lenses including at least two or more anamorphic lenses, and a third group of lenses having a positive refracting power.

Aspect 5

There is provided an anamorphic converter according to Aspect 3 or 4, characterized in that the following relationship is established:

$$1 \leq (AR2^2+1) \times \beta y^2/(AR1^2+1) < 2.6 \tag{11}$$

Aspect 4 is concerned with a condition under which the power disposition of the anamorphic converter for carrying out the aspect ratio conversion without the primary image formation by an imaging optical system is suitably prescribed to make the optical performance excellent.

In order that the primary imaging may be prevented from being made, it is necessary that both the focal length conversion magnifications βx and βy are positive values. Moreover, the cross section X and the cross section Y have positive refracting powers, respectively, to thereby reduce the effect of lengthening a focal length. As a result, there is obtained the anamorphic converter of a type having no primary image formation in which for the single imaging optical system, the field angle is prevented from becoming too narrow, and the exit pupil can be held for long.

In Aspect 4, the suitable structure in Aspect 3 is prescribed. In order that the cross section X and the cross section Y may have different conversion magnifications, it is necessary to form an afocal converter (anamorphic converter) having different angular magnifications in the cross section X and the cross section Y by using at least two so-called toric lenses each having different curvatures in the cross section X and the cross section Y, or at least two cylindrical lenses having a curvature in a certain cross section. In addition, in order that the converter may be disposed on an image side of the imaging optical system, there are required a first group of lenses having a negative refracting power for causing a converged ray from the imaging optical system to diverge, and a group of lenses having a positive refracting power for imaging that ray. Consequently, an optical property of a portion between the first group of lenses having a negative refracting power and the group of lenses having a positive refracting power is made nearly afocal, and a group of lenses including an anamorphic lens is introduced as the second group of lenses, whereby it is possible to attain an anamorphic converter having no primary image formation.

In Aspect 5, there is prescribed a relationship among the focal length conversion magnification βy, and the aspect ratios AR1 and AR2 for preventing the field angle from becoming too narrow while preventing generation of the eclipse in Aspect 3 or Aspect 4.

Equation (11) exhibits a condition under which reduction in the field angle is suppressed while preventing generation of the eclipse following the aspect ratio conversion. When the converter is disposed on an image side of the imaging optical system, since an image circle is regulated on the basis of the effective diameter on the side of the imaging optical system, the wide angle can not be obtained even if the conversion magnification is made smaller than 1. Consequently, the eclipse is generated in the periphery of the picture.

As shown in FIG. 16, an image circle I1 of the imaging optical system is expressed by Equation 12:

$$I1=(X1^2+Y1^2)^{1/2}=Y1 \times (AR1^2+1)^{1/2} \tag{12}$$

In addition, as shown in FIG. 17, a width I2 across corners of the image pickup means is expressed by Equation 13:

$$I2 = (X2^2 + Y2^2)^{\frac{1}{2}} \tag{13}$$
$$= \beta y \times Y1 \times (AR2^2 + 1)^{\frac{1}{2}}$$

Here, as shown in FIG. 18, a width I3 across corners of the image which is subjected to the aspect ratio conversion in the anamorphic converter is expressed by Equation 14:

$$I3 = \{(\beta x \times X1)^2 + (\beta y \times Y1)^2\}^{\frac{1}{2}} \tag{14}$$
$$= \beta y \times Y1 \times (AR2^2 + 1)^{\frac{1}{2}}$$

Consequently, in order that the image after the aspect ratio conversion may contain the width across corners of the image pickup means to prevent generation of the eclipse, a relationship of I3≧I2 must be established. Thus, from Equations 13 and 14, Equations 15 and 11-2 are obtained:

$$I3^2/I2^2 \geq 1 \tag{15}$$

$$\{\beta y^2 \times (AR2^2+1)\}/(AR1^2+1) \geq 1 \tag{11-2}$$

As a result, if the lower limit in Equation (11) is exceeded, the eclipse will be generated.

In addition, if the upper limit in Equation 11 is exceeded, then the field angle obtained through the conversion made by the converter becomes narrower than that in the single imaging optical system, so that the image pickup range of the imaging optical system becomes unable to be effectively utilized.

Aspect 6

There is provided an anamorphic converter according to Aspect 1 or 2, in which both βx and βy are negative values, and the anamorphic converter includes at least one negative lens and two or more anamorphic lenses.

Aspect 7

There is provided an anamorphic converter including at least an anamorphic lens disposed on an image side of an imaging optical system, in which when a focal length conversion magnification in an arbitrary cross section X containing an optical axis of the anamorphic converter is assigned βx, and a focal length conversion magnification in a cross section Y containing an optical axis and being perpendicular to the cross section X is assigned βy, both βx and βy are negative values.

Aspects 6 and 7 are concerned with a condition in which a structure of the anamorphic converter for obtaining the primary image formation through the imaging optical system to convert the aspect ratio is suitably prescribed to make the optical performance excellent.

Figure 32:
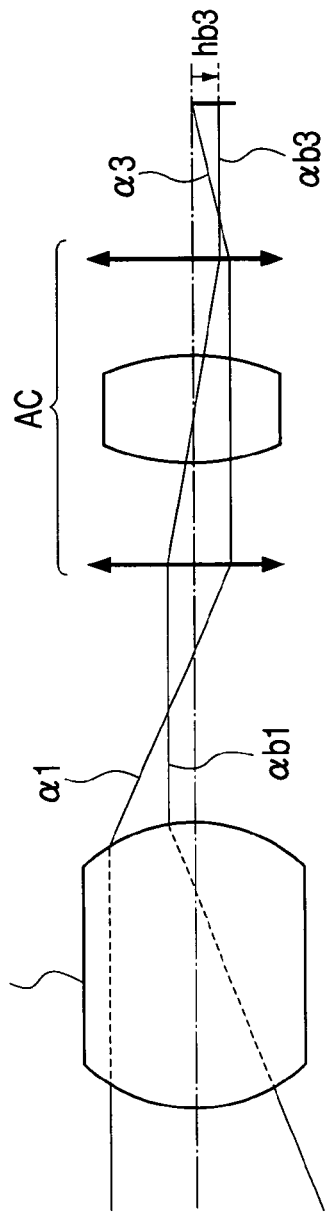
FIG. 32 is a conceptual view of an anamorphic converter of a type having primary image formation.

A conceptual view of the anamorphic converter of a type having primary image formation is shown in FIG. 32. For the optical system for reimaging the primary image of the imaging optical system, it is necessary that both the focal length conversion magnifications βx and βy are negative values. In addition, in order to contain the marginal ray of the imaging optical system, it is necessary that an entrance pupil nearly agrees with the exit pupil of the imaging optical system. Lenses for broadcasting including a lens for a digital cinema become an optical system which has a long exit pupil and hence is nearly telecentric on the image side since they are established on the assumption that the color separation optical system is used. Consequently, an optical system which is at least nearly telecentric on the both sides is required for the converter. As shown in FIG. 32, in case of the anamorphic converter of a type having primary image formation, since an emitted ray from the imaging optical system is made nearly afocal using the positive lens, an increase in an off-axial chief ray emitted height hb3 from the converter final surface is suppressed to prevent a quantity of marginal light from being reduced. Thus, an off-axial chief ray emitted inclination angle αb3 can be made small. As a result, there is an advantage that the exit pupil becomes long, and hence an influence of the color shading due to the color separation optical system is hardly generated. As shown in FIG. 32, from the condition in which the converter is telecentric on the both sides, the anamorphic converter of a type having primary image formation is constituted by at least two groups of positive lenses, and the refracting power of the whole converter takes a minute value in the vicinity of zero.

In addition, since for the primary image obtained through the imaging optical system, the various aberrations such as the chromatic aberration, the antigmatism and the curvature of field are satisfactorily corrected, the chromatic aberration, the antigmatism, the curvature of field and the like of the converter must also be satisfactorily corrected. When a refracting power of an Φ-th lens of lenses within the converter is assigned (i, an Abbe's number of the i-th lens of the lenses is assigned vi, and a refracting index of the i-th lens of the lenses is assigned Ni, a chromatic aberration correction condition is expressed as follows:

$$\Sigma(\Phi i/vi) \approx 0 \quad (16)$$

Also, a Petzval's condition is expressed as follows:

$$\Sigma(\Phi i/Ni) \approx 0 \quad (17)$$

Here, since in the general optical materials, vi>0 and Ni>0 are established, in order to meet Equations (16) and (17), the anamorphic converter having primary image formation must have at least an negative lens in terms of its structure. Moreover, any one of the intervals within the converter is made nearly afocal, and the lens group including the above-mentioned anamorphic lens is introduced, whereby it is possible to attain the anamorphic converter of a primary image formation type.

Aspect 8

There is provided a lens device, including: the anamorphic converter according to any one of Aspects 1 to 7; and the imaging optical system disposed on an object side with respect to the anamorphic converter.

Aspect 9

There is provided an image pickup device, including: the anamorphic converter according to any one of Aspects 1 to 8; an imaging optical system disposed on an object side with respect to the anamorphic converter; and image pickup means disposed on the object side with respect to the anamorphic converter.

The anamorphic lens used in the present invention is used in terms of the concept including a toric lens and a cylindrical lens, and hence means a lens in which a power in the X direction is different from that in the Y direction.

In addition, the anamorphic lens used in the present invention may have a function of a diffraction system.

Moreover, the imaging optical system of the present invention may be a variable power system or a fixed power system (having no variable power).

First Embodiment

This embodiment is concerned with an anamorphic converter of a type having no primary image formation.

Figure 1:
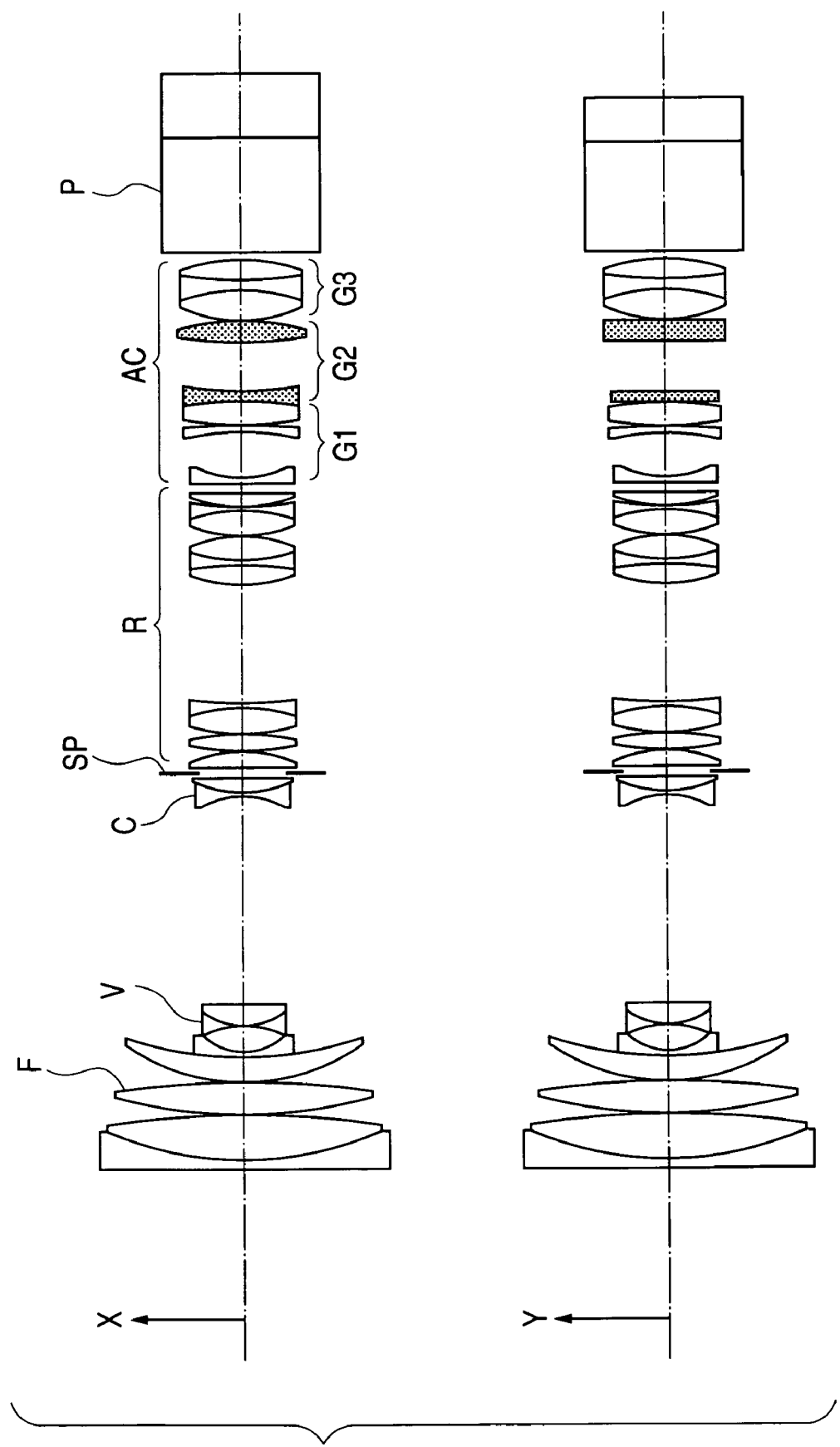
FIG. 1 is a cross sectional view of a wide angle end of Numerical Example 1 in an X direction and in a Y direction.
Figure 4:
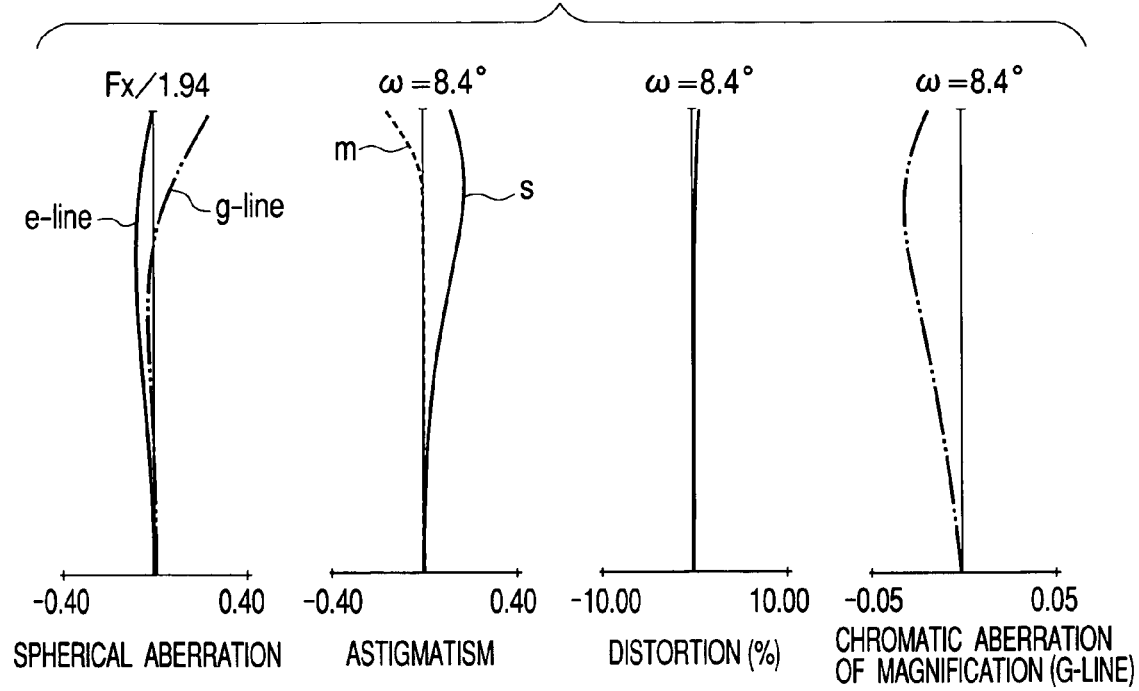
FIG. 4 is a longitudinal aberration view of Numerical Example 1 in the X direction under a condition in which fx is 37.3 mm, fy is 49.3 mm and the object distance is 2.5 m.
Figure 5:
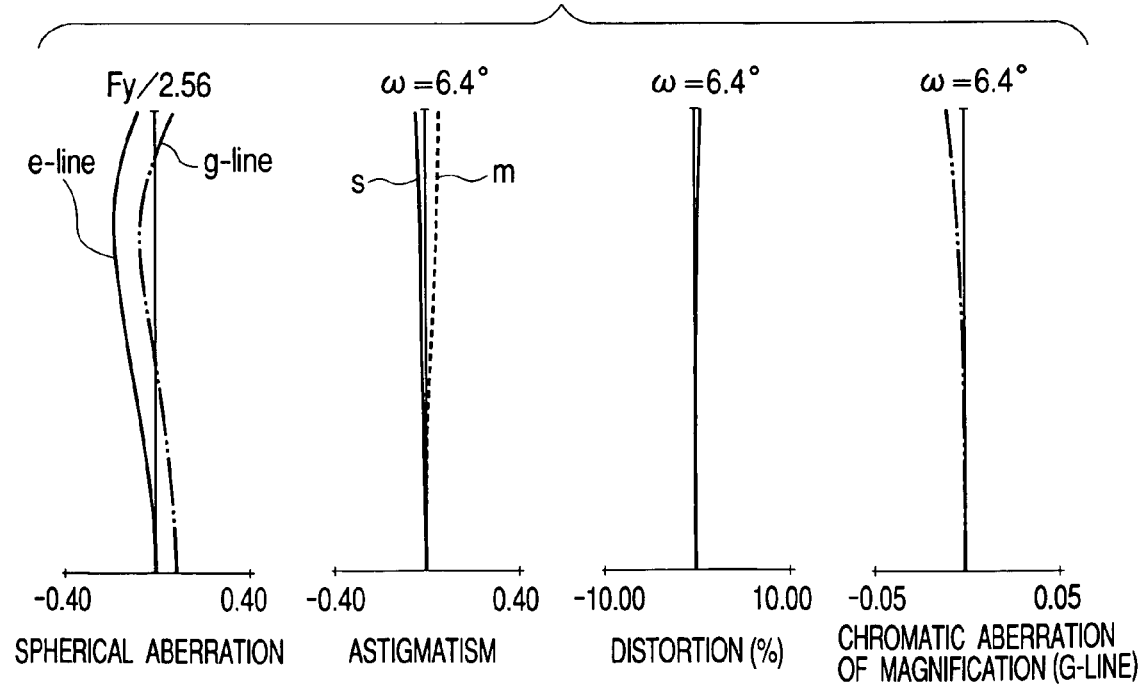
FIG. 5 is a longitudinal aberration view of Numerical Example 1 in the Y direction under a condition in which fx is 37.3 mm, fy is 49.3 mm and the object distance is 2.5 m.
Figure 6:
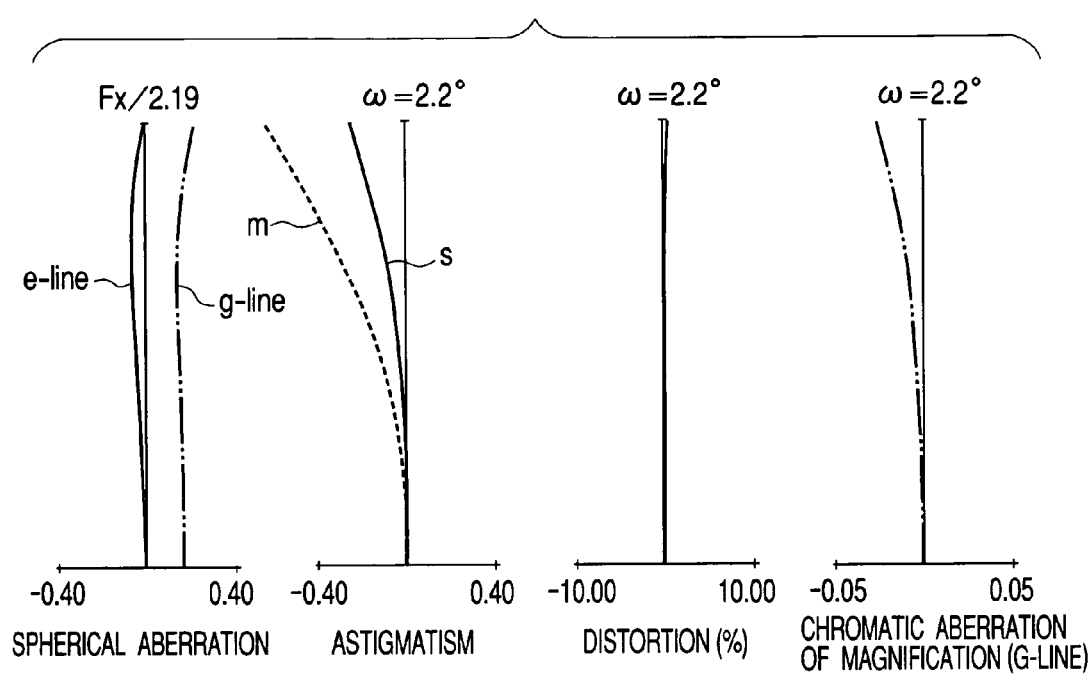
FIG. 6 is a longitudinal aberration view of Numerical Example 1 in the X direction under a condition in which fx is 142.9 mm, fy is 189.0 mm and the object distance is 2.5 m.
Figure 7:
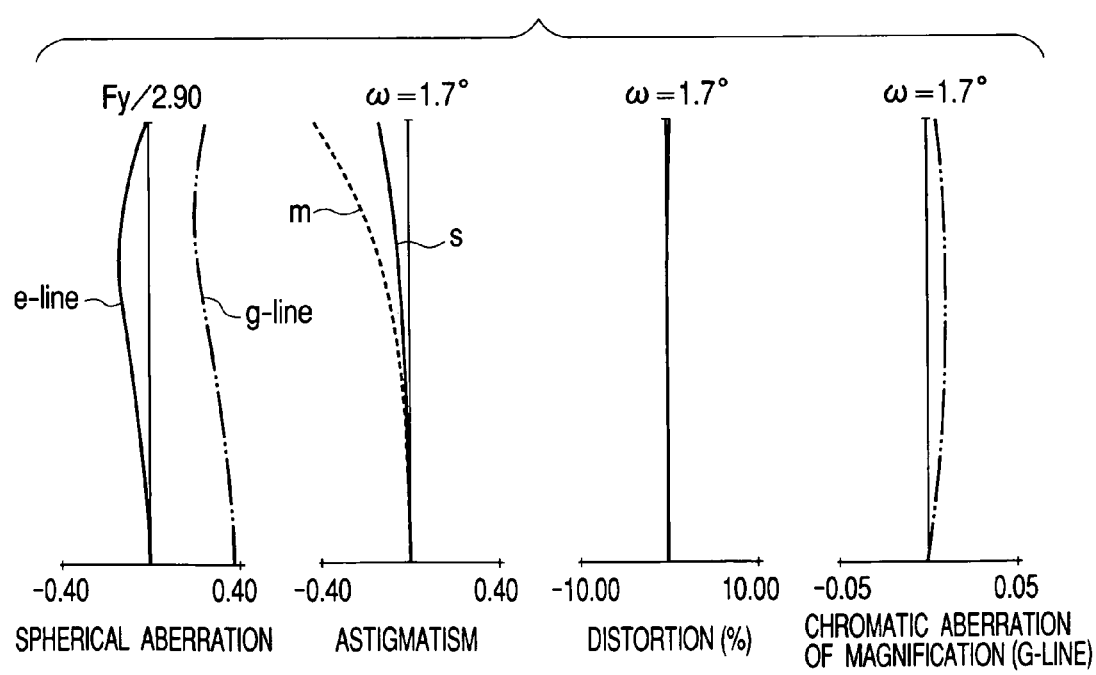
FIG. 7 is a longitudinal aberration view of Numerical Example 1 in the Y direction under a condition in which fx is 142.9 mm, fy is 189.0 mm and the object distance is 2.5 m.

FIG. 1 is a cross sectional view of lenses in a Y direction and in an X direction when an anamorphic converter is inserted in Numerical Example 1 of the present invention.

Figure 20:
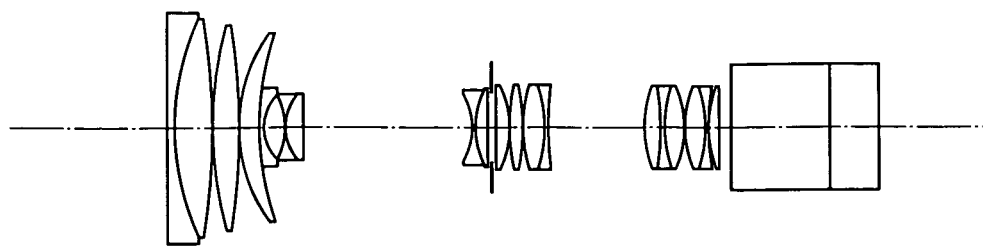
FIG. 20 is a cross sectional view in a wide angle end before insertion of an anamorphic converter of Numerical Examples 1, 2, and 3.

In addition, a cross sectional view before insertion of the anamorphic converter in Numerical Example 1 is shown in FIG. 20.

Figure 21:
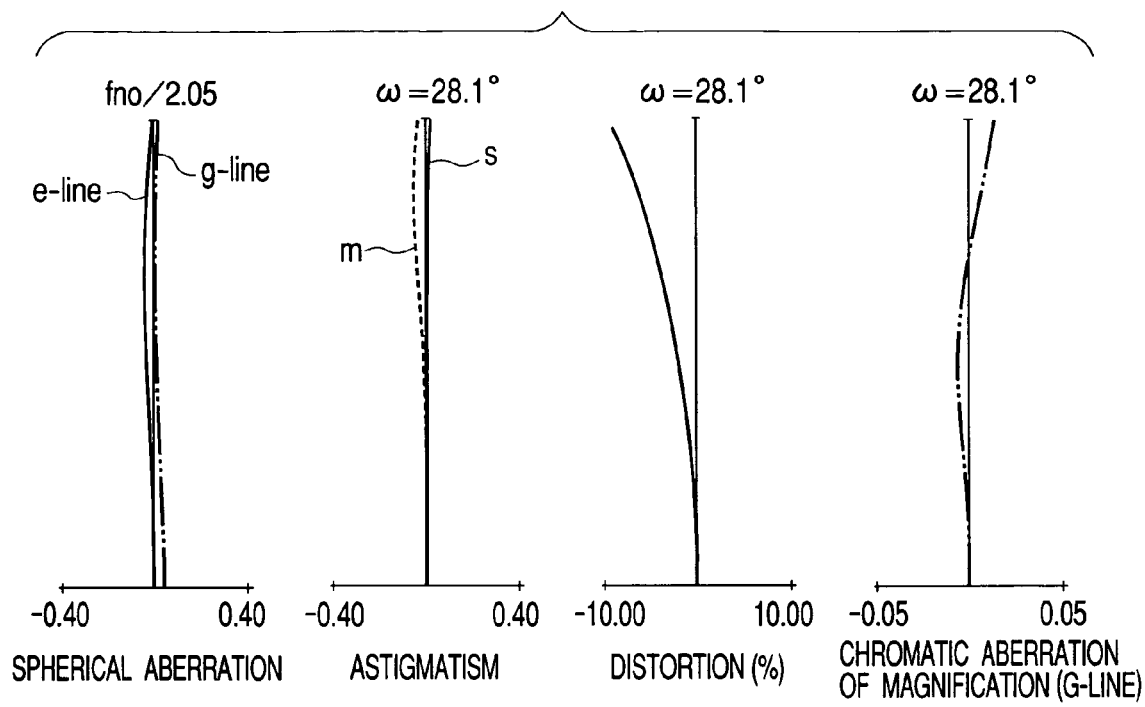
FIG. 21 is a longitudinal aberration view under a condition in which f is 10.3 mm and the object distance is 2.5 m before insertion of the anamorphic converter of Numerical Examples 1, 2, and 3.
Figure 22:
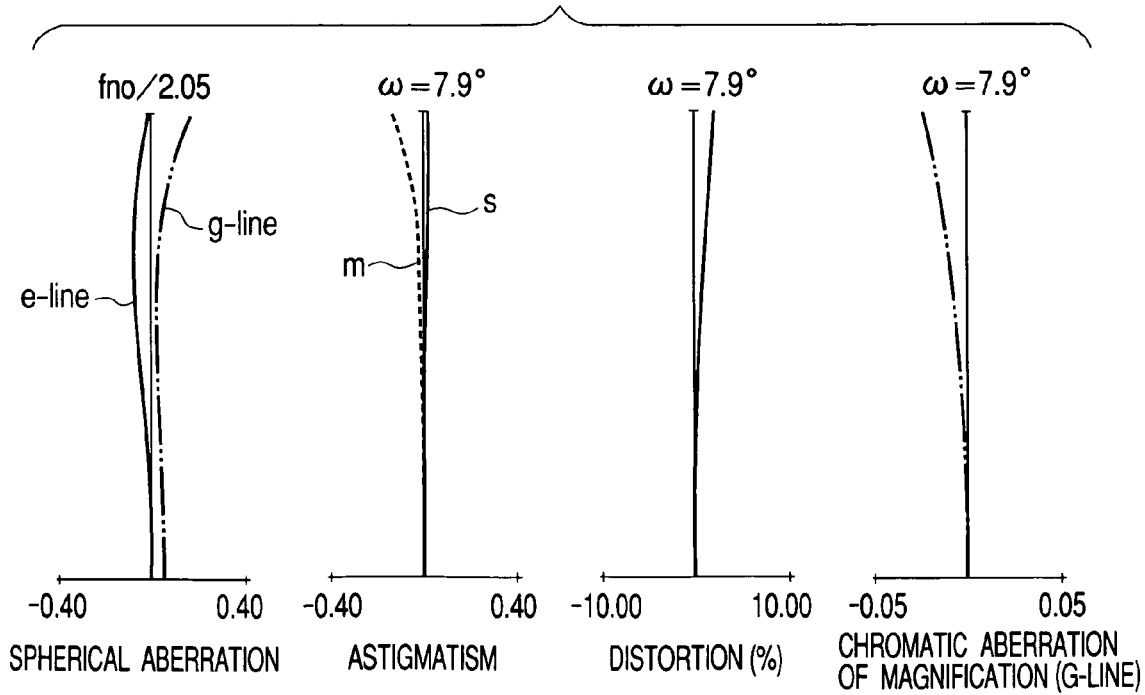
FIG. 22 is a longitudinal aberration view under a condition in which f is 39.5 mm and the object distance is 2.5 m before insertion of the anamorphic converter of Numerical Examples 1, 2, and 3.
Figure 23:
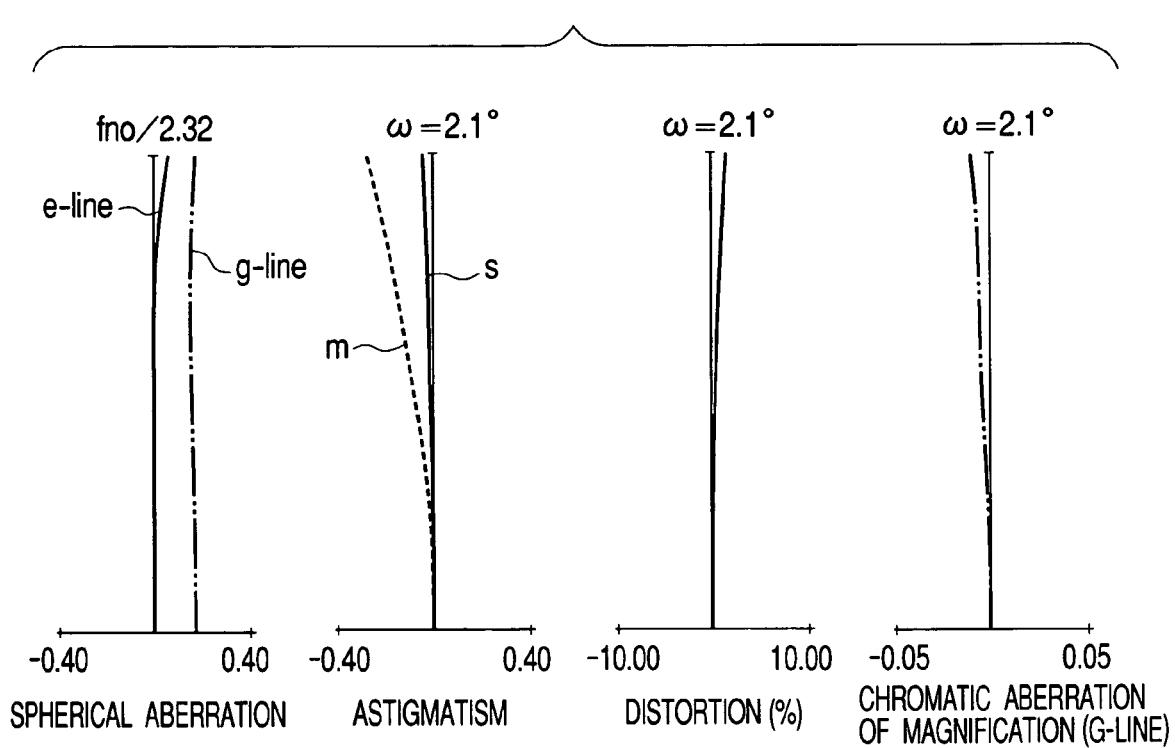
FIG. 23 is a longitudinal aberration view under a condition in which f is 151.1 mm and the object distance is 2.5 m before insertion of the anamorphic converter of Numerical Examples 1, 2, and 3.

FIGS. 21 to 23 show longitudinal aberration views before insertion of the anamorphic converter in Numerical Examples 1, 2, and 3, respectively.

In FIG. 1, reference symbol F designates a group of front focusing lenses having a positive refracting power as a first group. Reference symbol V designates a variator for the variable power having a negative refracting power as a second group. The variator V is monotonously moved on an optical axis to an image surface side to thereby carry out the variable power from the wide angle end to the telescopic end. Reference symbol C designates a compensator having a negative refracting power as a third group. The compensator C is nonlinearly moved on the optical axis to an object side while describing a projection locus in order to compensate for the fluctuation of an image surface following the variable power. The variator V and the compensator C constitute the variable power system.

Reference symbol SP designates a stop, and reference symbol R designates a group of variable power semi-fixed relay lenses having a positive refracting power as a fourth group. Reference symbol P designates a color separation prism, an optical filter or the like which is shown in the form of a glass block in the figure.

The focusing group F, the variator V, the compensator C and the relay group R constitute an imaging optical system.

Next, a description will hereinafter be given with respect to the feature of the anamorphic converter AC in Numerical Example 1. The anamorphic converter AC includes: a first group G1 of lenses having a negative refracting power; a second group G2 of lenses having two cylindrical lenses; and a third group G3 of lenses having an image formation function and a positive refracting power. Each of the cylindrical lenses belonging to the second group G2 has a curvature only in the X direction, and has an effect of shortening a focal length in the X direction. The aspect ratio AR1 of the image pickup range in the image surface of the imaging optical system, and the aspect ratio AR2 of the effective area of the image pickup means are as follows:

$$AR1 = 2.35 \quad (18)$$

$$AR2 = 1.78 \quad (19)$$

Also, the conversion magnification $\beta x$ in the X direction, and the conversion magnification $\beta y$ in the Y direction are as follows:

$$\beta x = 0.947 \quad (20)$$

$$\beta y = 1.252 \quad (21)$$

Consequently, the values of the conditional equations are obtained as follows:

$$(AR1 \times \beta x)/(AR2 \times \beta y) = 1.00 \quad (22)$$

$$(AR2^2 + 1) \times \beta y^2/(AR1^2 + 1) = 1.00 \quad (23)$$

Thus, these values meet the conditions of Equations 1 and 11. Consequently, the anamorphic converter of a built-in converter system is attained which is excellent in the optical performance and free from the eclipse.

In addition, in case of the single anamorphic converter AC, a focal length fACx in the X direction, and a focal length fACy in the Y direction are expressed as follows:

$$fACx = +32.789 \quad (24)$$

$$fACy = +69.848 \quad (25)$$

Thus, both of them have the positive refracting powers and hence meet the condition which is required for the anamorphic converter of the present invention.

A material of the cylindrical lens used in this embodiment is glass. In the following second and third embodiments as well, the same material will be used.

FIGS. 2 to 7 are longitudinal aberration views in the X direction or in the Y direction in Numerical Example 1. In these figures, fx indicates a focal length in the X direction, fy indicates a focal length in the Y direction, Fx indicates an F number in the X direction, Fy indicates an F number in the Y direction, and $2\omega$ indicates a field angle.

In Numerical Example 1, the following values are obtained:

fx=9.74 to 142.93 fy=12.88 to 188.96

Fx=1.94 to 2.19

Fy=2.56 to 2.90

$2\omega$=56.2 to 4.2 degrees

| r1 = | 1169.481 | d1 = | 2.40 | n1 = 1.81265 | v1 = 25.4 |
| --- | --- | --- | --- | --- | --- |
| r2 = | 98.429 | d2 = | 10.83 | n2 = 1.51825 | v2 = 64.2 |
| r3 = | 265.170 | d3 = | 0.20 | | |
| r4 = | 124.037 | d4 = | 8.29 | n3 = 1.60548 | v3 = 60.7 |
| r5 = | −281.395 | d5 = | 0.20 | | |
| r6 = | 51.797 | d6 = | 6.46 | n4 = 1.64254 | v4 = 60.1 |
| r7 = | 97.915 | d7 = | Variable | | |
| r8 = | 71.045 | d8 = | 0.90 | n5 = 1.82017 | v5 = 46.6 |
| r9 = | 17.601 | d9 = | 6.01 | | |
| r10 = | −21.542 | d10 = | 0.90 | n6 = 1.77621 | v6 = 49.6 |
| r11 = | 18.397 | d11 = | 4.63 | n7 = 1.85501 | v7 = 23.9 |
| r12 = | −4295.134 | d12 = | Variable | | |
| r13 = | −27.245 | d13 = | 0.90 | n8 = 1.79013 | v8 = 44.2 |
| r14 = | 31.613 | d14 = | 3.84 | n9 = 1.85501 | v9 = 23.9 |
| r15 = | 1125.345 | d15 = | Variable | | |
| r16 = | 0.000 (Stop) | d16 = | 1.60 | | |
| r17 = | 10000.000 | d17 = | 4.02 | n10 = 1.73234 | v10 = 54.7 |
| r18 = | −32.342 | d18 = | 0.20 | | |
| r19 = | 107.938 | d19 = | 3.60 | n11 = 1.48915 | v11 = 70.2 |
| r20 = | −121.402 | d20 = | 0.20 | | |
| r21 = | 37.891 | d21 = | 7.17 | n12 = 1.48915 | v12 = 70.2 |
| r22 = | −36.452 | d22 = | 1.20 | n13 = 1.83932 | v13 = 37.2 |
| r23 = | 177.431 | d23 = | 30.00 | | |
| r24 = | 48.564 | d24 = | 4.26 | n14 = 1.48915 | v14 = 70.2 |
| r25 = | −193.706 | d25 = | 0.20 | | |
| r26 = | −210.911 | d26 = | 1.20 | n15 = 1.83932 | v15 = 37.2 |
| r27 = | 39.960 | d27 = | 6.49 | n16 = 1.48915 | v16 = 70.2 |
| r28 = | −33.683 | d28 = | 0.20 | | |
| r29 = | 43.464 | d29 = | 6.21 | n17 = 1.53430 | v17 = 48.8 |
| r30 = | −30.063 | d30 = | 1.20 | n18 = 1.80811 | v18 = 46.6 |
| r31 = | 113.246 | d31 = | 0.20 | | |
| r32 = | 56.783 | d32 = | 2.98 | n19 = 1.55098 | v19 = 45.8 |
| r33 = | −10000.000 | d33 = | 2.40 | | |
| r34 = | −7839.440 | d34 = | 1.50 | n20 = 1.88815 | v20 = 40.8 |
| r35 = | 23.812 | d35 = | 11.72 | | |
| r36 = | −53.891 | d36 = | 1.50 | n21 = 1.88815 | v21 = 40.8 |
| r37 = | −398.617 | d37 = | 0.20 | | |
| r38 = | 70.482 | d38 = | 6.77 | n22 = 1.81264 | v22 = 25.4 |
| r39 = | −44.050 | d39 = | 0.31 | | |
| r40 = | −53.902 | d40 = | 1.50 | n23 = 1.51825 | v23 = 64.1 |
| r41 = | 63.160 | d41 = | 13.52 | | |
| r42 = | 128.438 | d42 = | 4.68 | n24 = 1.88815 | v24 = 40.8 |
| r43 = | 80.144 | d43 = | 0.20 | | |
| r44 = | 42.096 | d44 = | 8.88 | n25 = 1.48915 | v25 = 70.2 |
| r45 = | −35.579 | d45 = | 1.50 | n26 = 1.81264 | v26 = 25.4 |
| r46 = | 357.584 | d46 = | 0.20 | | |
| r47 = | 199.741 | d47 = | 5.28 | n27 = 1.48915 | v27 = 70.2 |
| r48 = | 46.226 | d48 = | 2.00 | | |
| r49 = | 0.000 | d49 = | 30.00 | n28 = 1.60718 | v28 = 38.0 |

-continued

| r50 = | 0.000 | d50 = | 16.20 | n29 = 1.51825 | v29 = 64.2 |
| r51 = | 0.000 | | | | |

*r40 to r43 indicate the cylindrical lenses. A curvature in the Y direction is zero.

| Focal length | | | |
|---|---|---|---|
| fx | 9.74 | 37.31 | 142.93 |
| fy | 12.88 | 49.33 | 188.96 |
| Variable spacing | | | |
| d7 | 0.39 | 33.92 | 49.55 |
| d12 | 52.91 | 14.8 | 3.78 |
| d15 | 1.55 | 6.13 | 1.53 |

Second Embodiment

This embodiment is concerned with an anamorphic converter of a type having no primary image formation.

Figure 8:
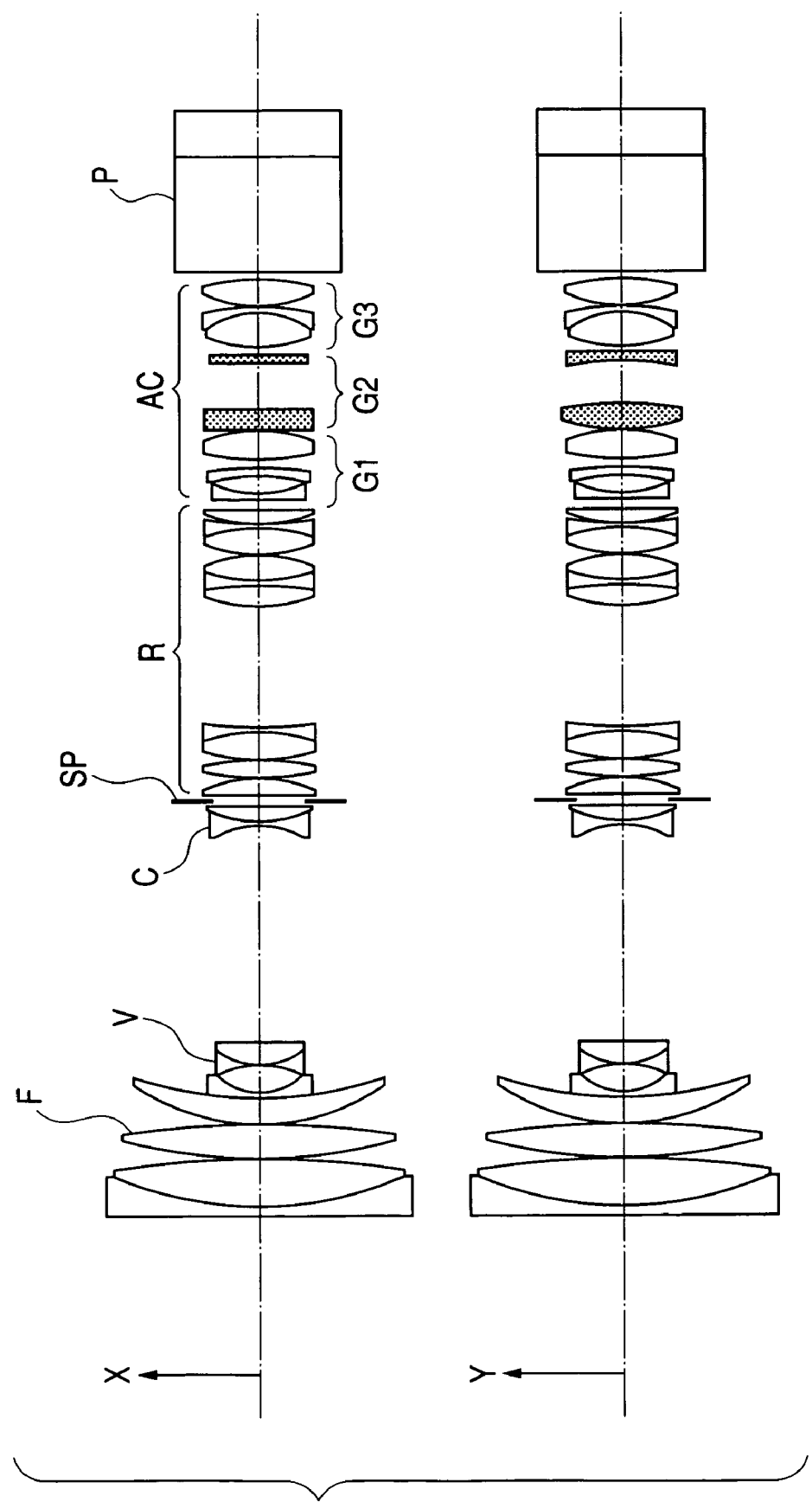
FIG. 8 is a cross sectional view of a wide angle end of Numerical Example 2 in the X direction and in the Y direction.
Figure 9:
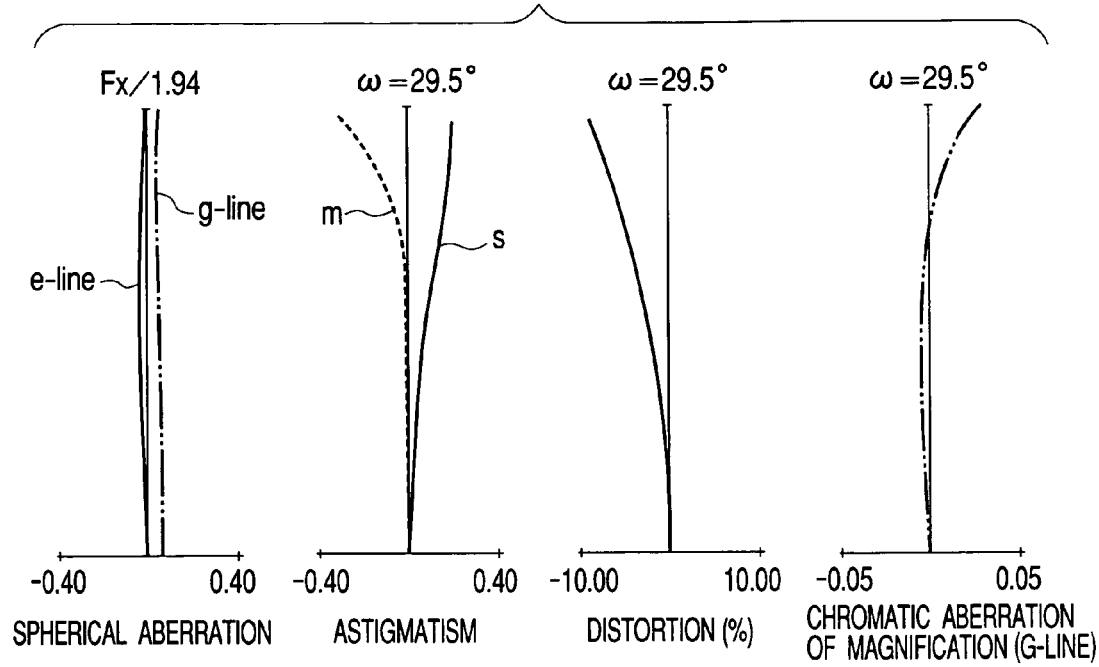
FIG. 9 is a longitudinal aberration view of Numerical Example 2 in the X direction under a condition in which fx is 9.7 mm, fy is 12.9 mm and the object distance is 2.5 m.
Figure 10:
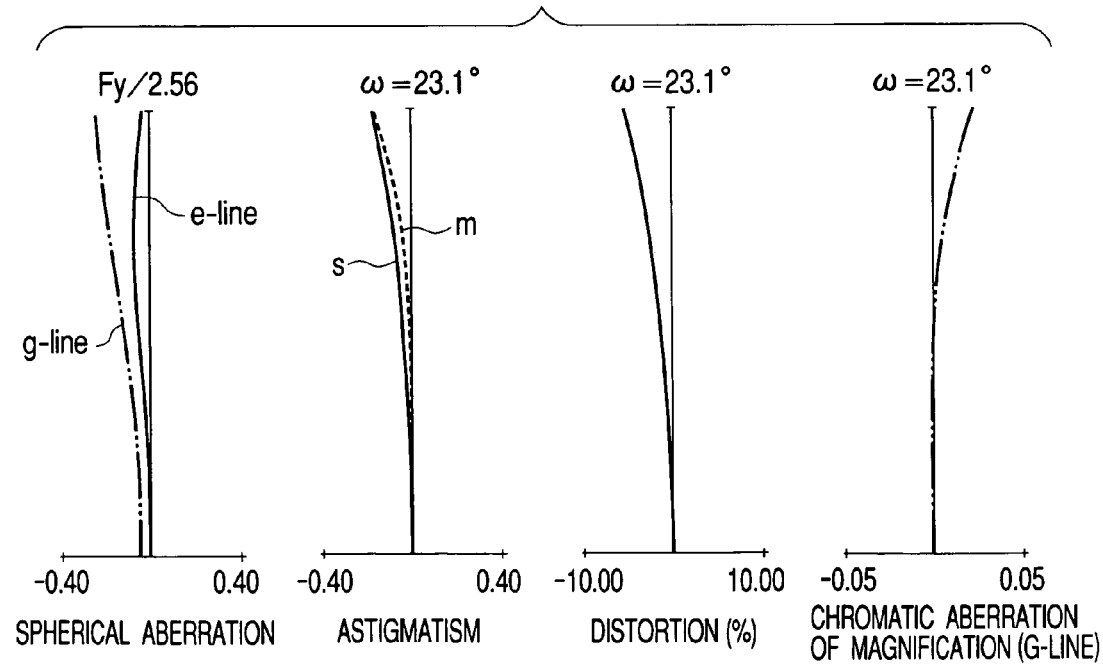
FIG. 10 is a longitudinal aberration view of Numerical Example 2 in the Y direction under a condition in which fx is 9.7 mm, fy is 12.9 mm and the object distance is 2.5 m.
Figure 11:
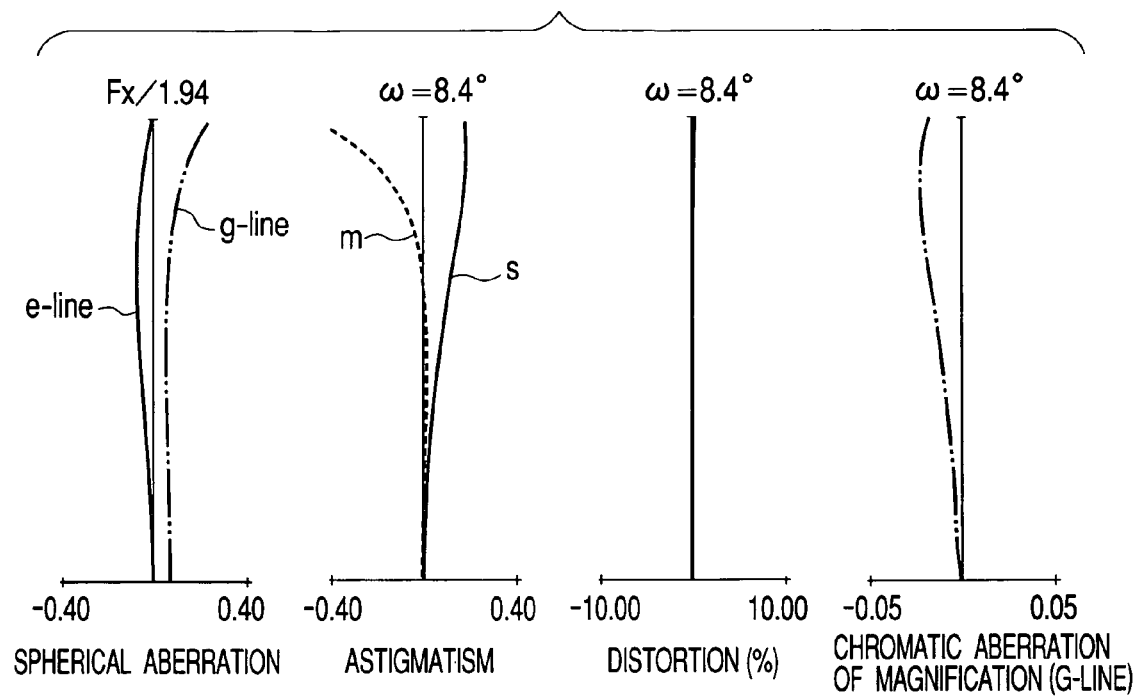
FIG. 11 is a longitudinal aberration view of Numerical Example 2 in the X direction under a condition in which fx is 37.3 mm, fy is 49.3 mm and the object distance is 2.5 m.
Figure 12:
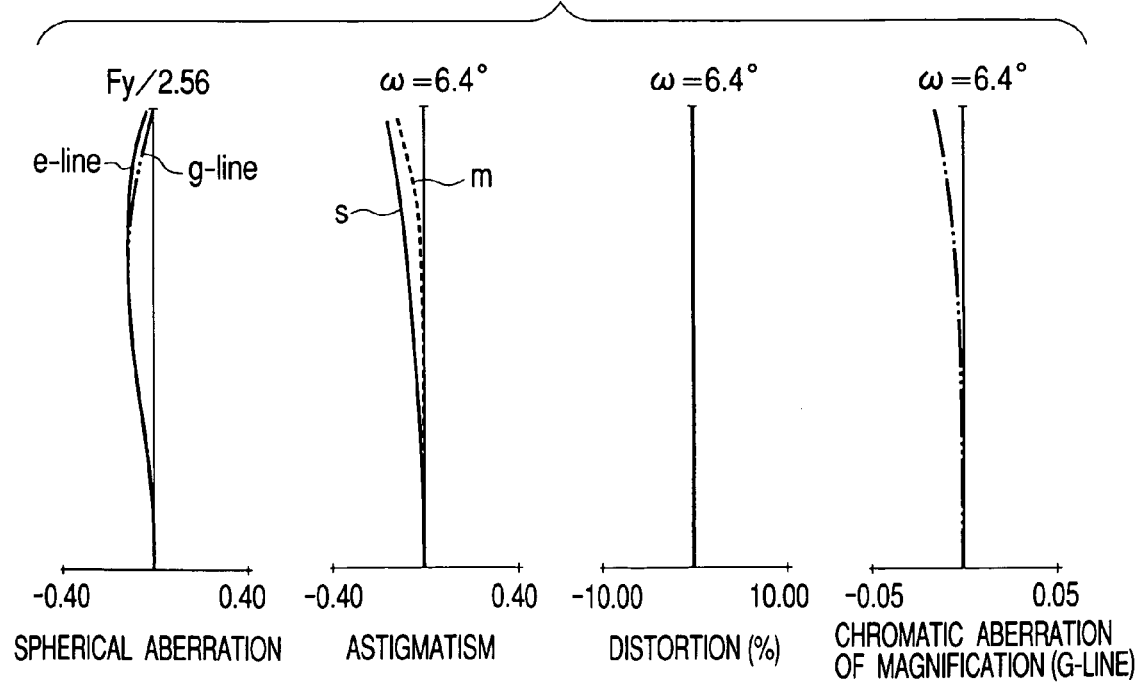
FIG. 12 is a longitudinal aberration view of Numerical Example 2 in the Y direction under a condition in which fx is 37.3 mm, fy is 49.3 mm and the object distance is 2.5 m.
Figure 13:
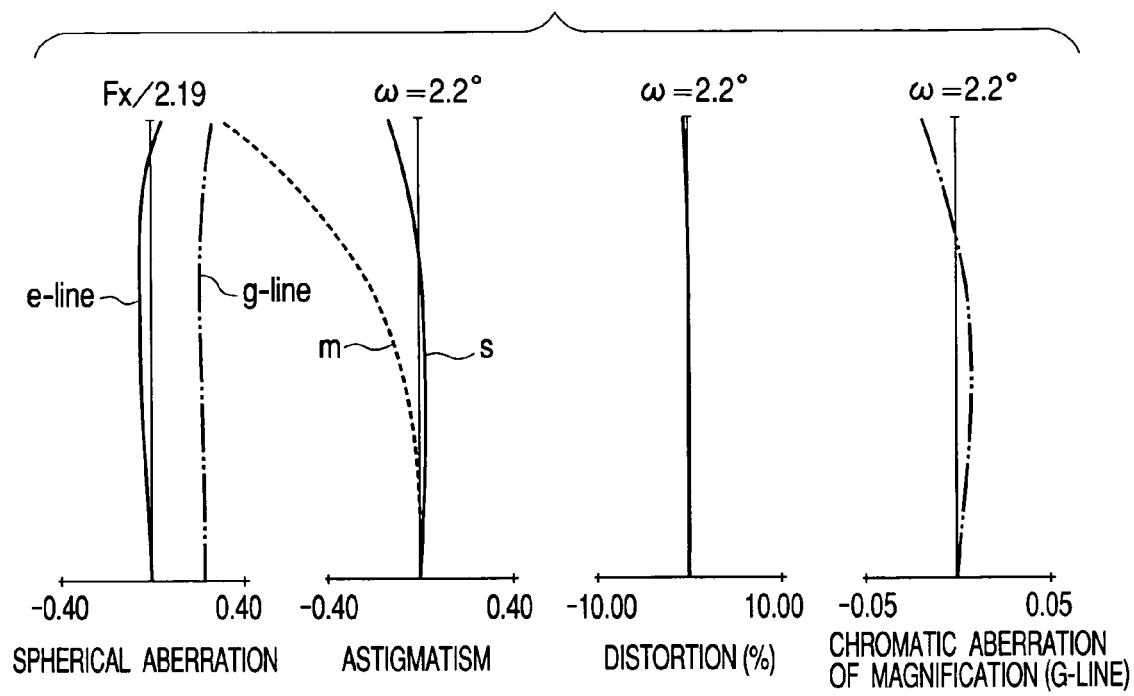
FIG. 13 is a longitudinal aberration view of Numerical Example 2 in the X direction under a condition in which fx is 142.9 mm, fy is 189.0 mm and the object distance is 2.5 m.
Figure 14:
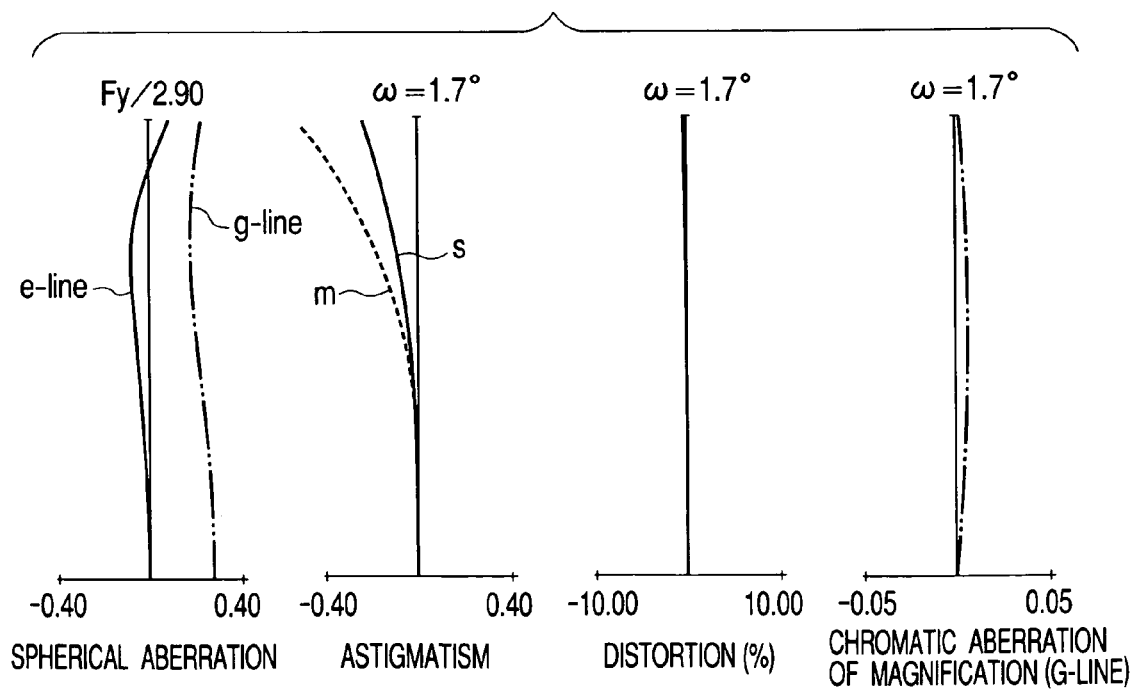
FIG. 14 is a longitudinal aberration view of Numerical Example 2 in the Y direction under a condition in which fx is 142.9 mm, fy is 189.0 mm and the object distance is 2.5 m.

FIG. 8 is a cross sectional view of lenses in a Y direction and in an X direction when an anamorphic converter is inserted in Numerical Example 2 of the present invention. In addition, a cross sectional view before insertion of the anamorphic converter in Numerical Example 2 is shown in FIG. 20.

In FIG. 8, reference symbol F designates a group of front lenses having a positive refracting power as a first group. Reference symbol V designates a variator for the variable power having a negative refracting power as a second group. The variator V is monotonously moved on an optical axis to an image surface side to thereby carry out the variable power from the wide angle end to the telescopic end. Reference symbol C designates a compensator having a negative refracting power as a third group. The compensator C is nonlinearly moved on the optical axis to an object side while describing a projection locus in order to compensate for the fluctuation of an image surface following the variable power. The variator V and the compensator C constitute the variable power system.

Reference symbol SP designates a stop, and reference symbol R designates a group of variable power semi-fixed relay lenses having a positive refracting power as a fourth group. Reference symbol P designates a color separation prism, an optical filter or the like which is shown in the form of a glass block in the figure.

The focusing group F, the variator V, the compensator C and the relay group R constitute an imaging optical system.

Next, a description will hereinafter be given with respect to the feature of the anamorphic converter AC in Numerical Example 2. The anamorphic converter AC includes: a first group G1 of lenses having a negative refracting power; a second group G2 of lenses having two cylindrical lenses; and a third group G3 of lenses having an image formation function and a positive refracting power. Each of the cylindrical lenses belonging to the second group G2 has a curvature only in the Y direction, and has an effect of lengthening a focal length in the Y direction. The aspect ratio AR1 of the image pickup range in the image surface of the imaging optical system, and the aspect ratio AR2 of the effective area of the image pickup means are as follows:

$$AR1=2.35 \quad (26)$$

$$AR2=1.78 \quad (27)$$

Also, the conversion magnification $\beta x$ in the X direction, and the conversion magnification $\beta y$ in the Y direction are as follows:

$$\beta x=0.947 \quad (28)$$

$$\beta y=1.252 \quad (29)$$

Consequently, the values of the conditional equations are obtained as follows:

$$(AR1 \times \beta x)/(AR2 \times \beta y)=1.00 \quad (30)$$

$$(AR2^2+1) \times \beta y^2/(AR1^2+1)=1.00 \quad (31)$$

Thus, these values meet the conditions of Equations 1 and 11. Consequently, the anamorphic converter of a built-in converter system is attained which is excellent in the optical performance and free from the eclipse.

In addition, in case of the single anamorphic converter AC, a focal length fACx in the X direction, and a focal length fACy in the Y direction are expressed as follows:

$$fACx=+36.688 \quad (32)$$

$$fACy=+81.334 \quad (33)$$

Thus, both of them have the positive refracting powers and hence meet the condition which is required for the anamorphic converter of the present invention.

FIGS. 8 to 14 are longitudinal aberration views in the X direction or in the Y direction in Numerical Example 2. In these figures, fx indicates a focal length in the X direction, fy indicates a focal length in the Y direction, Fx indicates an F number in the X direction, Fy indicates an F number in the Y direction, and 2ω indicates a field angle.

In Numerical Example 2, the following values are obtained:

fx=9.74 to 142.93 fy=12.88 to 188.96

Fx=1.94 to 2.19

Fy=2.56 to 2.90

2ω=56.2 to 4.2 degrees

| r1 = | 1169.481 | d1 = | 2.40 | n1 = | 1.81265 | v1 = | 25.4 |
| r2 = | 98.429 | d2 = | 10.83 | n2 = | 1.51825 | v2 = | 64.2 |
| r3 = | −265.170 | d3 = | 0.20 | | | | |
| r4 = | 124.037 | d4 = | 8.29 | n3 = | 1.60548 | v3 = | 60.7 |

-continued

| | | | | | | | |
|---|---|---|---|---|---|---|---|
| r5 = | −281.395 | d5 = | 0.20 | | | | |
| r6 = | 51.797 | d6 = | 6.46 | n4 = | 1.64254 | v4 = | 60.1 |
| r7 = | 97.915 | d7 = | Variable | | | | |
| r8 = | 71.045 | d8 = | 0.90 | n5 = | 1.82017 | v5 = | 46.6 |
| r9 = | 17.601 | d9 = | 6.01 | | | | |
| r10 = | −21.542 | d10 = | 0.90 | n6 = | 1.77621 | v6 = | 49.6 |
| r11 = | 18.397 | d11 = | 4.63 | n7 = | 1.85501 | v7 = | 23.9 |
| r12 = | −4295.134 | d12 = | Variable | | | | |
| r13 = | −27.245 | d13 = | 0.90 | n8 = | 1.79013 | v8 = | 44.2 |
| r14 = | 31.613 | d14 = | 3.84 | n9 = | 1.85501 | v9 = | 23.9 |
| r15 = | 1125.345 | d15 = | Variable | | | | |
| r16 = | 0.000 (Stop) | d16 = | 1.60 | | | | |
| r17 = | 10000.000 | d17 = | 4.02 | n10 = | 1.73234 | v10 = | 54.7 |
| r18 = | −32.342 | d18 = | 0.20 | | | | |
| r19 = | 107.938 | d19 = | 3.60 | n11 = | 1.48915 | v11 = | 70.2 |
| r20 = | −121.402 | d20 = | 0.20 | | | | |
| r21 = | 37.891 | d21 = | 7.17 | n12 = | 1.48915 | v12 = | 70.2 |
| r22 = | −36.452 | d22 = | 1.20 | n13 = | 1.83932 | v13 = | 37.2 |
| r23 = | 177.431 | d23 = | 30.00 | | | | |
| r24 = | 48.564 | d24 = | 4.26 | n14 = | 1.48915 | v14 = | 70.2 |
| r25 = | −193.706 | d25 = | 0.20 | | | | |
| r26 = | −210.911 | d26 = | 1.20 | n15 = | 1.83932 | v15 = | 37.2 |
| r27 = | 39.960 | d27 = | 6.49 | n16 = | 1.48915 | v16 = | 70.2 |
| r28 = | −33.683 | d28 = | 0.20 | | | | |
| r29 = | 43.464 | d29 = | 6.21 | n17 = | 1.53430 | v17 = | 48.8 |
| r30 = | −30.063 | d30 = | 1.20 | n18 = | 1.80811 | v18 = | 46.6 |
| r31 = | 113.246 | d31 = | 0.20 | | | | |
| r32 = | 56.783 | d32 = | 2.98 | n19 = | 1.55098 | v19 = | 45.8 |
| r33 = | −10000.000 | d33 = | 2.40 | | | | |
| r34 = | −406.116 | d34 = | 1.30 | n20 = | 1.88815 | v20 = | 40.8 |
| r35 = | 27.624 | d35 = | 5.09 | | | | |
| r36 = | −34.561 | d36 = | 1.30 | n21 = | 1.88815 | v21 = | 40.8 |
| r37 = | 376.875 | d37 = | 2.39 | | | | |
| r38 = | 125.238 | d38 = | 6.87 | n22 = | 1.81264 | v22 = | 25.4 |
| r39 = | −35.789 | d39 = | 0.20 | | | | |
| r40 = | 51.579 | d40 = | 5.00 | n23 = | 1.73234 | v23 = | 54.7 |
| r41 = | −179.240 | d41 = | 10.68 | | | | |
| r42 = | −89.456 | d42 = | 1.50 | n24 = | 1.83932 | v24 = | 37.2 |
| r43 = | 57.960 | d43 = | 2.62 | | | | |
| r44 = | 56.863 | d44 = | 8.20 | n25 = | 1.48915 | v25 = | 70.2 |
| r45 = | −31.532 | d45 = | 1.30 | n26 = | 1.81264 | v26 = | 25.4 |
| r46 = | −88.322 | d46 = | 0.20 | | | | |
| r47 = | 41.080 | d47 = | 6.28 | n27 = | 1.48915 | v27 = | 70.2 |
| r48 = | −95.210 | d48 = | 2.00 | | | | |
| r49 = | 0.000 | d49 = | 30.00 | n28 = | 1.60718 | v28 = | 38.0 |
| r50 = | 0.000 | d50 = | 16.20 | n29 = | 1.51825 | v29 = | 64.2 |
| r51 = | 0.000 | | | | | | |

*r40 to r43 indicate the cylindrical lenses. A curvature in the X direction is zero.

| Focal length | | | |
|---|---|---|---|
| fx | 9.74 | 37.31 | 142.93 |
| fy | 12.88 | 49.33 | 188.96 |
| Variable spacing | | | |
| d7 | 0.39 | 33.92 | 49.55 |
| d12 | 52.91 | 14.8 | 3.78 |
| d15 | 1.55 | 6.13 | 1.53 |

Third Embodiment

This embodiment is concerned with an anamorphic converter of a type having primary image formation.

Figure 24:
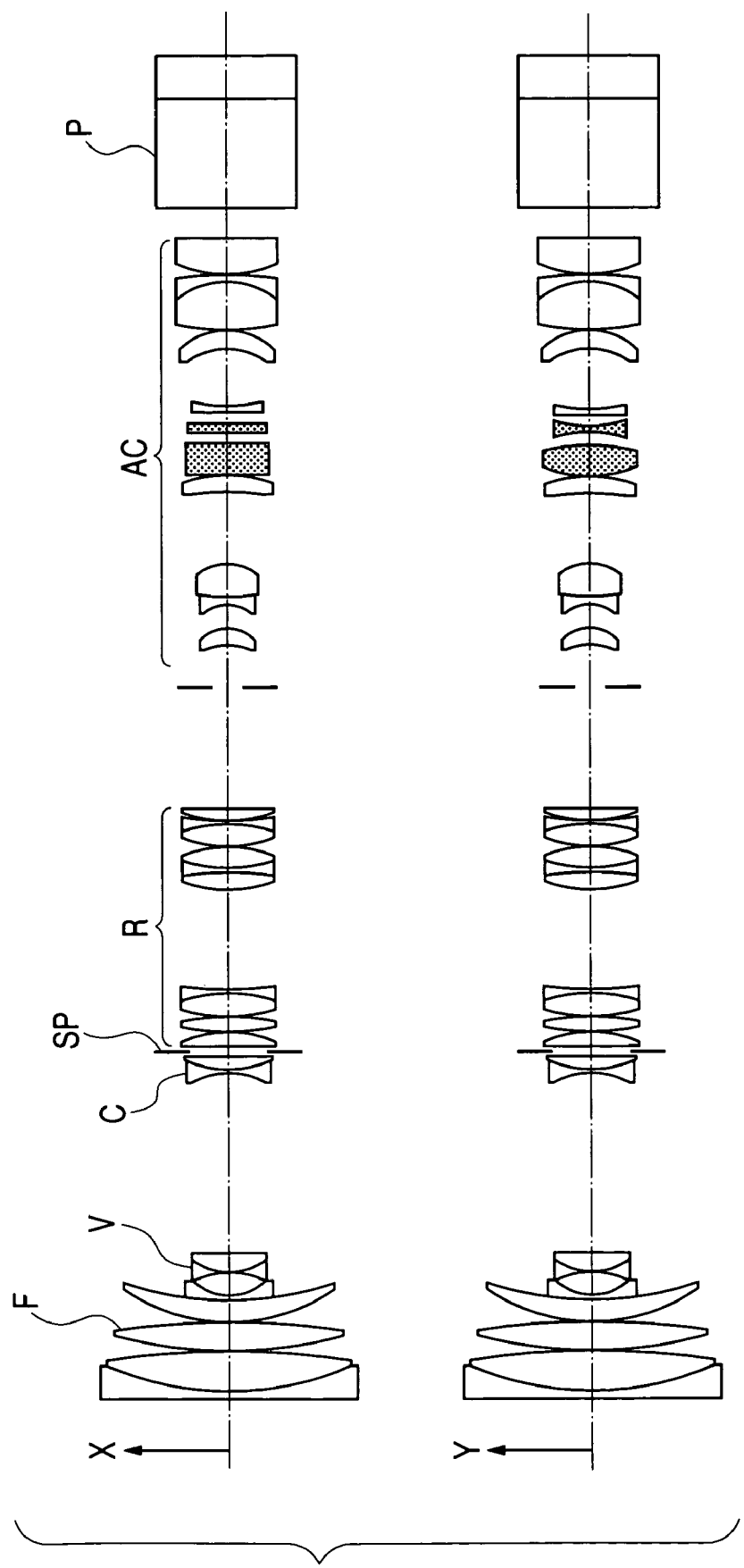
FIG. 24 is a cross sectional view in a wide angle end of Numerical Example 3 in the X direction and in the Y direction.
Figure 25:
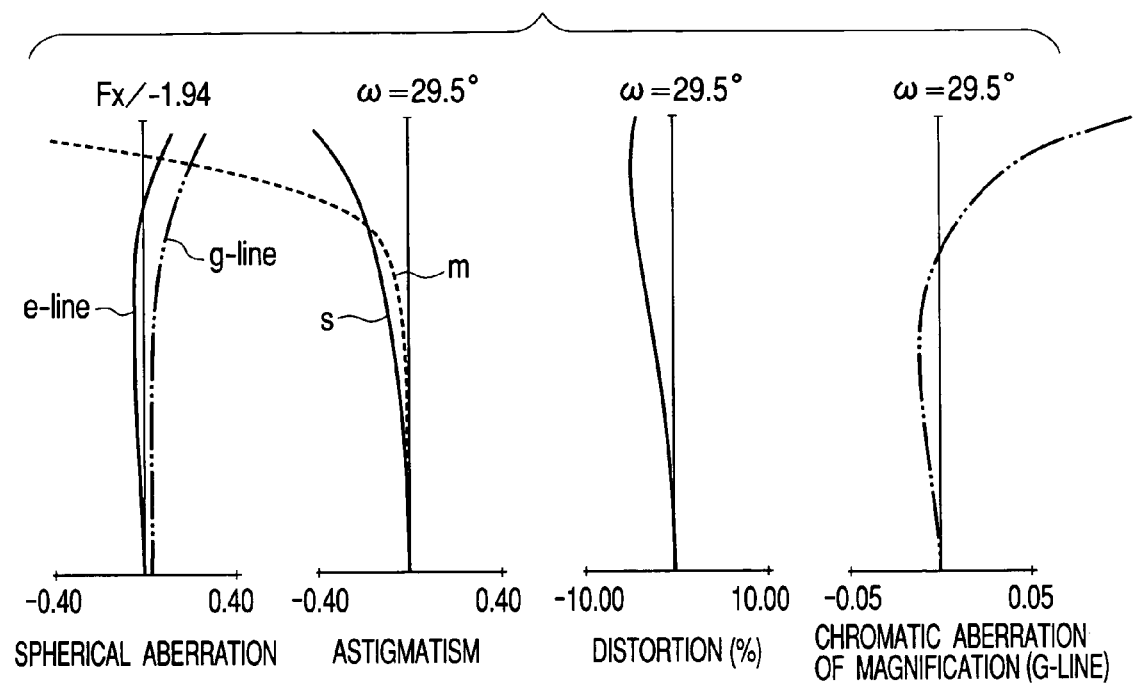
FIG. 25 is a longitudinal aberration view of Numerical Example 3 in the X direction under a condition in which fx is −9.7 mm, fy is −12.9 mm and the object distance is 2.5 m.
Figure 26:
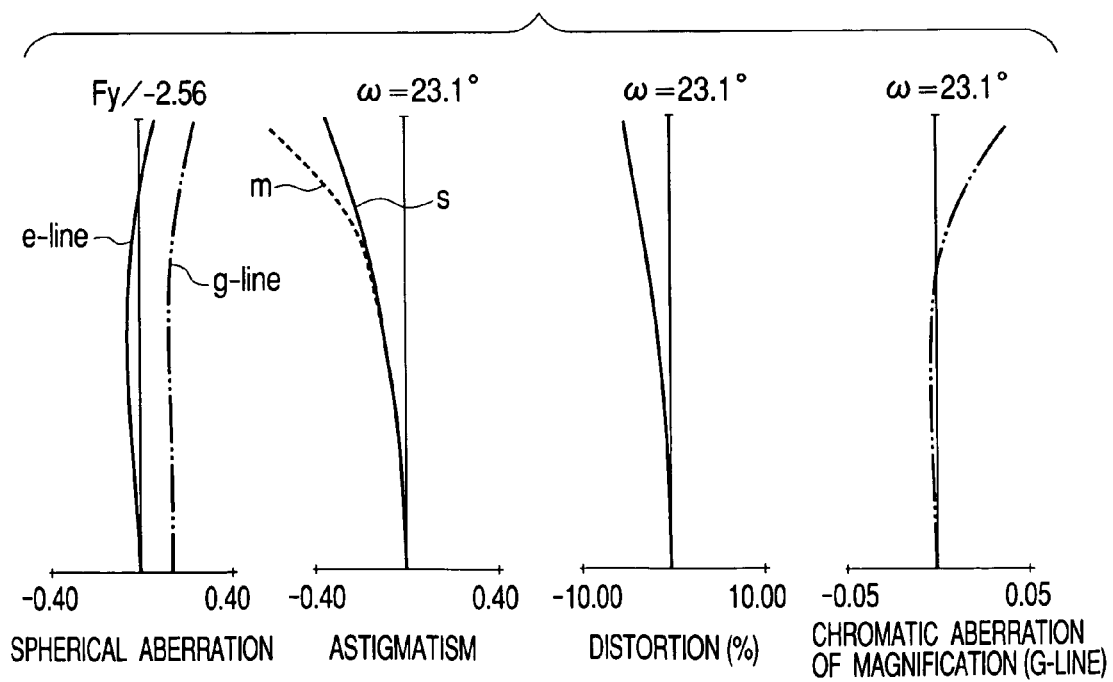
FIG. 26 is a longitudinal aberration view of Numerical Example 3 in the Y direction under a condition in which fx is −9.7 mm, fy is −12.9 mm and the object distance is 2.5 m.
Figure 27:
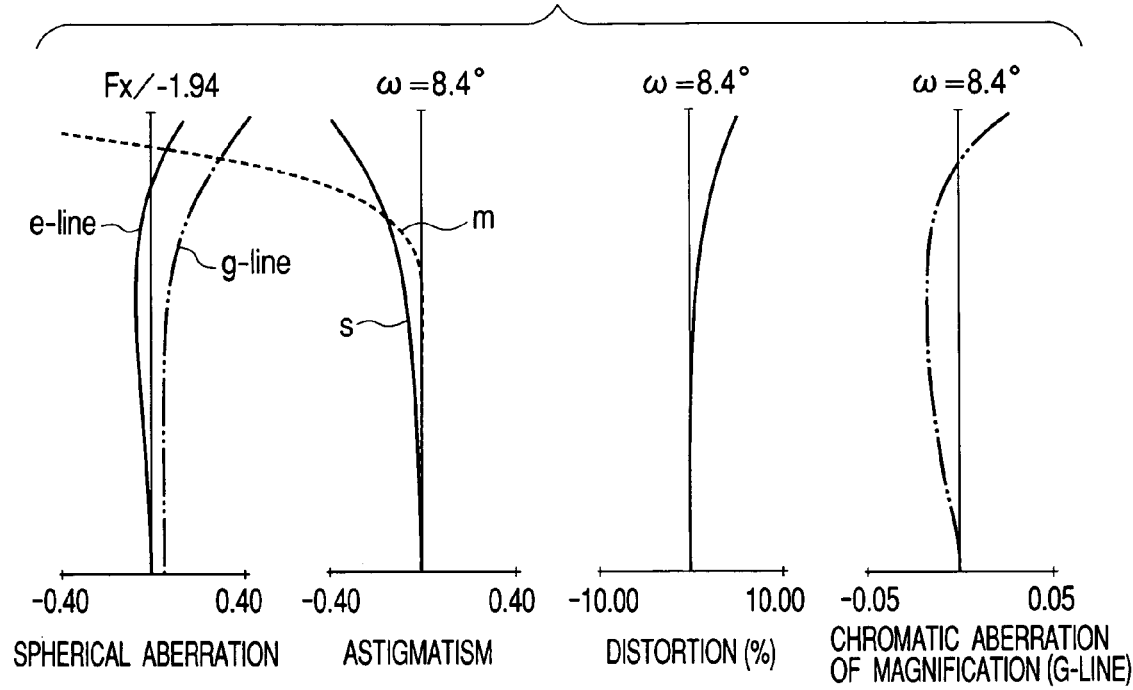
FIG. 27 is a longitudinal aberration view of Numerical Example 3 in the X direction under a condition in which fx is −37.3 mm, fy is −49.3 mm and the object distance is 2.5 m.
Figure 28:
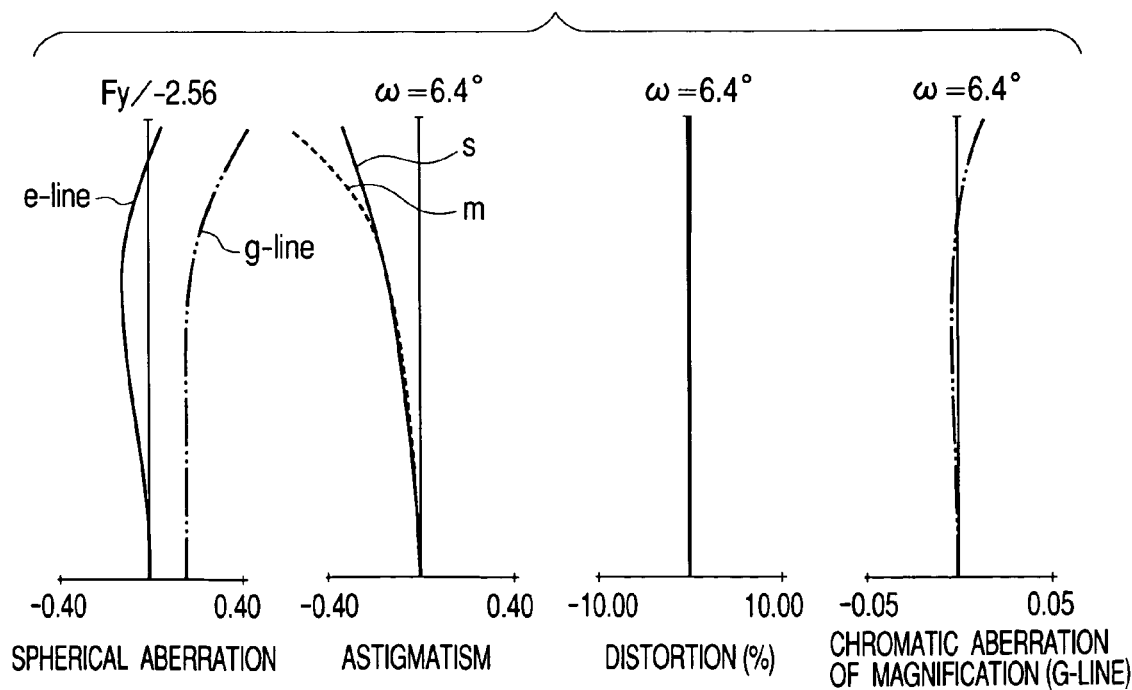
FIG. 28 is a longitudinal aberration view of Numerical Example 3 in the Y direction under a condition in which fx is −37.3 mm, fy is −49.3 mm and the object distance is 2.5 m.
Figure 29:
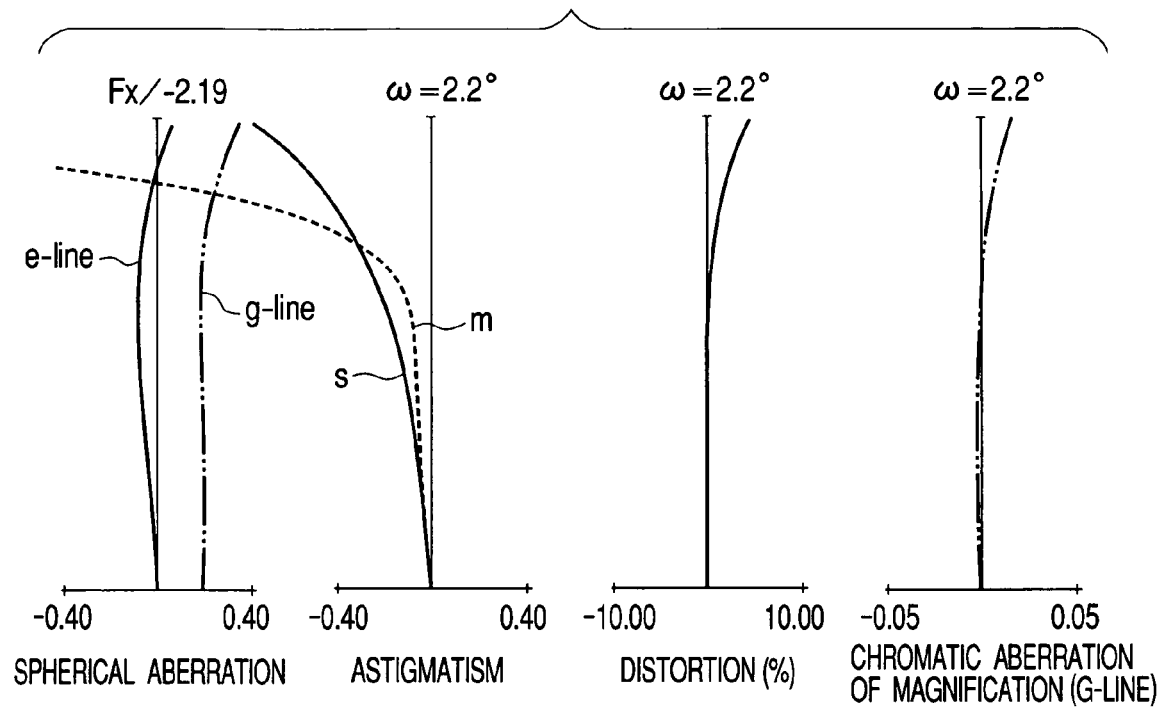
FIG. 29 is a longitudinal aberration view of Numerical Example 3 in the X direction under a condition in which fx is −142.9 mm, fy is −189.0 mm and the object distance is 2.5 m.
Figure 30:
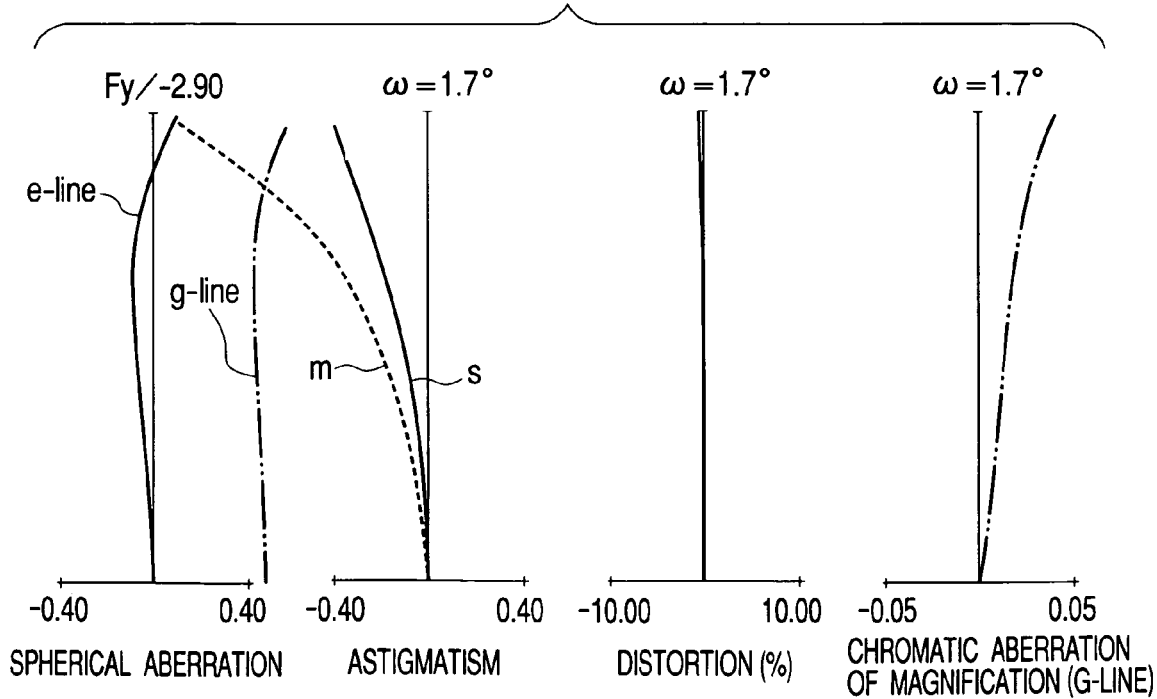
FIG. 30 is a longitudinal aberration view of Numerical Example 3 in the Y direction under a condition in which fx is −142.9 mm, fy is −189.0 mm and the object distance is 2.5 m.
Figure 31:
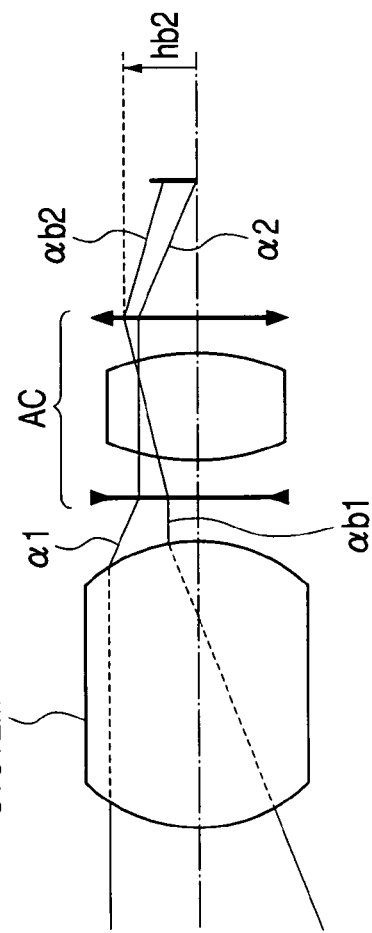
FIG. 31 is a conceptual view of an anamorphic converter of a type having no primary image formation.

FIG. 24 is a cross sectional view of lenses in a Y direction and in an X direction when an anamorphic converter is inserted in Numerical Example 3 of the present invention. In addition, a cross sectional view before insertion of the anamorphic converter in Numerical Example 3 is shown in FIG. 20.

In FIG. 24, reference symbol F designates a group of front lenses having a positive refracting power as a first group. Reference symbol V designates a variator for the variable power having a negative refracting power as a second group. The variator V is monotonously moved on an optical axis to an image surface side to thereby carry out the variable power from the wide angle end to the telescopic end. Reference symbol C designates a compensator having a negative refracting power as a third group. The compensator C is nonlinearly moved on the optical axis to an object side while describing a projection locus in order to compensate for the fluctuation of an image surface following the variable power. The variator V and the compensator C constitute the variable power system.

Reference symbol SP designates a stop, and reference symbol R designates a group of variable power semi-fixed relay lenses having a positive refracting power as a fourth group. Reference symbol P designates a color separation prism, an optical filter or the like which is shown in the form of a glass block in the figure.

The focusing group F, the variator V, the compensator C and the relay group R constitute an imaging optical system.

Next, a description will hereinafter be given with respect to the feature of the anamorphic converter AC in Numerical Example 3. The anamorphic converter AC includes: a first group G1 of lenses having a negative refracting power; a second group G2 of lenses having two cylindrical lenses; and a third group G3 of lenses having an image formation function and a positive refracting power. Each of the cylindrical lenses belonging to the second group G2 has a curvature only in the Y direction, and has an effect of lengthening a focal length in the Y direction. The aspect ratio AR1 of the image pickup range in the image surface of the imaging optical system, and the aspect ratio AR2 of the effective area of the image pickup means are as follows:

$$AR1=2.35 \quad (34)$$

$$AR2=1.78 \quad (35)$$

Also, the conversion magnification βx in the X direction, and the conversion magnification βy in the Y direction are as follows:

$$\beta x=-0.947 \quad (36)$$

$$\beta y=-1.252 \quad (37)$$

Consequently, the values of the conditional equations are obtained as follows:

$$(AR1 \times \beta x)/(AR2 \times \beta y)=1.00 \quad (38)$$

$$(AR2^2+1) \times \beta y^2/(AR1^2+1)=1.00 \quad (39)$$

Thus, these values meet the conditions of Equations 1 and 11. Consequently, the anamorphic converter of a built-in converter system is attained which is excellent in the optical performance and free from the eclipse.

In addition, in case of the single anamorphic converter AC, a focal length fACx in the X direction, and a focal length fACy in the Y direction are expressed as follows:

$$fACx=-684.6 \quad (40)$$

$$fACy=-1300.2 \quad (41)$$

Thus, they have large absolute values and small refracting powers, nearly achieving telecentric on the both sides.

FIGS. 25 to 30 are longitudinal aberration views in the X direction or in the Y direction in Numerical Example 3. In these figures, fx indicates a focal length in the X direction, fy indicates a focal length in the Y direction, Fx indicates an F number in the X direction, Fy indicates an F number in the Y direction, and 2ω indicates a field angle.

In Numerical Example 3, the following values are obtained:

$$fx=-9.74 \text{ to } -142.93$$

$$fy=-12.88 \text{ to } -188.96$$

$$Fx=-1.94 \text{ to } -2.19$$

$$Fy=-2.56 \text{ to } -2.90$$

$$2\omega=56.2 \text{ to } 4.2 \text{ degrees}$$

| | | | | | | | |
|---|---|---|---|---|---|---|---|
| r1 = | 1169.481 | d1 = | 2.40 | n1 = | 1.81265 | v1 = | 25.4 |
| r2 = | 98.429 | d2 = | 10.83 | n2 = | 1.51825 | v2 = | 64.2 |
| r3 = | −265.170 | d3 = | 0.20 | | | | |
| r4 = | 124.037 | d4 = | 8.29 | n3 = | 1.60548 | v3 = | 60.7 |
| r5 = | −281.395 | d5 = | 0.20 | | | | |
| r6 = | 51.797 | d6 = | 6.46 | n4 = | 1.64254 | v4 = | 60.1 |
| r7 = | 97.915 | d7 = | Variable | | | | |
| r8 = | 71.045 | d8 = | 0.90 | n5 = | 1.82017 | v5 = | 46.6 |
| r9 = | 17.601 | d9 = | 6.01 | | | | |
| r10 = | −21.542 | d10 = | 0.90 | n6 = | 1.77621 | v6 = | 49.6 |
| r11 = | 18.397 | d11 = | 4.63 | n7 = | 1.85501 | v7 = | 23.9 |
| r12 = | −4295.134 | d12 = | Variable | | | | |
| r13 = | −27.245 | d13 = | 0.90 | n8 = | 1.79013 | v8 = | 44.2 |
| r14 = | 31.613 | d14 = | 3.84 | n9 = | 1.85501 | v9 = | 23.9 |
| r15 = | 1125.345 | d15 = | Variable | | | | |
| r16 = | 0.000 (Stop) | d16 = | 1.60 | | | | |
| r17 = | 10000.000 | d17 = | 4.02 | n10 = | 1.73234 | v10 = | 54.7 |
| r18 = | −32.342 | d18 = | 0.20 | | | | |
| r19 = | 107.938 | d19 = | 3.60 | n11 = | 1.48915 | v11 = | 70.2 |
| r20 = | −121.402 | d20 = | 0.20 | | | | |
| r21 = | 37.891 | d21 = | 7.17 | n12 = | 1.48915 | v12 = | 70.2 |
| r22 = | −36.452 | d22 = | 1.20 | n13 = | 1.83932 | v13 = | 37.2 |
| r23 = | 177.431 | d23 = | 30.00 | | | | |
| r24 = | 48.564 | d24 = | 4.26 | n14 = | 1.48915 | v14 = | 70.2 |
| r25 = | −193.706 | d25 = | 0.20 | | | | |
| r26 = | −210.911 | d26 = | 1.20 | n15 = | 1.83932 | v15 = | 37.2 |
| r27 = | 39.960 | d27 = | 6.49 | n16 = | 1.48915 | v16 = | 70.2 |
| r28 = | −33.683 | d28 = | 0.20 | | | | |
| r29 = | 43.464 | d29 = | 6.21 | n17 = | 1.53430 | v17 = | 48.8 |
| r30 = | −30.063 | d30 = | 1.20 | n18 = | 1.80811 | v18 = | 46.6 |
| r31 = | 113.246 | d31 = | 0.20 | | | | |
| r32 = | 56.783 | d32 = | 2.98 | n19 = | 1.55098 | v19 = | 45.8 |
| r33 = | −10000.000 | d33 = | 46.70 | | | | |
| r34 = | −33.609 | d34 = | 5.65 | n20 = | 1.73234 | v20 = | 54.7 |
| r35 = | −11.157 | d35 = | 7.28 | | | | |
| r36 = | −7.998 | d36 = | 1.70 | n21 = | 1.67765 | v21 = | 32.1 |
| r37 = | 58.541 | d37 = | 9.27 | n22 = | 1.62285 | v22 = | 60.3 |
| r38 = | −14.431 | d38 = | 20.48 | | | | |
| r39 = | −158.737 | d39 = | 0.54 | n23 = | 1.69979 | v23 = | 55.5 |
| r40 = | −48.696 | d40 = | 0.15 | | | | |
| r41 = | 33-722 | d41 = | 3.29 | n24 = | 1.73234 | v24 = | 54.7 |

-continued

| | | | | | | |
|---|---|---|---|---|---|---|
| r42 = | −43.591 | d42 = | 3.69 | | | |
| r43 = | −29.003 | d43 = | 1.58 | n25 = 1.83932 | v25 = 37.2 | |
| r44 = | 52.354 | d44 = | 3.63 | | | |
| r45 = | 1000.000 | d45 = | 1.70 | n26 = 1.52033 | v26 = 58.9 | |
| r46 = | 43.914 | d46 = | 15.60 | | | |
| r47 = | −25.525 | d47 = | 5.25 | n27 = 1.73234 | v27 = 54.7 | |
| r48 = | −23.578 | d48 = | 0.20 | | | |
| r49 = | 59.012 | d49 = | 13.97 | n28 = 1.49845 | v28 = 83.5 | |
| r50 = | −22.890 | d50 = | 1.70 | n29 = 1.83642 | v29 = 35.0 | |
| r51 = | −95.543 | d51 = | 0.20 | | | |
| r52 = | 31.544 | d52 = | 10.38 | n30 = 1.62286 | v30 = 60.3 | |
| r53 = | −1000.000 | d53 = | 6.55 | | | |
| r54 = | 0.000 | d54 = | 33.00 | n31 = 1.61170 | v31 = 46.4 | |
| r55 = | 0.000 | d55 = | 13.20 | n32 = 1.51825 | v32 = 64.2 | |
| r56 = | 0.000 | d56 = | | | | |

*r41 to r44 indicate the cylindrical lenses. A curvature in the X direction is zero.

| Focal length | | | |
|---|---|---|---|
| fx | −9.74 | −37.31 | −142.93 |
| fy | −12.88 | −49.33 | −188.96 |
| Variable spacing | | | |
| d7 | 0.39 | 33.92 | 49.55 |
| d12 | 52.91 | 14.8 | 3.78 |
| d15 | 1.55 | 6.13 | 1.53 |

As described above, in the anamorphic converter disposed on an image side of the imaging optical system, conversion magnifications of the cross section X and the cross section Y containing an optical axis are regulated and the lens structure is appropriately set, whereby it is possible to attain the anamorphic converter of the rear converter system which is especially most suitable for a converter for the cinema and excellent in optical performance.

(Operation 2)

Aspect 10

An anamorphic converter according to the present invention includes at least an anamorphic lens disposed on an image side of an imaging optical system, and the anamorphic converter is characterized in that when a focal length conversion magnification in an arbitrary cross section X containing an optical axis of the anamorphic converter is assigned $\beta x$, a focal length conversion magnification in a cross section Y containing an optical axis and being perpendicular to the cross section X is assigned $\beta y$, an aspect ratio of an image pickup range in an image surface of the imaging optical system is assigned AR1, and an aspect ratio of an effective area of image pickup means is assigned AR2, the following relationships are established:

$$0.9 < (AR1 \times \beta x)/(AR2 \times \beta y) < 1.1 \quad (1)$$

$$(AR2^2 + 1) \times \beta y^2/(AR1^2 + 1) < 1 \quad (2)$$

Aspect 10 is concerned with a condition under which the conversion magnification of the anamorphic converter is suitably-prescribed to thereby carry out the suitable conversion of an aspect ratio without generation of an eclipse.

Figure 47:
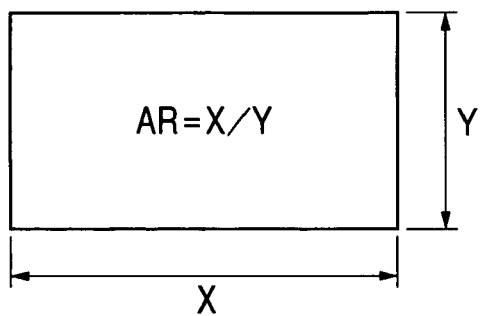
FIG. 47 is a conceptual diagram of an aspect ratio.

Equation 1 exhibits with a condition under which the suitable aspect ratio conversion is carried out. When as shown in FIG. 47, a transverse length of an image surface is assigned X, a longitudinal length of the image surface is assigned Y, an aspect ratio AR is expressed by Equation 3:

$$AR = X/Y \quad (3)$$

Figure 48:
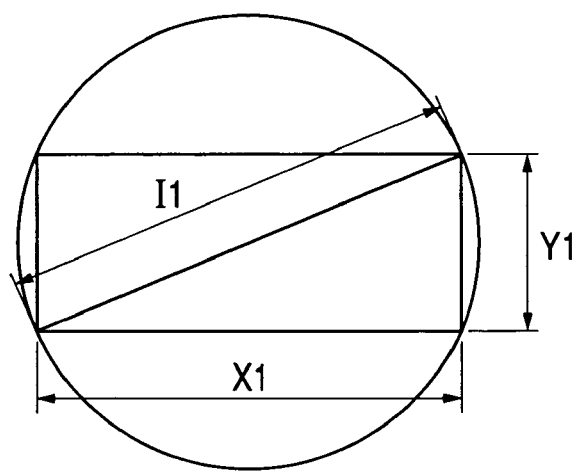
FIG. 48 is a conceptual diagram of an image circle and an image pickup range in an image surface of a main lens.
Figure 49:
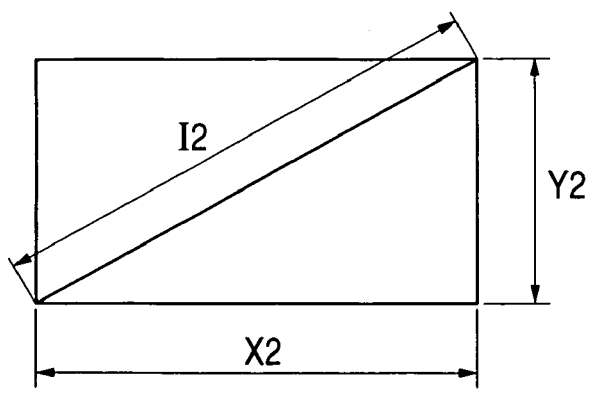
FIG. 49 is a conceptual diagram of an image circle and an image pickup range after conversion made by a converter of the present invention.

A schematic diagram of an image pickup range of an imaging optical system is shown in FIG. 48, and a schematic diagram of an image pickup range of an image pickup means is shown in FIG. 49. When from FIG. 48, a transverse length of a size of an effective picture of the image pickup range in the image surface of the imaging optical system is assigned X1, a longitudinal length of the size of that effective picture is assigned Y1, and an aspect ratio is assigned AR1, and from FIG. 17, a transverse length of the image pickup range of the image pickup means is assigned X2, a longitudinal length of that image pickup range is assigned Y2, and an aspect ratio is assigned AR2, a ratio of AR1/AR2 is expressed by Equation 4:

$$AR1/AR2 = (X1 \times Y2)/(X2 \times Y1) \quad (4)$$

Figure 50:
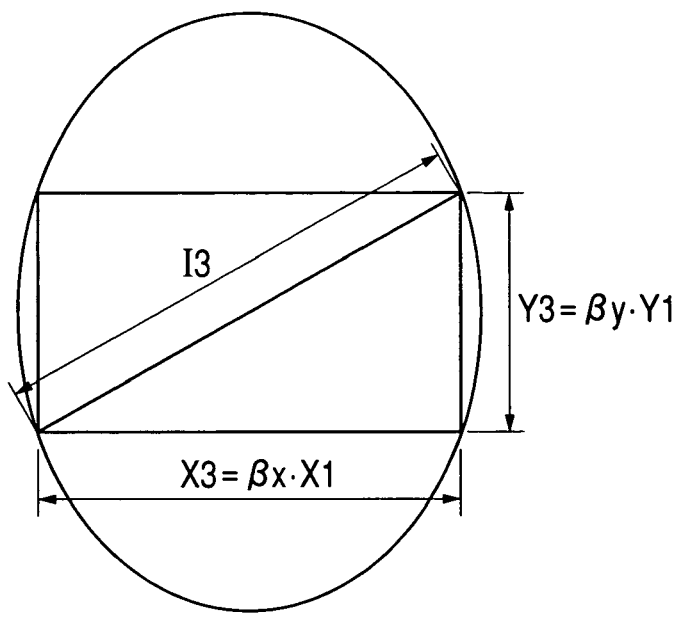
FIG. 50 is a conceptual diagram of an effective area of an image pickup means.

In addition, a conceptual diagram of an image pickup range after the conversion of the aspect ratio made by the anamorphic converter is shown in FIG. 50. In order that the aspect ratio may be suitably converted, it is desirable that a conversion magnifications $\beta x$ of the anamorphic converter in a transverse direction, and a conversion magnification $\beta y$ of the anamorphic converter in a longitudinal direction are expressed by Equations 5 and 6, respectively:

$$\beta x = X2/X1 \quad (5)$$

$$\beta y = Y2/Y1 \quad (6)$$

From Equations 6 to 8, the condition for ideal aspect ratio conversion is expressed as follows:

$$(AR1 \times \beta x)/(AR2 \times \beta y) = 1 \quad (7)$$

Since in actual, an influence of an error of about 10% is visually small, Equation 1 is met to thereby allow the suitable aspect ratio conversion to be realized.

Equation 2 exhibits a condition under which an image pickup means having a width across corners smaller than an image size of the main lens is used. In a case where the converter is normally disposed on an image side of the main lens, a transverse aberration of the main lens is magnified at a conversion magnification of the converter. In addition, since the image circle is regulated on the basis of an effective diameter on the main lens side, even if the conversion magnification is made smaller than 1, the promotion of the wide angle can not be realized and hence the eclipse is generated in the periphery of the picture.

As shown in FIG. 48, the image circle I1 of the main lens is expressed by Equation 8:

$$I1 = (X1^2 + Y1^2)^{\frac{1}{2}} \\ = Y1 \times (AR1^2 + 1)^{\frac{1}{2}} \quad (8)$$

In addition, as shown in FIG. 49, the width I2 across corners of the image pickup means is expressed by Equation (9):

$$I2 = (X2^2 + Y2^2)^{\frac{1}{2}} \\ = Y2 \times (AR2^2 + 1)^{\frac{1}{2}} \quad (9)$$

As shown in FIG. 50, the width I3 across corners of the image an aspect ratio of which is converted by the anamorphic converter is expressed as follows:

$$I3 = \{(\beta x \times X1)^2 + (\beta y \times Y1)^2\}^{\frac{1}{2}} \\ = \beta y \times Y1 \times (AR2^2 + 1)^{\frac{1}{2}} \quad (10)$$

Thus, in order that the width across corners of the image after conversion of the aspect ratio may agree with the image size of the main lens, a relationship of I3=I1 must be established. Consequently, from Equations 8 and 10, Equations 11 and 11' are obtained:

$$I3^2/I1^2 = 1 \quad (11)$$

$$\{y^2 \times (AR2^2+1)\}/(AR1^2+1) = 1 \quad (11')$$

Here, when the width I2 across corners of the image pickup means is smaller than the image size I1 of the main lens, even if a left number of Equation 11' is smaller than 1, no eclipse is generated. Consequently, Equation (2) is met, whereby it is possible to attain the anamorphic converter most suitable for a case where there is used the image pickup means having a width across corners smaller than the image size of the main lens. In addition, since the conversion magnification of the converter can be reduced, the magnification of the aberration of the main lens can be suppressed to make the optical performance excellent. Note that in the present invention, the foregoing is also applied to a case where the use conditions such as zooming, focusing and a stopatic operation are restricted to substantially magnify the image size of the main lens in using the optical system.

Figure 51:
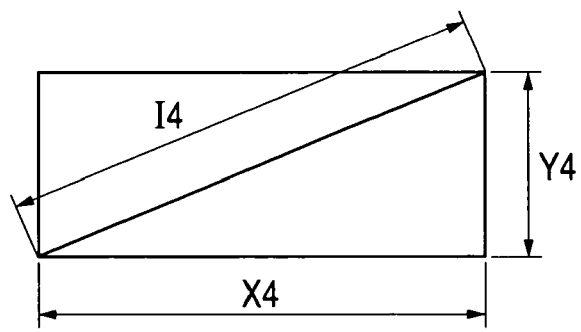
FIG. 51 is a conceptual diagram of a display area of an output image in projecting an image.

Moreover, a conceptual diagram of an output image in projecting an image is shown in FIG. 51. It is necessary that in projecting an image, the conversion of the aspect ratio reverse to that in capturing an image is carried out to return the current aspect ratio back to the original aspect ratio. Consequently, a transverse length X4 and a longitudinal length Y4 in FIG. 20 are expressed as follows, respectively:

$$X4 = \beta x' \times X2 \quad (12)$$

$$Y4 = \beta y' \times Y2 \quad (13)$$

Here, the conversion magnifications βx' and βy', when an arbitrary constant is assigned m, are expressed as follows, respectively:

$$\beta x' = m/\beta x \quad (14)$$

$$\beta y' = m/\beta y \quad (15)$$

Aspect 11

There is provided an anamorphic converter according to Aspect 10, in which the anamorphic lens is provided within an afocal group.

Aspect 12

There is provided an anamorphic converter according to Aspect 10 or 11, characterized in that both βx and βy are positive values, and the anamorphic converter has positive refracting powers in the cross section X and in the cross section Y. Aspect 13

There is provided an anamorphic converter according to Aspect 12, characterized in that the anamorphic converter further includes, from the imaging optical system side in a stated order, a first group of lenses having a negative refracting power, a second group of lenses including at least two or more anamorphic lenses, and a third group of lenses having a positive refracting power.

Aspect 12 is concerned with a condition under which the power disposition of the anamorphic converter for carrying out the aspect ratio conversion without the primary image formation by an imaging optical system is suitably prescribed to make the optical performance excellent.

In order that the primary imaging may be prevented from being made, it is necessary that both the focal length conversion magnifications βx and βy are positive values. Moreover, the cross section X and the cross section Y have positive refracting powers, respectively, to thereby reduce the effect of lengthening a focal length. As a result, there is obtained the anamorphic converter of a type having no primary image formation in which for the single imaging optical system, the field angle is prevented from becoming too narrow, and the exit pupil can be held for long.

In Aspect 13, the suitable structure in Aspect 12 is prescribed. In order that the cross section X and the cross section Y may have different conversion magnifications, it is necessary to form an afocal converter (anamorphic converter) having different angular magnifications in the cross section X and the cross section Y by using at least two so-called toric lenses each having different curvatures in the cross section X and the cross section Y, or at least two cylindrical lenses having a curvature in a certain cross section. In addition, in order that the converter may be disposed on an image side of the imaging optical system, there are required a first group of lenses having a negative refracting power for causing a converged ray from the imaging optical system to diverge, and a group of lenses having a positive refracting power for imaging that ray. Consequently, an optical property of a portion between the first group of lenses having a negative refracting power and the group of lenses having a positive refracting power is made nearly afocal, and a group of lenses including an anamorphic lens is introduced as the second group of lenses, whereby it is possible to attain an anamorphic converter having no primary image formation.

Aspect 14

There is provided an anamorphic converter according to Aspect 10 or 11, in which both βx and βy are negative values, and the anamorphic converter further includes at least one negative lens and two or more anamorphic lenses.

Aspect 14 is concerned with a condition in which a structure of the anamorphic converter for obtaining the primary image formation through the imaging optical system to convert the aspect ratio is suitably prescribed to make the optical performance excellent.

Figure 64:
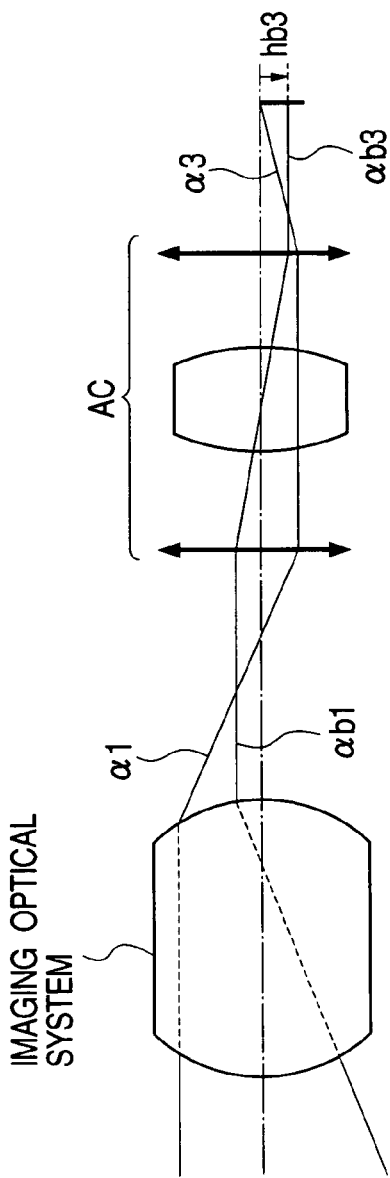
FIG. 64 is a conceptual view of an anamorphic converter of a type having primary image formation.

A conceptual view of the anamorphic converter of a type having primary image formation is shown in FIG. 64. For the optical system for reimaging the primary image of the imaging optical system, it is necessary that both the focal length conversion magnifications βx and βy are negative values. In addition, in order to contain the marginal ray of the imaging optical system, it is necessary that an entrance pupil nearly agrees with the exit pupil of the imaging optical system. Lenses for broadcasting including a lens for the digital cinema become an optical system which has a long exit pupil and hence is nearly telecentric on the image side since they are established on the assumption that the color separation optical system is used. Consequently, at least an optical system which is nearly telecentric on the both sides is required for the converter. As shown in FIG. 64, in case of the anamorphic converter of a type having primary image formation, since an emitted ray from the imaging optical system is made nearly afocal using the positive lens, an increase in an off-axial chief ray emitted height hb3 from the converter final surface is suppressed to prevent a quantity of marginal light from being reduced, and hence an off-axial chief ray emitted inclination angle αb2 can be made small. As a result, there is an advantage that the exit pupil becomes long, and hence an influence of the color shading due to the color separation optical system is hardly generated. As shown in FIG. 64, from the condition in which the converter is telecentric on the both sides, the anamorphic converter of a type having primary image formation is constituted by at least two groups of positive lenses, and the refracting power of the whole converter takes a minute value in the vicinity of zero.

In addition, since for the primary image obtained through the imaging optical system, the various aberrations such as the chromatic aberration, the antigmatism and the curvature of field are satisfactorily corrected, the chromatic aberration, the antigmatism, the curvature of field and the like of the converter must also be satisfactorily corrected. When a refracting power of an i-th lens of lenses within the converter is assigned Φi, an Abbe's number of the i-th lens of the lenses is assigned vi, and a refracting index of the i-th lens of the lenses is assigned Ni, a chromatic aberration correction condition is expressed as follows:

$$\Sigma(\Phi i / vi) \approx 0 \qquad (16)$$

Also, a Petzval's condition is expressed as follows:

$$\Sigma(\Phi i / Ni) \approx 0 \qquad (17)$$

Here, since in the general optical materials, vi>0 and Ni>0 are established, in order to meet Equations (16) and (17), the anamorphic converter having primary image formation must have at least an negative lens in terms of its structure. Moreover, any one of the intervals within the converter is made nearly afocal, and the lens group including the above-mentioned anamorphic lens is introduced, whereby it is possible to attain the anamorphic converter of a primary image formation type.

Aspect 15

There is provided a lens device, including: the anamorphic converter according to any one of Embodiments 10 to 14; and the imaging optical system disposed on an object side with respect to the anamorphic converter.

Aspect 16

There is provided an image pickup device, including: the anamorphic converter according to any one of Aspects 10 to 15; an imaging optical system disposed on an object side with respect to the anamorphic converter; and image pickup means disposed on the object side with respect to the anamorphic converter.

The anamorphic lens used in the present invention is used in terms of the concept including a toric lens and a cylindrical lens, and hence means a lens in which a power in the X direction is different from that in the Y direction.

In addition, the anamorphic lens used in the present invention may have a function of a diffraction system.

Moreover, the imaging optical system of the present invention may be a variable power system or a fixed power system (having no variable power).

Fourth Embodiment

This embodiment is concerned with an anamorphic converter of a type having no primary image formation.

Figure 33:
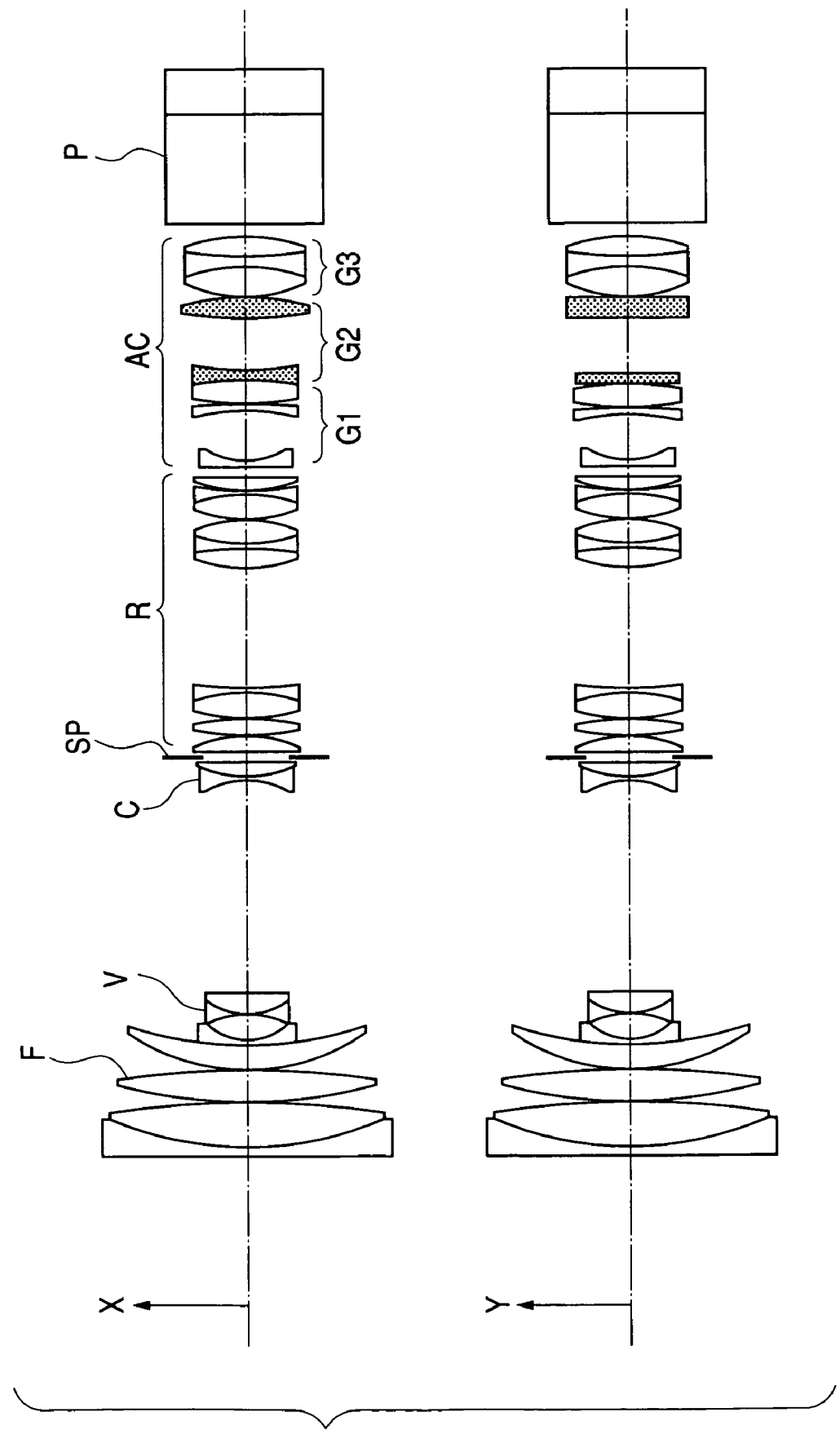
FIG. 33 is a cross sectional view in a wide angle end of Numerical Example 4 in the X direction and in the Y direction.
Figure 34:
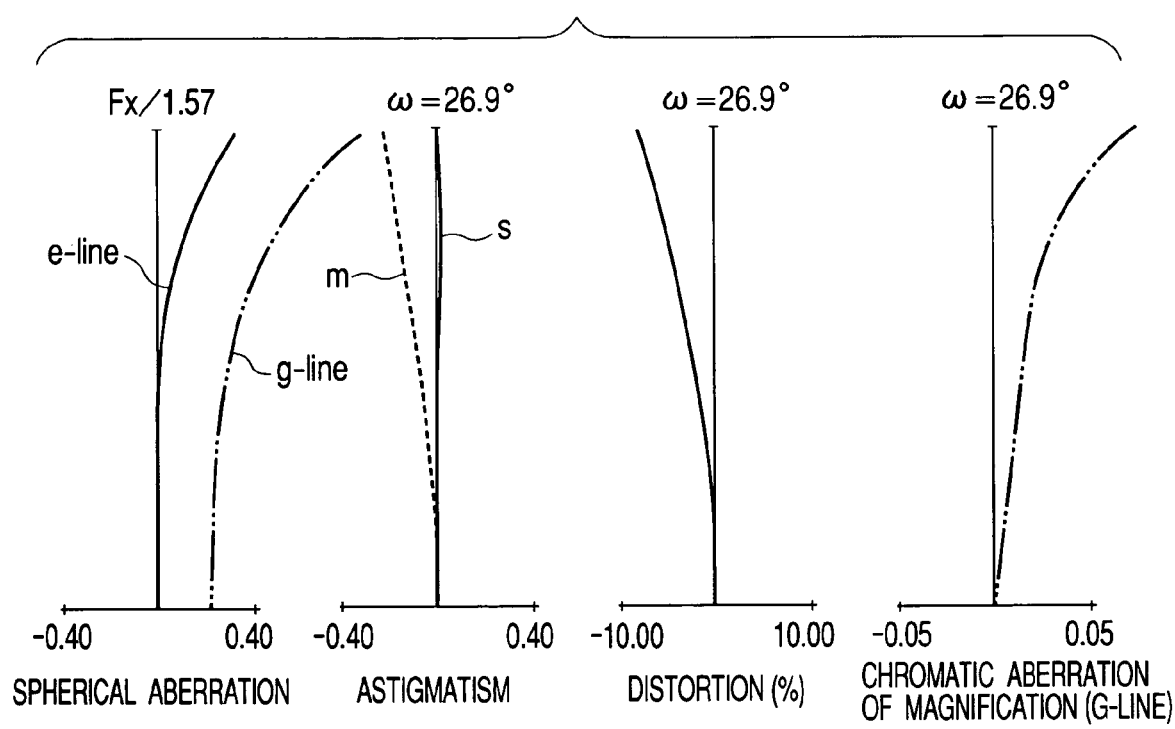
FIG. 34 is a longitudinal aberration view of Numerical Example 4 in the X direction under a condition in which fx is 7.90 mm, fy is 10.44 mm and the object distance is 2.5 m.
Figure 35:
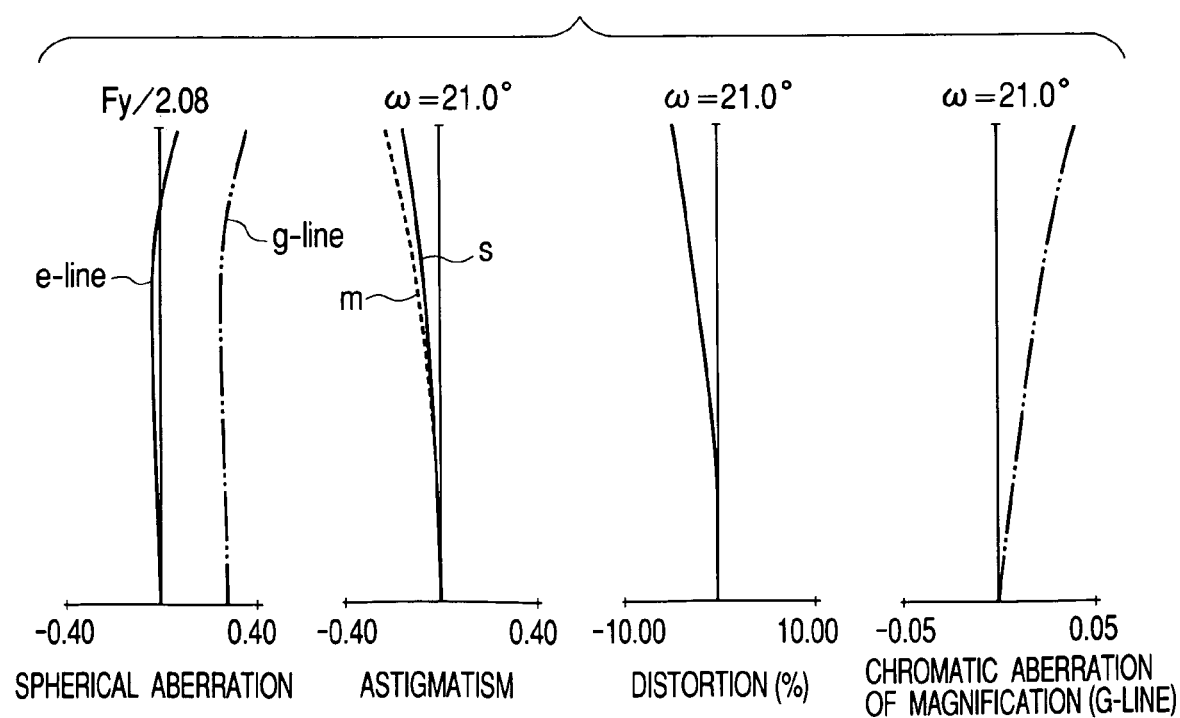
FIG. 35 is a longitudinal aberration view of Numerical Example 4 in the Y direction under a condition in which fx is 7.90 mm, fy is 10.44 mm and the object distance is 2.5 m.
Figure 36:
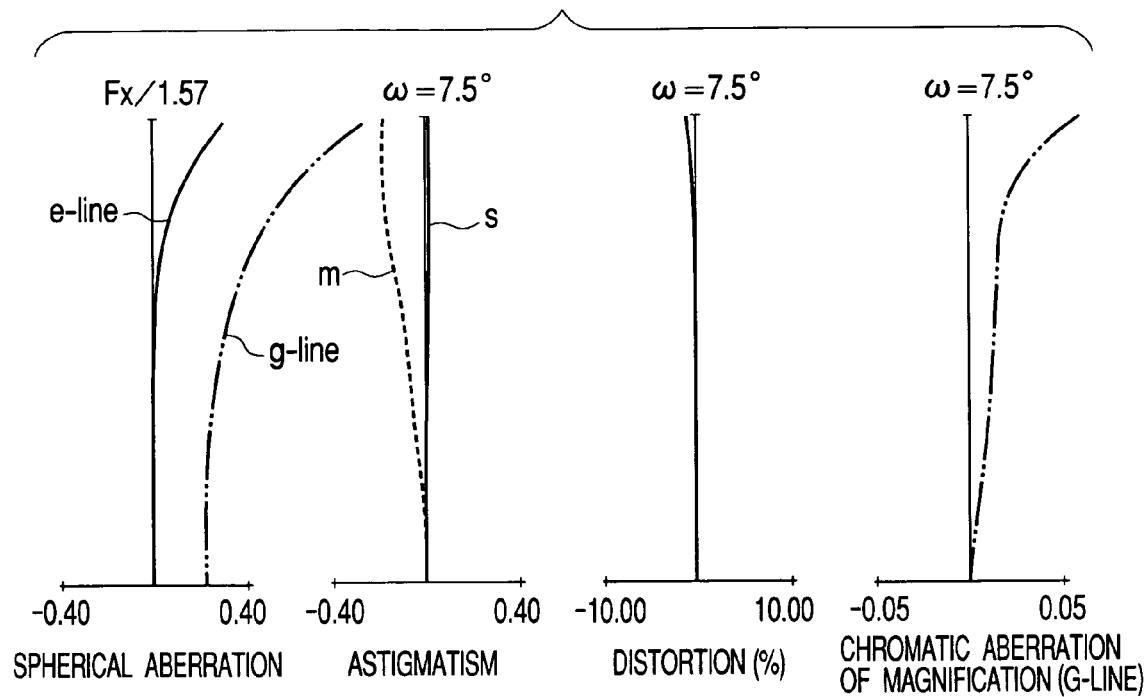
FIG. 36 is a longitudinal aberration view of Numerical Example 4 in the X direction under a condition in which fx is 30.24 mm, fy is 39.98 mm and the object distance is 2.5 m.
Figure 37:
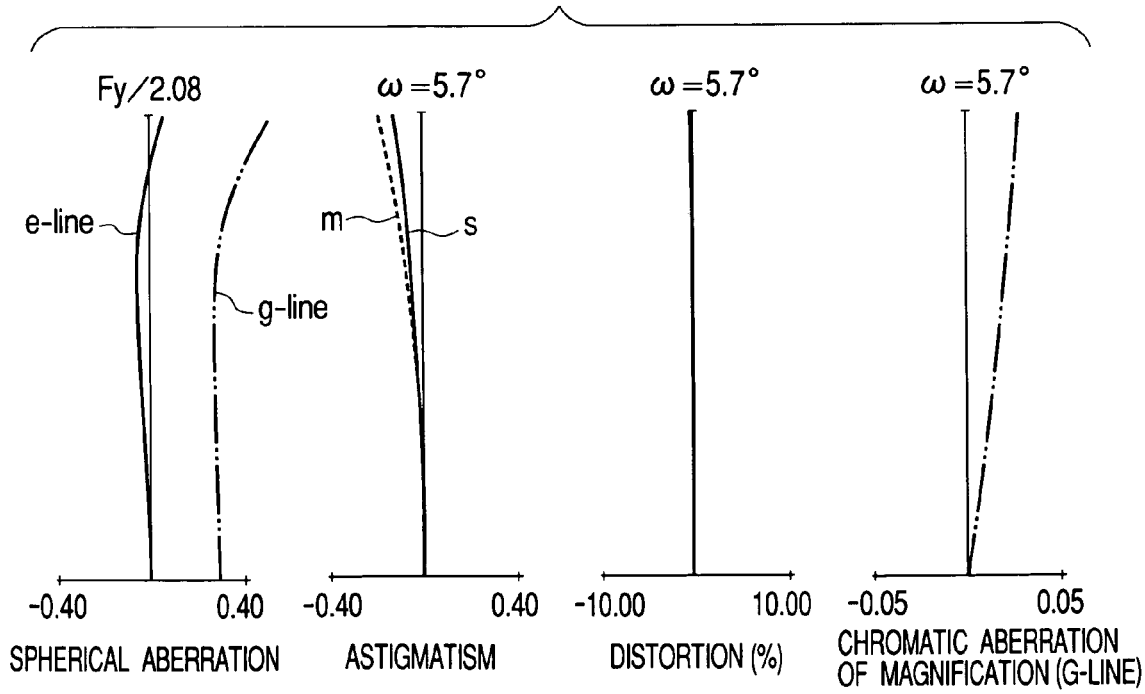
FIG. 37 is a longitudinal aberration view of Numerical Example 4 in the Y direction under a condition in which fx is 30.24 mm, fy is 39.98 mm and the object distance is 2.5 m.
Figure 38:
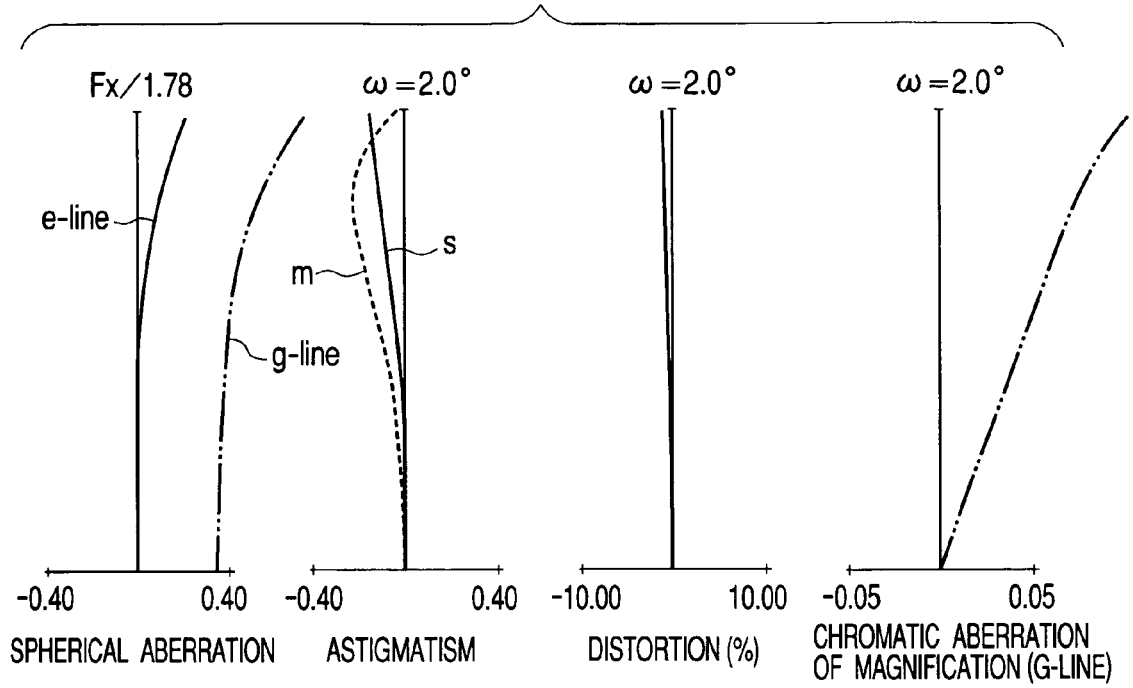
FIG. 38 is a longitudinal aberration view of Numerical Example 4 in the X direction under a condition in which fx is 115.83 mm, fy is 153.12 mm and the object distance is 2.5 m.
Figure 39:
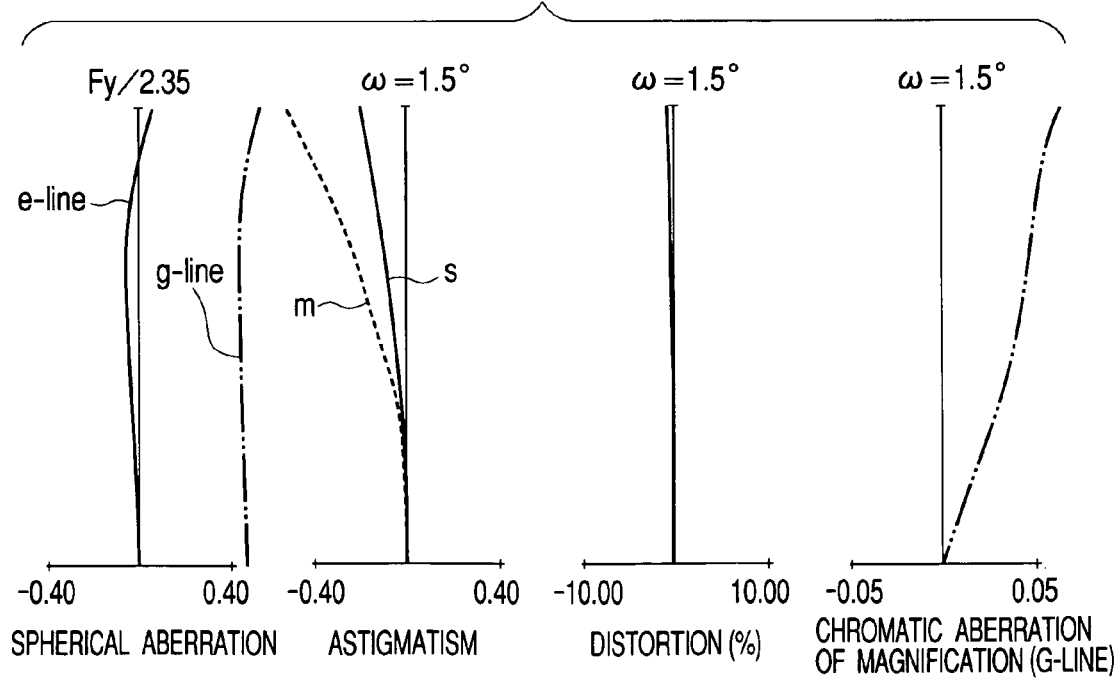
FIG. 39 is a longitudinal aberration view of Numerical Example 4 in the Y direction under a condition in which fx is 115.83 mm, fy is 153.12 mm and the object distance is 2.5 m.
Figure 52:
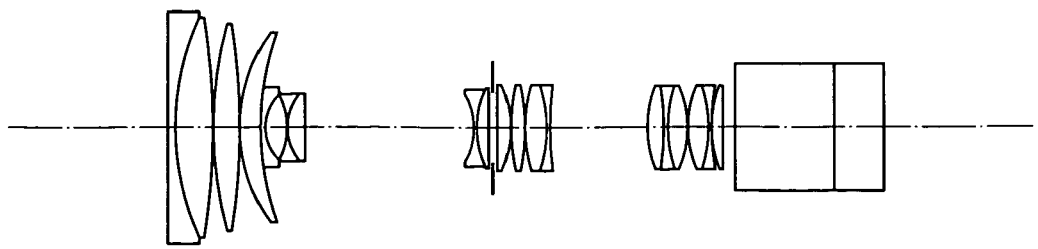
FIG. 52 is a cross sectional view in a wide angle end before insertion of an anamorphic converter of Numerical Examples 4, 5, and 6.

A specific structure of the anamorphic converter according to the present invention is described next. FIG. 33 is a cross sectional view of lenses in a Y direction and in an X direction when an anamorphic converter is inserted in Numerical Example 4 of the present invention. In addition, a cross sectional view before insertion of the anamorphic converter in Numerical Example 4 is shown in FIG. 52.

Figure 55:
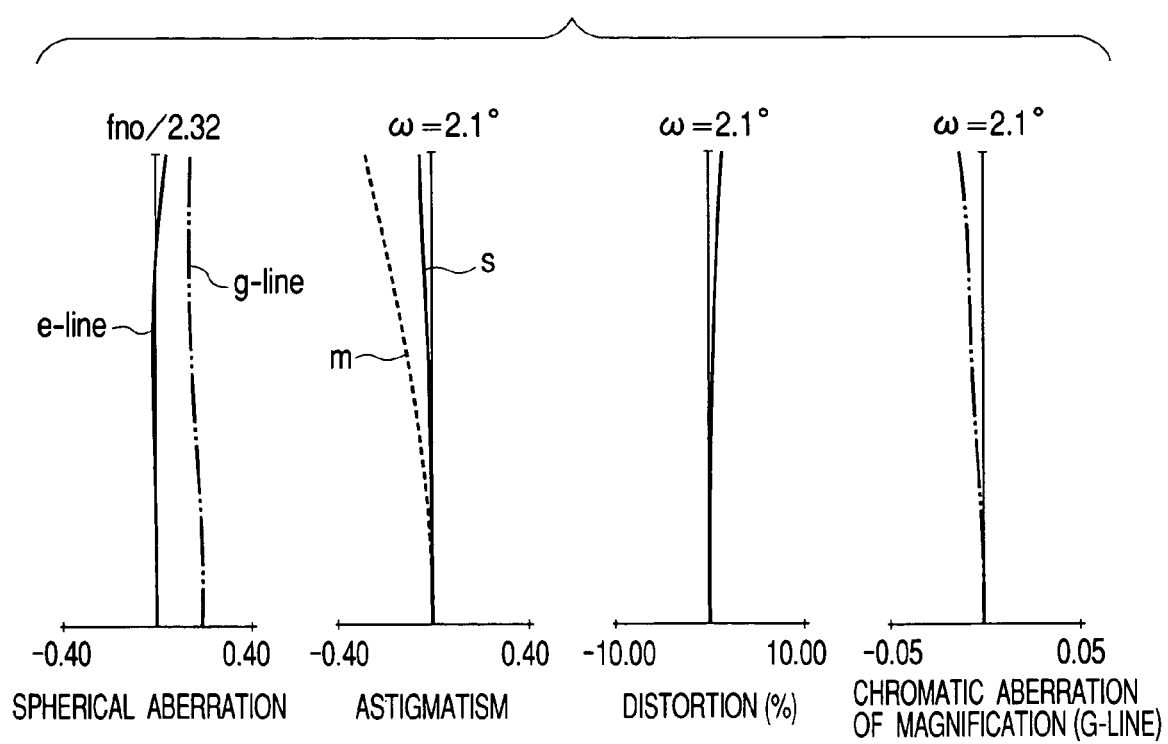
FIG. 55 is a longitudinal aberration view under a condition in which f is 151.1 mm and the object distance is 2.5 m before insertion of the anamorphic converter of Numerical Examples 4, 5, and 6.

FIGS. 53 to 55 show longitudinal aberration views before insertion of the anamorphic converter in Numerical Examples 4, 5, and 6, respectively.

In FIG. 33, reference symbol F designates a group of front lenses having a positive refracting power as a first group. Reference symbol V designates a variator for the variable power having a negative refracting power as a second group. The variator V is monotonously moved on an optical axis to an image surface side to thereby carry out the variable power from the wide angle end to the telescopic end. Reference symbol C designates a compensator having a negative refracting power as a third group. The compensator C is nonlinearly moved on the optical axis to an object side while describing a projection locus in order to compensate for the fluctuation of an image surface following the variable power. The variator V and the compensator C constitute the variable power system.

Reference symbol SP designates a stop, and reference symbol R designates a group of variable power semi-fixed relay lenses having a positive refracting power as a fourth group. Reference symbol P designates a color separation prism, an optical filter or the like which is shown in the form of a glass block in the figure.

The focusing group F, the variator V, the compensator C and the relay group R constitute an imaging optical system.

Next, a description will hereinafter be given with respect to the feature of the anamorphic converter AC in Numerical Example 4. The anamorphic converter AC includes: a first group G1 of lenses having a negative refracting power; a second group G2 of lenses having two cylindrical lenses; and a third group G3 of lenses having an image formation function and a positive refracting power. Each of the cylindrical lenses belonging to the second group G2 has a curvature only in the X direction, and has an effect of shortening a focal length in the X direction. The aspect ratio AR1 of the image pickup range in the image surface of the imaging optical system, and the aspect ratio AR2 of the effective area of the image pickup means are as follows:

$$AR1=2.35 \tag{18}$$

$$AR2=1.78 \tag{19}$$

Also, the conversion magnification $\beta x$ in the X direction, and the conversion magnification $\beta y$ in the Y direction are as follows:

$$\beta x=0.767 \tag{20}$$

$$\beta y=1.013 \tag{21}$$

Consequently, the values of the conditional equations are obtained as follows:

$$(AR1 \times \beta x)/(AR2 \times \beta y)=1.00 \tag{22}$$

$$(AR2^2+1) \times \beta y^2/(AR1^2+1)=0.656 \tag{23}$$

Thus, these values meet the conditions of Equations 1 and 2. Consequently, the anamorphic converter of a built-in converter system is attained which is excellent in the optical performance and free from the eclipse.

In addition, in case of the single anamorphic converter AC, a focal length fACx in the X direction, and a focal length fACy in the Y direction are expressed as follows:

$$fACx=+23.383 \tag{24}$$

$$fACy=+40.894 \tag{25}$$

Thus, both of them have the positive refracting powers and hence meet the condition which is required for the anamorphic converter of the present invention.

A material of the cylindrical lens used in this embodiment is glass. In the following fifth and sixth embodiments as well, the same material will be used.

FIGS. 34 to 39 are longitudinal aberration views in the X direction or in the Y direction in Numerical Example 4. In these figures, fx indicates a focal length in the X direction, fy indicates a focal length in the Y direction, Fx indicates an F number in the X direction, Fy indicates an F number in the Y direction, and $2\omega$ indicates a field angle.

In Numerical Example 4, the following values are obtained:

fx=7.90 to 115.83 fy=10.44 to 153.12

Fx=1.57 to 1.78

Fy=2.08 to 2.35

$2\omega$=56.2 to 4.2 degrees

| | | | | | | | |
|---|---|---|---|---|---|---|---|
| r1 = | 1169.481 | d1 = | 2.40 | n1 = | 1.81265 | v1 = | 25.4 |
| r2 = | 98.429 | d2 = | 10.83 | n2 = | 1.51825 | v2 = | 64.2 |
| r3 = | −265.170 | d3 = | 0.20 | | | | |
| r4 = | 124.037 | d4 = | 8.29 | n3 = | 1.60548 | v3 = | 60.7 |
| r5 = | −281.395 | d5 = | 0.20 | | | | |
| r6 = | 51.797 | d6 = | 6.46 | n4 = | 1.64254 | v4 = | 60.1 |
| r7 = | 97.915 | d7 = | Variable | | | | |
| r8 = | 71.045 | d8 = | 0.90 | n5 = | 1.82017 | v5 = | 46.6 |
| r9 = | 17.601 | d9 = | 6.01 | | | | |
| r10 = | −21.542 | d10 = | 0.90 | n6 = | 1.77621 | v6 = | 49.6 |
| r11 = | 18.397 | d11 = | 4.63 | n7 = | 1.85501 | v7 = | 23.9 |
| r12 = | −4295.134 | d12 = | Variable | | | | |
| r13 = | −27.245 | d13 = | 0.90 | n8 = | 1.79013 | v8 = | 44.2 |
| r14 = | 31.613 | d14 = | 3.84 | n9 = | 1.85501 | v9 = | 23.9 |
| r15 = | 1125.345 | d15 = | Variable | | | | |
| r16 = | 0.000 (Stop) | d16 = | 1.60 | | | | |
| r17 = | 10000.000 | d17 = | 4.02 | n10 = | 1.73234 | v10 = | 54.7 |
| r18 = | −32.342 | d18 = | 0.20 | | | | |
| r19 = | 107.938 | d19 = | 3.60 | n11 = | 1.48915 | v11 = | 70.2 |
| r20 = | −121.402 | d20 = | 0.20 | | | | |
| r21 = | 37.891 | d21 = | 7.17 | n12 = | 1.48915 | v12 = | 70.2 |
| r22 = | −36.452 | d22 = | 1.20 | n13 = | 1.83932 | v13 = | 37.2 |
| r23 = | 177.431 | d23 = | 30.00 | | | | |
| r24 = | 48.564 | d24 = | 4.26 | n14 = | 1.48915 | v14 = | 70.2 |
| r25 = | −193.706 | d25 = | 0.20 | | | | |
| r26 = | −210.911 | d26 = | 1.20 | n15 = | 1.83932 | v15 = | 37.2 |
| r27 = | 39.960 | d27 = | 6.49 | n16 = | 1.48915 | v16 = | 70.2 |
| r28 = | −33.683 | d28 = | 0.20 | | | | |
| r29 = | 43.464 | d29 = | 6.21 | n17 = | 1.53430 | v17 = | 48.8 |
| r30 = | −30.063 | d30 = | 1.20 | n18 = | 1.80811 | v18 = | 46.6 |
| r31 = | 113.246 | d31 = | 0.20 | | | | |
| r32 = | 56.783 | d32 = | 2.98 | n19 = | 1.55098 | v19 = | 45.8 |
| r33 = | −10000.000 | d33 = | 2.40 | | | | |
| r34 = | −7839.440 | d34 = | 1.50 | n20 = | 1.88815 | v20 = | 40.8 |
| r35 = | 23.812 | d35 = | 11.72 | | | | |
| r36 = | −53.891 | d36 = | 1.50 | n21 = | 1.88815 | v21 = | 40.8 |
| r37 = | −398.617 | d37 = | 0.20 | | | | |
| r38 = | 70.482 | d38 = | 5.77 | n22 = | 1.81264 | v22 = | 25.4 |
| r39 = | −44.050 | d39 = | 0.31 | | | | |
| r40 = | −53.902 | d40 = | 1.50 | n23 = | 1.51825 | v23 = | 64.1 |
| r41 = | 63.160 | d41 = | 13.62 | | | | |
| r42 = | 128.438 | d42 = | 4.68 | n24 = | 1.88815 | v24 = | 40.8 |
| r43 = | −80.144 | d43 = | 0.20 | | | | |

-continued

| | | | | | | |
|---|---|---|---|---|---|---|
| r44 = | 29.500 | d44 = | 8.88 | n25 = 1.48915 | v25 = 70.2 |
| r45 = | −24.900 | d45 = | 1.50 | n26 = 1.81264 | v26 = 25.4 |
| r46 = | 250.300 | d46 = | 0.20 | | |
| r47 = | 139.800 | d47 = | 5.28 | n27 = 1.48915 | v27 = 70.2 |
| r48 = | −32.300 | d48 = | 2.00 | | |
| r49 = | 0.000 | d49 = | 29.00 | n28 = 1.60718 | v28 = 38.0 |
| r50 = | 0.000 | d50 = | 11.20 | n29 = 1.51825 | v29 = 64.2 |
| r51 = | 0.000 | | | | |

*r40 to r43 indicate the cylindrical lenses. A curvature in the Y direction is zero.

| Focal length | | | |
|---|---|---|---|
| fx | 7.9 | 30.24 | 115.83 |
| fy | 10.44 | 39.98 | 153.12 |
| Variable spacing | | | |
| d7 | 0.39 | 33.92 | 49.55 |
| d12 | 52.91 | 14.8 | 3.78 |
| d15 | 1.55 | 6.13 | 1.53 |

Fifth Embodiment

This embodiment is concerned with an anamorphic converter of a type having no primary image formation.

Figure 40:
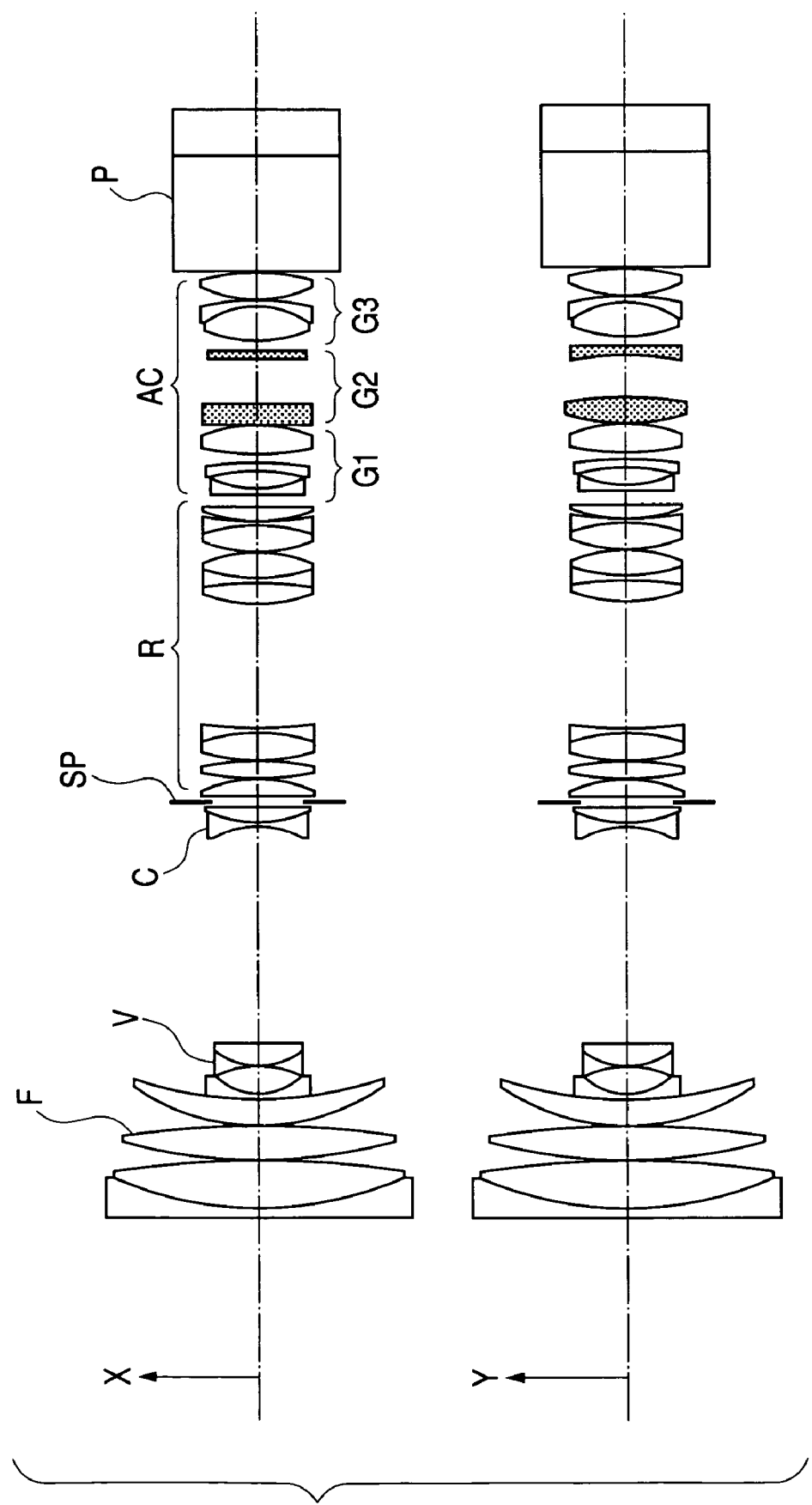
FIG. 40 is a cross sectional view in a wide angle and of Numerical Example 5 in the X direction and in the Y direction.
Figure 41:
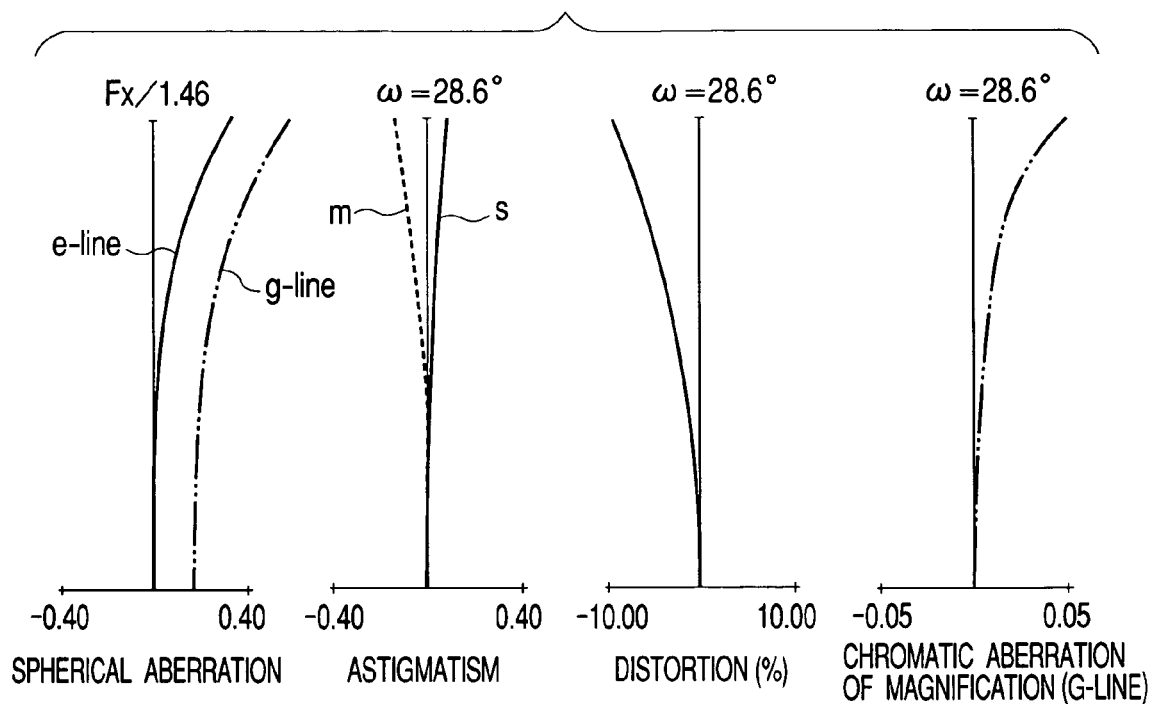
FIG. 41 is a longitudinal aberration view of Numerical Example 5 in the X direction under a condition in which fx is 7.34 mm, fy is 9.71 mm and the object distance is 2.5 m.
Figure 42:
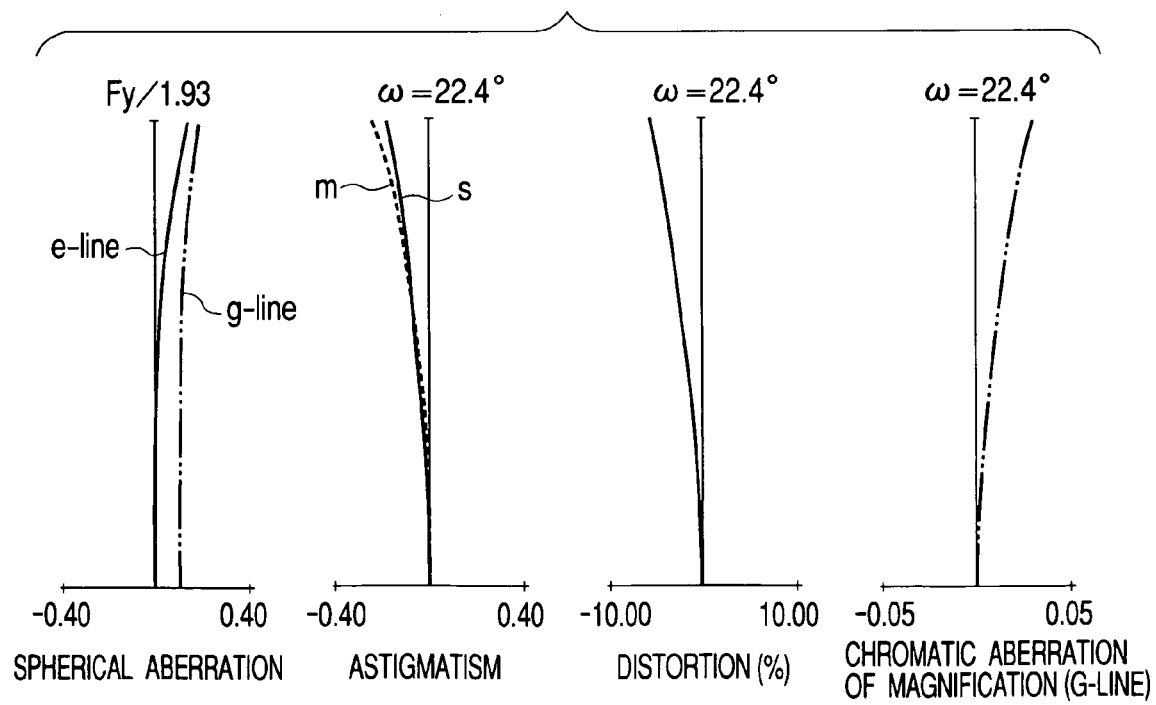
FIG. 42 is a longitudinal aberration view of Numerical Example 5 in the Y direction under a condition in which fx is 7.34 mm, fy is 9.71 mm and the object distance is 2.5 m.
Figure 43:
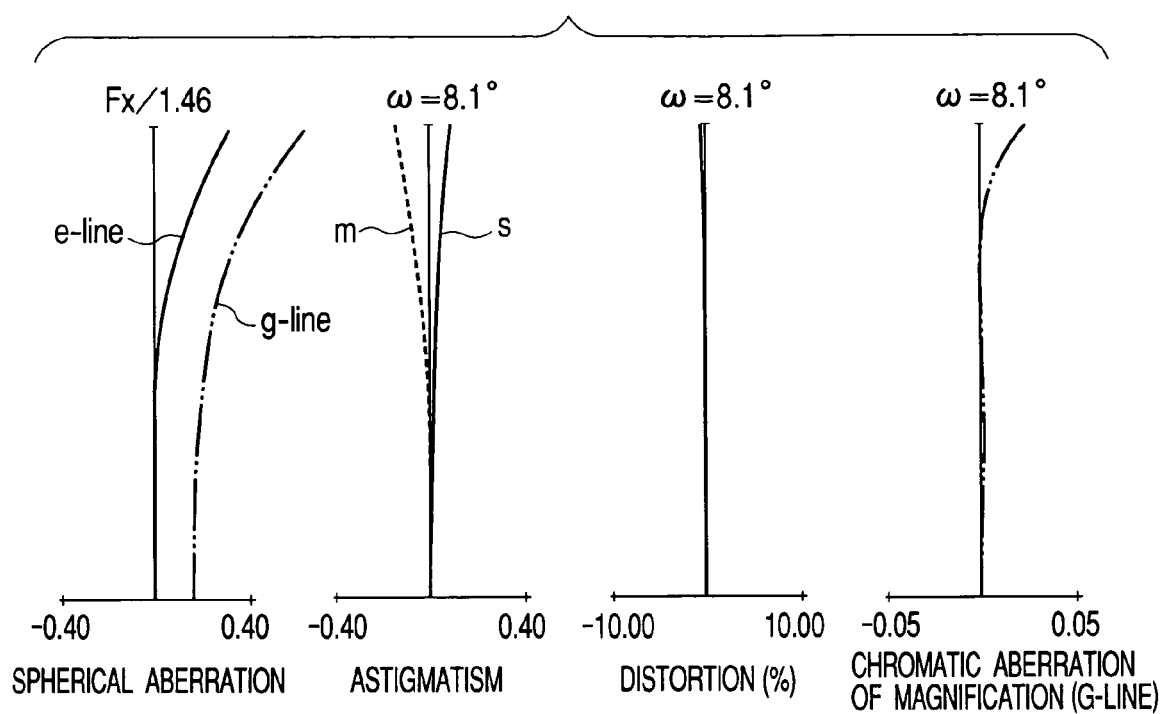
FIG. 43 is a longitudinal aberration view of Numerical Example 5 in the X direction under a condition in which fx is 28.12 mm, fy is 37.18 mm and the object distance is 2.5 m.
Figure 44:
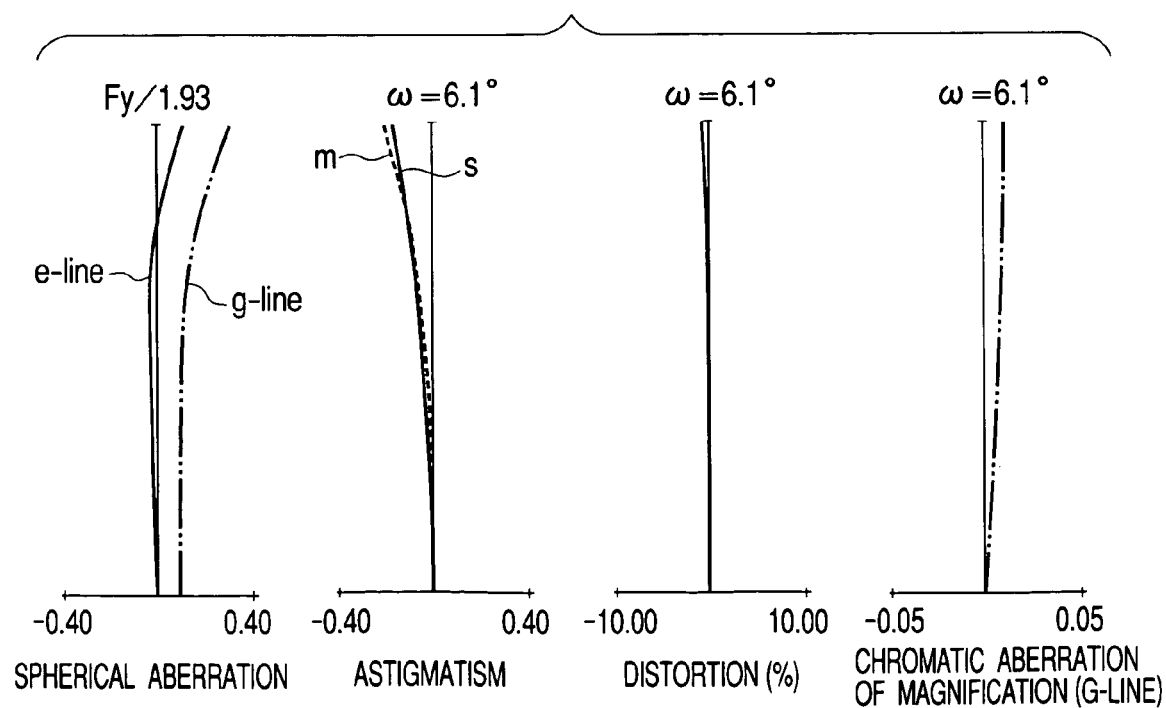
FIG. 44 is a longitudinal aberration view of Numerical Example 5 in the Y direction under a condition in which fx is 28.12 mm, fy is 37.18 mm and the object distance is 2.5 m.
Figure 45:
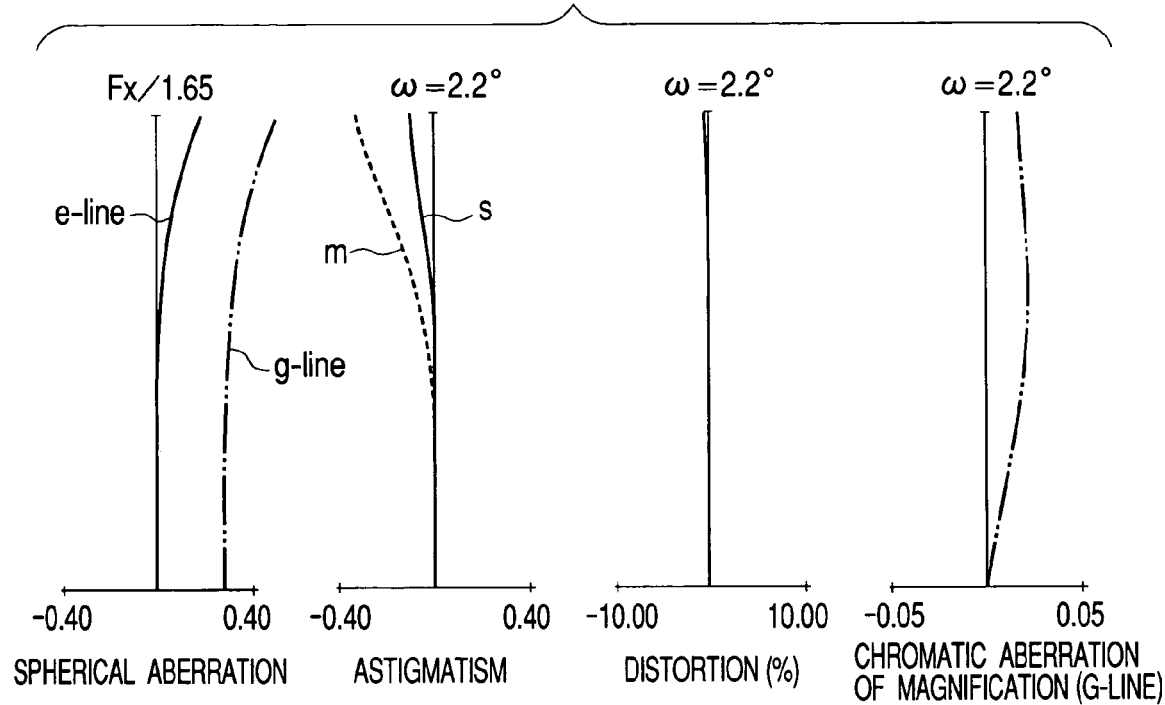
FIG. 45 is a longitudinal aberration view of Numerical Example 5 in the X direction under a condition in which fx is 107.72 mm, fy is 142.41 mm and the object distance is 2.5 m.
Figure 46:
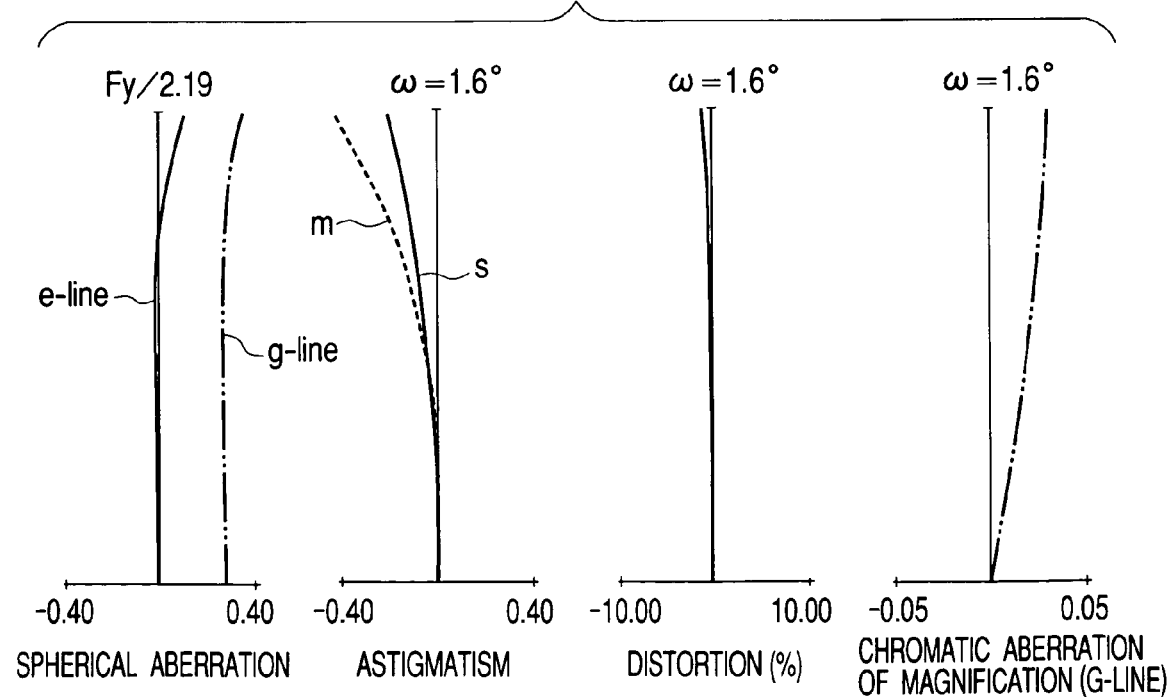
FIG. 46 is a longitudinal aberration view of Numerical Example 5 in the Y direction under a condition in which fx is 107.72 mm, fy is. 142.41 mm and the object distance is 2.5 m.

FIG. 40 is a cross sectional view of lenses in a Y direction and in an X direction when an anamorphic converter is inserted in Numerical Example 5 of the present invention. In addition, a cross sectional view before insertion of the anamorphic converter in Numerical Example 5 is shown in FIG. 52.

In FIG. 40, reference symbol F designates a group of front lenses having a positive refracting power as a first group. Reference symbol V designates a variator for the variable power having a negative refracting power as a second group. The variator V is monotonously moved on an optical axis to an image surface side to thereby carry out the variable power from the wide angle end to the telescopic end. Reference symbol C designates a compensator having a negative refracting power as a third group. The compensator C is nonlinearly moved on the optical axis to an object side while describing a projection locus in order to compensate for the fluctuation of an image surface following the variable power. The variator V and the compensator C constitute the variable power system.

Reference symbol SP designates a stop, and reference symbol R designates a group of variable power semi-fixed relay lenses having a positive refracting power as a fourth group. Reference symbol P designates a color separation prism, an optical filter or the like which is shown in the form of a glass block in the figure.

The focusing group F, the variator V, the compensator C and the relay group R constitute an imaging optical system.

Next, a description will hereinafter be given with respect to the feature of the anamorphic converter AC in Numerical Example 5. The anamorphic converter AC includes: a first group G1 of lenses having a negative refracting power; a second group G2 of lenses having two cylindrical lenses; and a third group G3 of lenses having an image formation function and a positive refracting power. Each of the cylindrical lenses belonging to the second group G2 has a curvature only in the Y direction, and has an effect of lengthening a focal length in the Y direction. The aspect ratio AR1 of the image pickup range in the image surface of the imaging optical system, and the aspect ratio AR2 of the effective area of the image pickup means are as follows:

$$AR1=2.35 \tag{26}$$

$$AR2=1.78 \tag{27}$$

Also, the conversion magnification $\beta x$ in the X direction, and the conversion magnification $\beta y$ in the Y direction are as follows:

$$\beta x=0.713 \tag{28}$$

$$\beta y=0.942 \tag{29}$$

Consequently, the values of the conditional equations are obtained as follows:

$$(AR1 \times \beta x)/(AR2 \times \beta y)=1.00 \tag{30}$$

$$(AR2+1) \times \beta y^2/(AR1^2+1)=0.567 \tag{31}$$

Thus, these values meet the conditions of Equations 1 and 2. Consequently, the anamorphic converter of a built-in converter system is attained which is excellent in the optical performance and free from the eclipse.

In addition, in case of the single anamorphic converter AC, a focal length fACx in the X direction, and a focal length fACy in the Y direction are expressed as follows:

$$fACx\ 32\ +22.999 \tag{32}$$

$$fACy=+38.486 \tag{33}$$

Thus, both of them have the positive refracting powers and hence meet the condition which is required for the anamorphic converter of the present invention.

FIGS. 40 to 46 are longitudinal aberration views in the X direction or in the Y direction in Numerical Example 5. In these figures, fx indicates a focal length in the X direction, fy indicates a focal length in the Y direction, Fx indicates an F number in the X direction, Fy indicates an F number in the Y direction, and 2ω indicates a field angle.

In Numerical Example 5, the following values are obtained:

fx=7.34 to 107.72 fy=9.71 to 142.41

Fx=1.46 to 1.65

Fy=1.93 to 2.19

2ω=56.2 to 4.2 degrees

| | | | | | | |
|---|---|---|---|---|---|---|
| r1 = | 1169.481 | d1 = | 2.40 | n1 = 1.81265 | v1 = 25.4 |
| r2 = | 98.429 | d2 = | 10.83 | n2 = 1.51825 | v2 = 64.2 |
| r3 = | −265.170 | d3 = | 0.20 | | |
| r4 = | 124.037 | d4 = | 8.29 | n3 = 1.60548 | v3 = 60.7 |
| r5 = | −281.395 | d5 = | 0.20 | | |
| r6 = | 51.797 | d6 = | 6.46 | n4 = 1.64254 | v4 = 60.1 |
| r7 = | 97.915 | d7 = | Variable | | |
| r8 = | 71.045 | d8 = | 0.90 | n5 = 1.82017 | v5 = 46.6 |
| r9 = | 17.601 | d9 = | 6.01 | | |
| r10 = | −21.542 | d10 = | 0.90 | n6 = 1.77621 | v6 = 49.6 |
| r11 = | 18.397 | d11 = | 4.63 | n7 = 1.85501 | v7 = 23.9 |
| r12 = | −4295.134 | d12 = | Variable | | |
| r13 = | −27.245 | d13 = | 0.90 | n8 = 1.79013 | v8 = 44.2 |
| r14 = | 31.613 | d14 = | 3.84 | n9 = 1.85501 | v9 = 23.9 |
| r15 = | 1125.345 | d15 = | Variable | | |
| r16 = | 0.000 (Stop) | d16 = | 1.60 | | |
| r17 = | 10000.000 | d17 = | 4.02 | n10 = 1.73234 | v10 = 54.7 |
| r18 = | −32.342 | d18 = | 0.20 | | |
| r19 = | 107.938 | d19 = | 3.60 | n11 = 1.48915 | v11 = 70.2 |
| r20 = | −121.402 | d20 = | 0.20 | | |
| r21 = | 37.891 | d21 = | 7.17 | n12 = 1.48915 | v12 = 70.2 |
| r22 = | −36.452 | d22 = | 1.20 | n13 = 1.83932 | v13 = 37.2 |
| r23 = | 177.431 | d23 = | 30.00 | | |
| r24 = | 48.564 | d24 = | 4.26 | n14 = 1.48915 | v14 = 70.2 |
| r25 = | −193.706 | d25 = | 0.20 | | |
| r26 = | −210.911 | d26 = | 1.20 | n15 = 1.83932 | v15 = 37.2 |
| r27 = | 39.960 | d27 = | 6.49 | n16 = 1.48915 | v16 = 70.2 |
| r28 = | −33.683 | d28 = | 0.20 | | |
| r29 = | 43.464 | d29 = | 6.21 | n17 = 1.53430 | v17 = 48.8 |
| r30 = | −30.063 | d30 = | 1.20 | n18 = 1.80811 | v18 = 46.6 |
| r31 = | 113.246 | d31 = | 0.20 | | |
| r32 = | 56.783 | d32 = | 2.98 | n19 = 1.55098 | v19 = 45.8 |
| r33 = | −10000.000 | d33 = | 2.40 | | |
| r34 = | −406.116 | d34 = | 1.50 | n20 = 1.88815 | v20 = 40.8 |
| r35 = | 27.624 | d35 = | 5.09 | | |
| r36 = | −34.561 | d36 = | 1.30 | n21 = 1.88815 | v21 = 40.8 |
| r37 = | 376.875 | d37 = | 2.39 | | |
| r38 = | 125.238 | d38 = | 6.87 | n22 = 1.81264 | v22 = 25.4 |
| r39 = | −35.789 | d39 = | 0.20 | | |
| r40 = | 51.579 | d40 = | 5.00 | n23 = 1.73234 | v23 = 54.7 |
| r41 = | −179.240 | d41 = | 10.68 | | |
| r42 = | −89.456 | d42 = | 1.50 | n24 = 1.89932 | v24 = 37.2 |
| r43 = | 57.960 | d43 = | 2.62 | | |
| r44 = | 42.100 | d44 = | 8.20 | n25 = 1.48915 | v25 = 70.2 |
| r45 = | −23.300 | d45 = | 1.30 | n26 = 1.81264 | v26 = 25.4 |
| r46 = | −85.300 | d46 = | 0.20 | | |
| r47 = | 30.400 | d47 = | 6.28 | n27 = 1.48915 | v27 = 70.2 |
| r48 = | −70.400 | d48 = | 0.50 | | |
| r49 = | 0.000 | d49 = | 29.00 | n28 = 1.60718 | v28 = 38.0 |
| r50 = | 0.000 | d50 = | 11.20 | n29 = 1.51825 | v29 = 64.2 |
| r51 = | 0.000 | | | | |

*r40 to r43 indicate the cylindrical lenses. A curvature in the X direction is zero.

| Focal length | | | |
|---|---|---|---|
| fx | 7.34 | 28.12 | 107.72 |
| fy | 9.71 | 37.18 | 142.41 |
| Variable spacing | | | |
| d7 | 0.39 | 33.92 | 49.55 |
| d12 | 52.91 | 14.8 | 3.78 |
| d15 | 1.55 | 6.13 | 1.53 |

Sixth Embodiment

This embodiment is concerned with an anamorphic converter of a type having no primary image formation.

Figure 56:
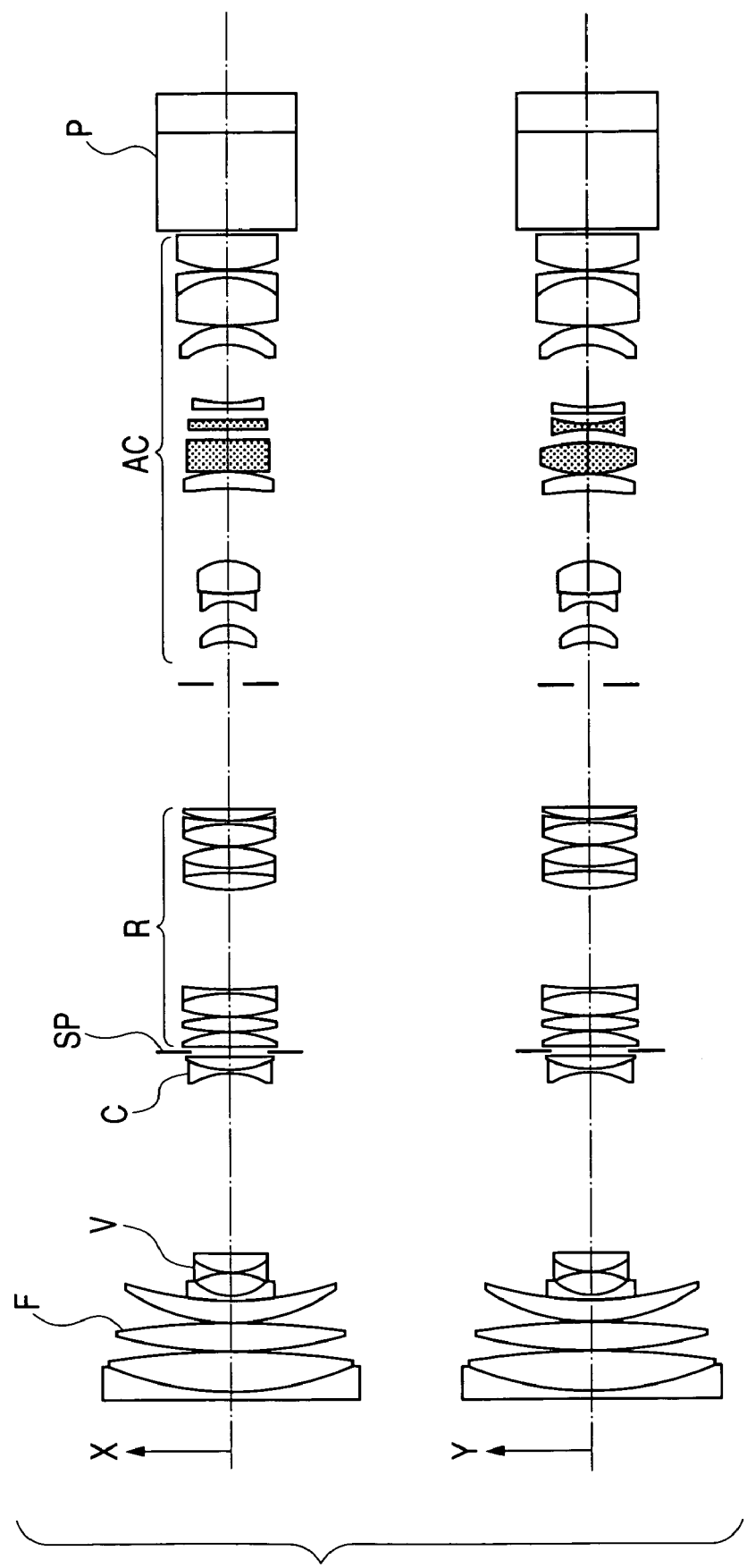
FIG. 56 is a cross sectional view in a wide angle end of Numerical Example 6 in the X direction and in the Y direction.
Figure 57:
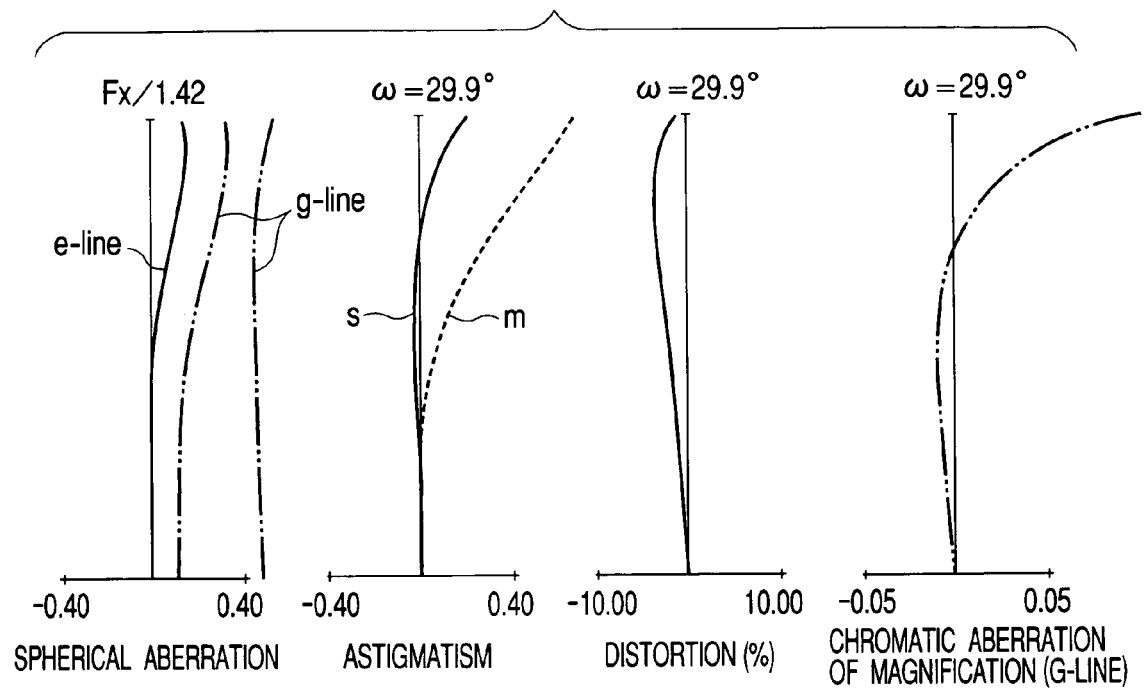
FIG. 57 is a longitudinal aberration view of Numerical Example 6 in the X direction under a condition in which fx is −7.11 mm, fy is −9.40 mm and the object distance is 2.5 m.
Figure 58:
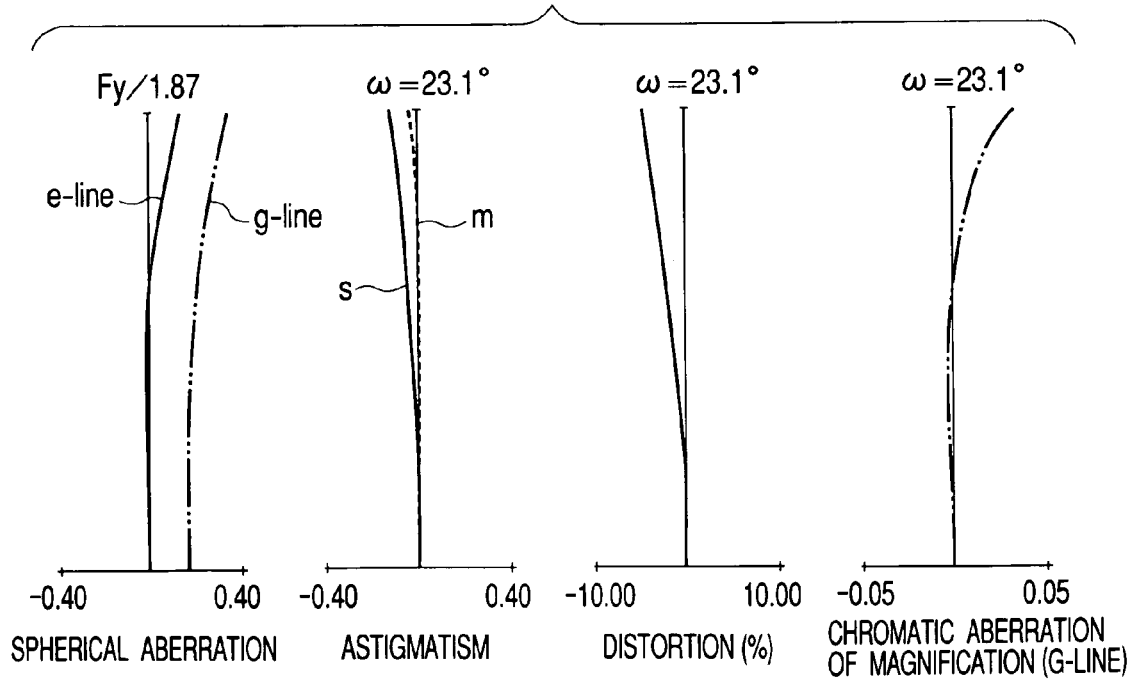
FIG. 58 is a longitudinal aberration view of Numerical Example 6 in the Y direction under a condition in which fx is −7.11 mm, fy is −9.40 mm and the object distance is 2.5 m.
Figure 59:
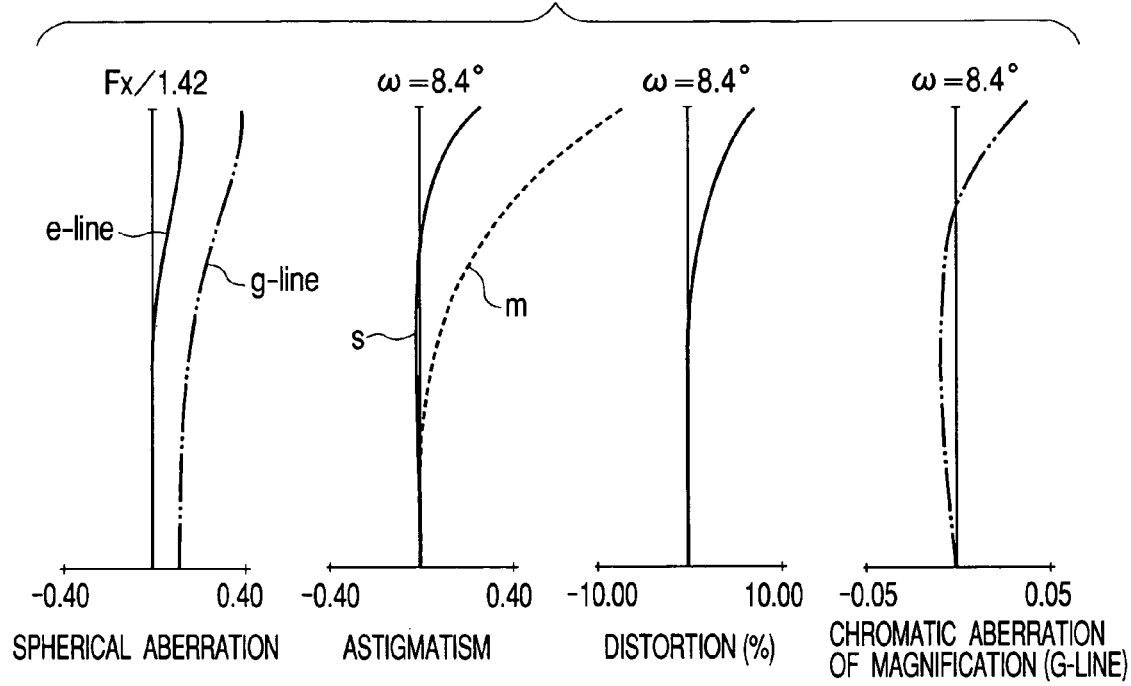
FIG. 59 is a longitudinal aberration view of Numerical Example 6 in the X direction under a condition in which fx is −27.25 mm, fy is −36.01 mm and the object distance is 2.5 m.
Figure 60:
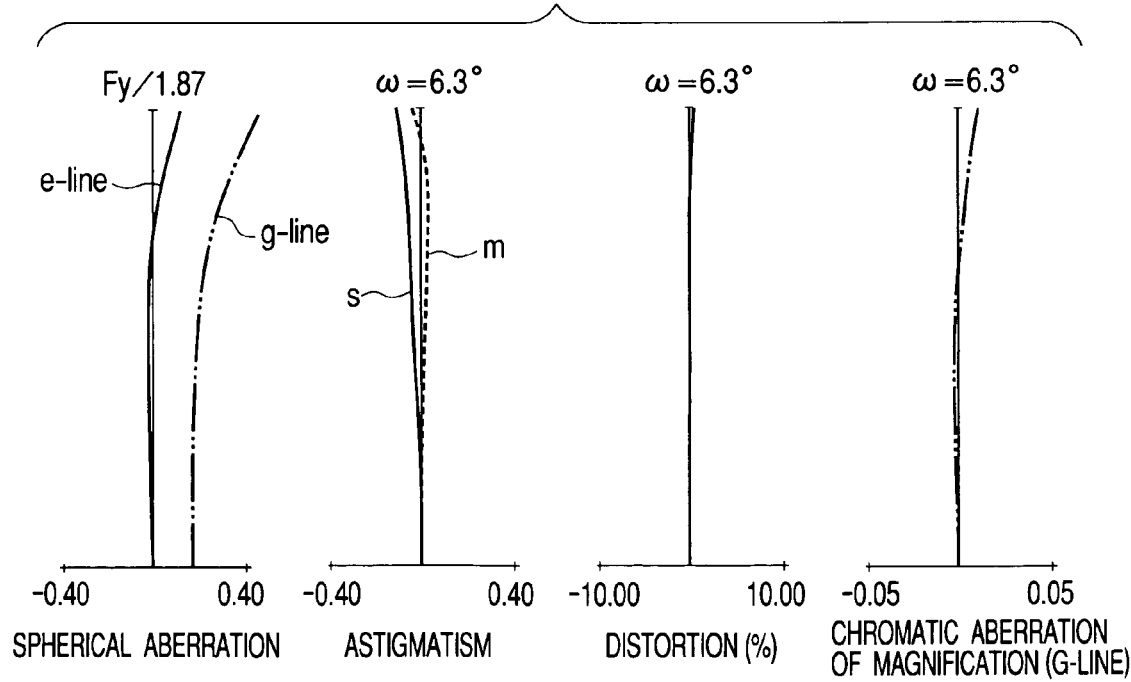
FIG. 60 is a longitudinal aberration view of Numerical Example 6 in the Y direction under a condition in which fx is −27.25 mm, fy is −36.01 mm and the object distance is 2.5 m.
Figure 61:
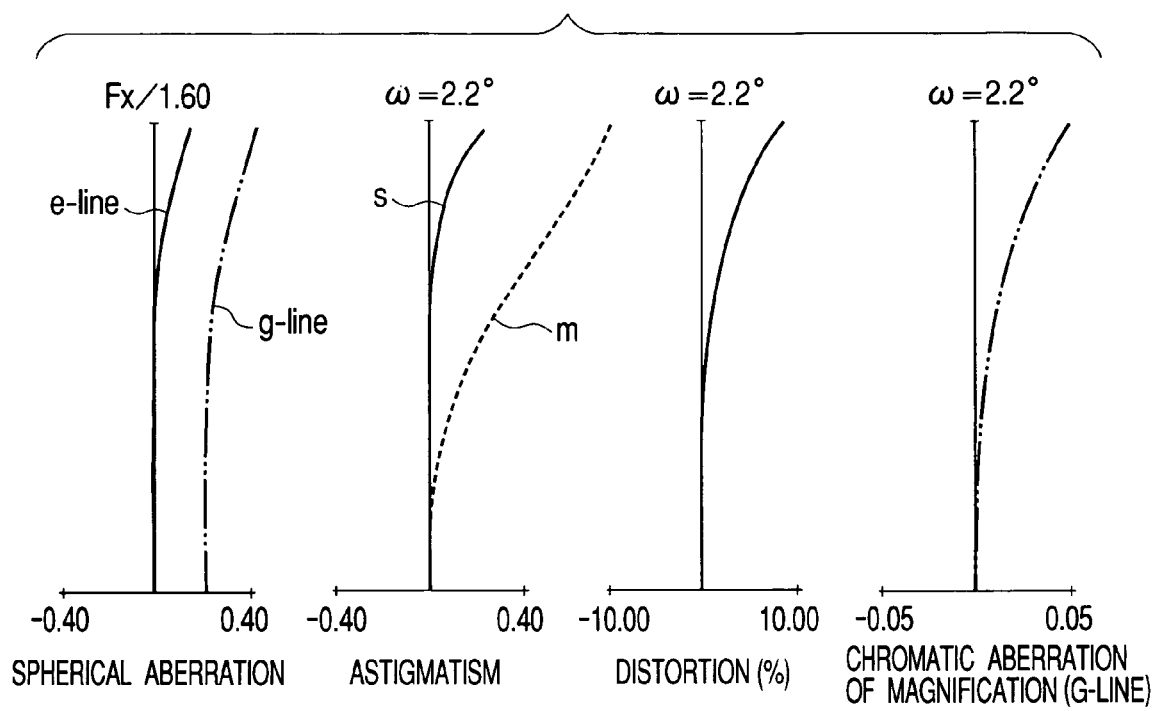
FIG. 61 is a longitudinal aberration view of Numerical Example 6 in the X direction under a condition in which fx is −104.37 mm, fy is −137.96 mm and the object distance is 2.5 m.
Figure 62:
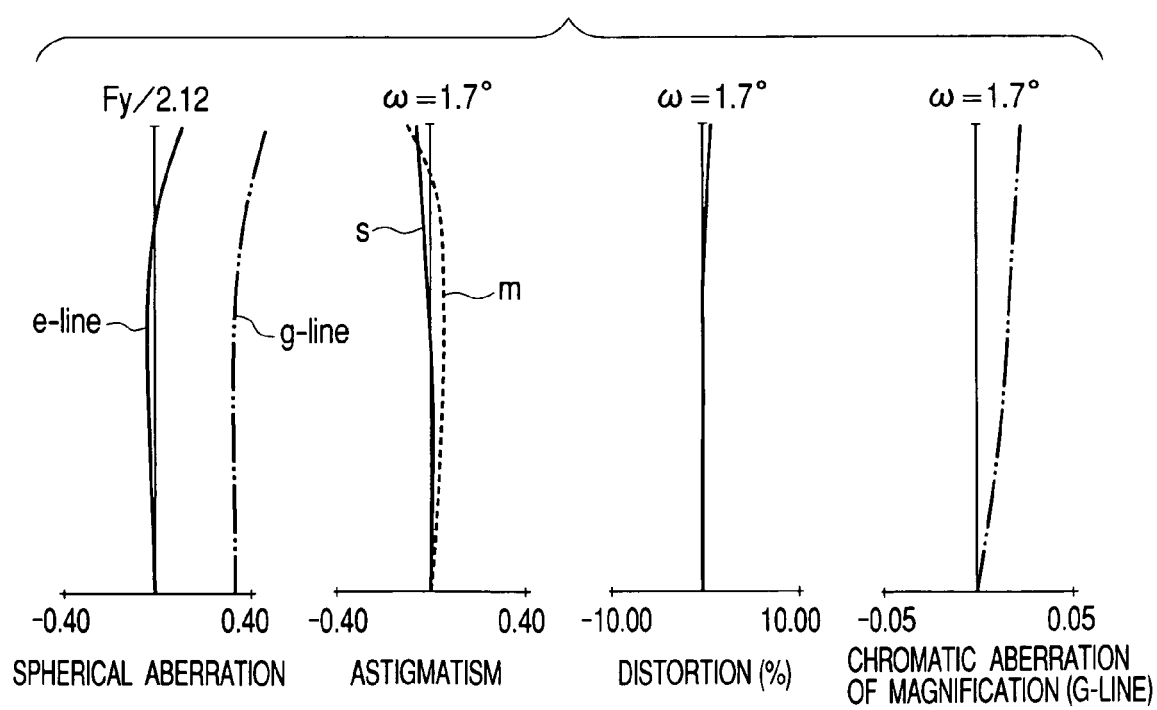
FIG. 62 is a longitudinal aberration view of Numerical Example 6 in the Y direction under a condition in which fx is −104.37 mm, fy is −137.96 mm and the object distance is 2.5 m.
Figure 63:
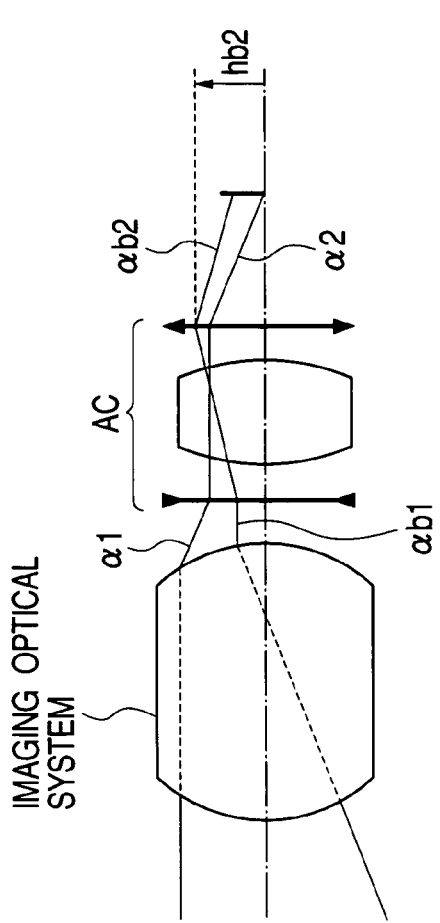
FIG. 63 is a conceptual view of an anamorphic converter of a type having no primary image formation.

FIG. 56 is a cross sectional view of lenses in a Y direction and in an X direction when an anamorphic converter is inserted in Numerical Example 6 of the present invention. In addition, a cross sectional view before insertion of the anamorphic converter in Numerical Example 6 is shown in FIG. 52.

In FIG. 56, reference symbol F designates a group of front lenses having a positive refracting power as a first group. Reference symbol V designates a variator for the variable power having a negative refracting power as a second group. The variator V is monotonously moved on an optical axis to an image surface side to thereby carry out the variable power from the wide angle end to the telescopic end. Reference symbol C designates a compensator having a negative refracting power as a third group. The compensator C is nonlinearly moved on the optical axis to an object side while describing a projection locus in order to compensate for the fluctuation of an image surface following the variable power. The variator V and the compensator C constitute the variable power system.

Reference symbol SP designates a stop, and reference symbol R designates a group of variable power semi-fixed relay lenses having a positive refracting power as a fourth group. Reference symbol P designates a color separation prism, an optical filter or the like which is shown in the form of a glass block in the figure.

The focusing group F, the variator V, the compensator C and the relay group R constitute an imaging optical system.

Next, a description will hereinafter be given with respect to the feature of the anamorphic converter AC in Numerical Example 6. The anamorphic converter AC includes: a first group G1 of lenses having a negative refracting power; a second group G2 of lenses having two cylindrical lenses; and a third group G3 of lenses having an image formation function and a positive refracting power. Each of the cylindrical lenses belonging to the second group G2 has a curvature only in the Y direction, and has an effect of lengthening a focal length in the Y direction. The aspect ratio AR1 of the image pickup range in the image surface of the imaging optical system, and the aspect ratio AR2 of the effective area of the image pickup means are as follows:

$$AR1=2.35 \quad (34)$$

$$AR2=1.78 \quad (35)$$

Also, the conversion magnification $\beta x$ in the X direction, and the conversion magnification $\beta y$ in the Y direction are as follows:

$$\beta x=-0.691 \quad (36)$$

$$\beta y=-0.913 \quad (37)$$

Consequently, the values of the conditional equations are obtained as follows:

$$(AR1\times\beta x)/(AR2\times\beta y)=1.00 \quad (38)$$

$$(AR2^2+1)\times\eta y^2/(AR1^2+1)=0.533 \quad (39)$$

Thus, these values meet the conditions of Equations 1 and 11. Consequently, the anamorphic converter of a built-in converter system is attained which is excellent in the optical performance and free from the eclipse.

In addition, in case of the single anamorphic converter AC, a focal length fACx in the X direction, and a focal length fACy in the,Y direction are expressed as follows:

$$fACx=-88.42 \quad (40)$$

$$fACy=-123.52 \quad (41)$$

Thus, they have large absolute values and small refracting powers, nearly achieving telecentric on the both sides.

FIGS. 56 to 62 are longitudinal aberration views in the X direction or in the Y direction in Numerical Example 6. In these figures, fx indicates a focal length in the X direction, fy indicates a focal length in the Y direction, Fx indicates an F number in the X direction, Fy indicates an F number in the Y direction, and $2\omega$ indicates a field angle.

In Numerical Example 6, the following values are obtained:

fx=−7.11 to −104.37 fy=−9.40 to −137.96

Fx=−1.42 to −1.60

Fy=−1.87 to −2.12

$2\omega$=56.2 to 4.2 degrees

| | | | | | | | |
|---|---|---|---|---|---|---|---|
| r1 = | 1169.481 | d1 = | 2.40 | n1 = | 1.81265 | v1 = | 25.4 |
| r2 = | 98.429 | d2 = | 10.83 | n2 = | 1.51825 | v2 = | 64.2 |
| r3 = | −265.170 | d3 = | 0.20 | | | | |
| r4 = | 124.037 | d4 = | 8.29 | n3 = | 1.60548 | v3 = | 60.7 |
| r5 = | −281.395 | d5 = | 0.20 | | | | |
| r6 = | 51.797 | d6 = | 6.46 | n4 = | 1.64254 | v4 = | 60.1 |
| r7 = | 97.915 | d7 = | Variable | | | | |
| r8 = | 71.045 | d8 = | 0.90 | n5 = | 1.82017 | v5 = | 46.6 |
| r9 = | 17.601 | d9 = | 6.01 | | | | |
| r10 = | −21.542 | d10 = | 0.90 | n6 = | 1.77621 | v6 = | 49.6 |
| r11 = | 18.397 | d11 = | 4.63 | n7 = | 1.85501 | v7 = | 23.9 |
| r12 = | −4295.134 | d12 = | Variable | | | | |
| r13 = | −27.245 | d13 = | 0.90 | n8 = | 1.79013 | v8 = | 44.2 |
| r14 = | 31.613 | d14 = | 3.84 | n9 = | 1.85501 | v9 = | 23.9 |
| r15 = | 1125.345 | d15 = | Variable | | | | |
| r16 = | 0.000 (Stop) | d16 = | 1.60 | | | | |
| r17 = | 10000.000 | d17 = | 4.02 | n10 = | 1.73234 | v10 = | 54.7 |
| r18 = | −32.342 | d18 = | 0.20 | | | | |
| r19 = | 107.938 | d19 = | 3.60 | n11 = | 1.48915 | v11 = | 70.2 |
| r20 = | −121.402 | d20 = | 0.20 | | | | |
| r21 = | 37.891 | d21 = | 7.17 | n12 = | 1.48915 | v12 = | 70.2 |
| r22 = | −38.452 | d22 = | 1.20 | n13 = | 1.83932 | v13 = | 37.2 |
| r23 = | 177.431 | d23 = | 30.00 | | | | |
| r24 = | 48.564 | d24 = | 4.26 | n14 = | 1.48915 | v14 = | 70.2 |
| r25 = | −193.706 | d25 = | 0.20 | | | | |
| r26 = | −210.911 | d26 = | 1.20 | n15 = | 1.83932 | v15 = | 37.2 |
| r27 = | 39.960 | d27 = | 6.49 | n16 = | 1.48915 | v16 = | 70.2 |
| r28 = | −33.683 | d28 = | 0.20 | | | | |
| r29 = | 43.464 | d29 = | 6.21 | n17 = | 1.53430 | v17 = | 48.8 |
| r30 = | −30.063 | d30 = | 1.20 | n18 = | 1.80811 | v18 = | 46.6 |
| r31 = | 113.246 | d31 = | 0.20 | | | | |
| r32 = | 56.783 | d32 = | 2.98 | n19 = | 1.55098 | v19 = | 45.8 |
| r33 = | −10000.000 | d33 = | 46.70 | | | | |
| r34 = | −39.609 | d34 = | 5.65 | n20 = | 1.73234 | v20 = | 54.7 |
| r35 = | −11.167 | d35 = | 7.28 | | | | |
| r36 = | −7.998 | d36 = | 1.70 | n21 = | 1.67765 | v21 = | 32.1 |
| r37 = | 58.541 | d37 = | 9.27 | n22 = | 1.62286 | v22 = | 60.3 |
| r38 = | −14.491 | d38 = | 20.48 | | | | |
| r39 = | −150.787 | d39 = | 4.54 | n23 = | 1.69979 | v23 = | 55.5 |

-continued

| | | | | | | |
|---|---|---|---|---|---|---|
| r40 = | −40.896 | d40 = | 0.15 | | | |
| r41 = | 36.722 | d41 = | 9.29 | n24 = 1.73234 | v24 = 54.7 |
| r42 = | −43.594 | d42 = | 3.69 | | | |
| r43 = | −29.003 | d43 = | 1.58 | n25 = 1.83932 | v25 = 37.2 |
| r44 = | 52.354 | d44 = | 3.68 | | | |
| r45 = | 800.000 | d45 = | 1.70 | n26 = 1.52033 | v26 = 58.9 |
| r46 = | 40.000 | d46 = | 16.60 | | | |
| r47 = | −21.200 | d47 = | 5.25 | n27 = 1.73234 | v27 = 54.7 |
| r48 = | −18.900 | d48 = | 0.20 | | | |
| r49 = | 47.200 | d49 = | 13.97 | n28 = 1.49845 | v28 = 81.5 |
| r50 = | −18.300 | d50 = | 1.70 | n29 = 1.80642 | v29 = 35.0 |
| r51 = | −76.400 | d51 = | 0.20 | | | |
| r52 = | 25.200 | d52 = | 10.38 | n30 = 1.62286 | v30 = 60.3 |
| r53 = | −800.000 | d53 = | 1.00 | | | |
| r54 = | 0.000 | d54 = | 29.00 | n31 = 1.60718 | v31 = 38.0 |
| r55 = | 0.000 | d55 = | 11.20 | n32 = 1.51825 | v32 = 64.2 |
| r56 = | 0.000 | | | | | |

*r41 to r44 indicate the cylindrical lenses. A curvature in the X direction is zero.

| Focal length | | | |
|---|---|---|---|
| fx | −7.11 | −27.25 | −104.37 |
| fy | −9.4 | −36.02 | −137.96 |
| Variable spacing | | | |
| d7 | 0.39 | 33.92 | 49.55 |
| d12 | 52.91 | 14.8 | 3.78 |
| d15 | 1.55 | 6.13 | 1.53 |

As described above, in the anamorphic converter disposed on an image side of the imaging optical system, conversion magnifications of the cross section X and the cross section Y containing an optical axis are regulated and the lens structure is appropriately set, whereby it is possible to attain the anamorphic converter of the rear converter system which is especially most suitable for a converter for the cinema and excellent in optical performance for using the image pickup means having a width across corners smaller than an image size of the imaging optical system.

What is claimed is:

1. An anamorphic converter comprising at least an anamorphic lens disposed on an image side of an imaging optical system,
    wherein when a focal length conversion magnification in an arbitrary cross section X containing an optical axis of the anamorphic converter is assigned $\beta x$, a focal length conversion magnification in a cross section Y containing an optical axis and being perpendicular to the cross section X is assigned $\beta y$, an aspect ratio of an image pickup range in an image plane of the imaging optical system is assigned AR1, and an aspect ratio of an effective area of image pickup means is assigned AR2, the following relationship is established:

$0.9 < (AR1 \times \beta x)/(AR2 \times \beta y) < 1.1.$

2. An anamorphic converter according to claim 1, wherein the anamorphic lens is provided within an afocal group.

3. An anamorphic converter according to claim 1, wherein both $\beta x$ and $\beta y$ are positive values, and the anamorphic converter has positive refracting powers in the cross section X and in the cross section Y.

4. An anamorphic converter according to claim 3, further comprising, from the imaging optical system side in a stated order, a first group of lenses having a negative refracting power, a second group of lenses including at least two or more anamorphic lenses, and a third group of lenses having a positive refracting power.

5. An anamorphic converter according to claim 3, wherein the following relationship is established:

$1 \leq (AR2^2+1) \times \beta y^2/(AR1^2+1) > 2.6.$

6. An anamorphic converter according to claim 1, wherein both $\beta x$ and $\beta y$ are negative values, and the anamorphic converter further comprises at least one negative lens and two or more anamorphic lenses.

7. An anamorphic converter comprising at least an anamorphic lens disposed on an image side of an imaging optical system,
    wherein when a focal length conversion magnification in an arbitrary cross section X containing an optical axis of the anamorphic converter is assigned $\beta x$, and a focal length conversion magnification in a cross section Y containing an optical axis and being perpendicular to the cross section X is assigned $\beta y$, both $\beta x$ and $\beta y$ are negative values.

8. A lens device, comprising:
    the anamorphic converter as claimed in claim 1 and
    the imaging optical system disposed on an object side with respect to the anamorphic converter.

9. An image pickup device, comprising:
    the anamorphic converter as claimed in claim 1
    an imaging optical system disposed on an object side with respect to the anamorphic converter; and
    image pickup means disposed on the object side with respect to the anamorphic converter.

10. An anamorphic converter comprising at least an anamorphic lens disposed on an image side of an imaging optical system,
    wherein when a focal length conversion magnification in an arbitrary cross section X containing an optical axis of the anamorphic converter is assigned $\beta x$, a focal length conversion magnification in a cross section Y containing an optical axis and being perpendicular to the cross section X is assigned $\beta y$, an aspect ratio of an image pickup range in an image plane of the imaging optical system is assigned AR1, and an aspect ratio of an effective area of image pickup means is assigned AR2, the following relationships are established:

$0.9 < (AR1 \times \beta x)/(AR2 \times \beta y) < 1.1$ $(AR2^2+1) \times \beta y^2/(AR1^2+1) < 1.$ 11. An anamorphic converter according to claim 10, wherein the anamorphic lens is provided within an afocal group.

12. An amorphic converter according to claim 10, wherein both fix βx and βy are positive values, and the anamorphic converter has positive refracting powers in the cross section X and in the cross section Y.

13. An anamorphic converter according to claim 12, further comprising, from the imaging optical system side in a stated order, a first group of lenses having a negative refracting power, a second group of lenses including at least two or more anamorphic lenses, and a third group of lenses having a positive refracting power.

14. An anamorphic converter according to claim 10, wherein both βx and βy are negative values, and the anamorphic converter further comprises at least one negative lens and two or more anamorphic lenses.

15. A lens device, comprising:
the anamorphic converter as claimed in claim 10 and
the imaging optical system disposed on an object side with respect to the anamorphic converter.

16. An image pickup device, comprising:
the anamorphic converter as claimed in claim 10
the imaging optical system disposed on an object side with respect to the anamorphic converter; and
image pickup means disposed on the object side with respect to the anamorphic converter.

17. A lens device, comprising:
the anamorphic converter as claimed in claim 2 and
the imaging optical system disposed on an object side with respect to the anamorphic converter.

18. A lens device, comprising:
the anamorphic converter as claimed in claim 3 and
the imaging optical system disposed on an object side with respect to the anamorphic converter.

19. A lens device, comprising:
the anamorphic converter as claimed in claim 4 and
the imaging optical system disposed on an object side with respect to the anamorphic converter.

20. A lens device, comprising:
the anamorphic converter as claimed in claim 5 and
the imaging optical system disposed on an object side with respect to the anamorphic converter.

21. A lens device, comprising:
the anamorphic converter as claimed in claim 6 and
the imaging optical system disposed on an object side with respect to the anamorphic converter.

22. A lens device, comprising:
the anamorphic converter as claimed in claim 7 and
the imaging optical system disposed on an object side with respect to the anamorphic converter.

23. An image pickup device, comprising:
the anamorphic converter as claimed in claim 2
an imaging optical system disposed on an object side with respect to the anamorphic converter; and
image pickup means disposed on the object side with respect to the anamorphic converter.

24. An image pickup device, comprising:
the anamorphic converter as claimed in claim 3
an imaging optical system disposed on an object side with respect to the anamorphic converter; and
image pickup means disposed on the object side with respect to the anamorphic converter.

25. An image pickup device, comprising:
the anamorphic converter as claimed in claim 4
an imaging optical system disposed on an object side with respect to the anamorphic converter; and
image pickup means disposed on the object side with respect to the anamorphic converter.

26. An image pickup device, comprising:
the anamorphic converter as claimed in claim 5
an imaging optical system disposed on an object side with respect to the anamorphic converter; and
image pickup means disposed on the object side with respect to the anamorphic converter.

27. An image pickup device, comprising:
the anamorphic converter as claimed in claim 6
an imaging optical system disposed on an object side with respect to the anamorphic converter; and
image pickup means disposed on the object side with respect to the anamorphic converter.

28. An image pickup device, comprising:
the anamorphic converter as claimed in claim 7
an imaging optical system disposed on an object side with respect to the anamorphic converter; and
image pickup means disposed on the object side with respect to the anamorphic converter.

29. A lens device, comprising:
the anamorphic converter as claimed in claim 11 and
the imaging optical system disposed on an object side with respect to the anamorphic converter.

30. A lens device, comprising:
the anamorphic converter as claimed in claim 12 and
the imaging optical system disposed on an object side with respect to the anamorphic converter.

31. A lens device, comprising:
the anamorphic converter as claimed in claim 13 and
the imaging optical system disposed on an object side with respect to the anamorphic converter.

32. A lens device, comprising:
the anamorphic converter as claimed in claim 14 and
the imaging optical system disposed on an object side with respect to the anamorphic converter.

33. An image pickup device, comprising:
the anamorphic converter as claimed in claim 11
the imaging optical system disposed on an object side with respect to the anamorphic converter; and
image pickup means disposed on the object side with respect to the anamorphic converter.

34. An image pickup device, comprising:
the anamorphic converter as claimed in claim 12
the imaging optical system disposed on an object side with respect to the anamorphic converter; and
image pickup means disposed on the object side with respect to the anamorphic converter.

35. An image pickup device, comprising:
the anamorphic converter as claimed in claim 13
the imaging optical system disposed on an object side with respect to the anamorphic converter; and
image pickup means disposed on the object side with respect to the anamorphic converter.

36. An image pickup device, comprising:
the anamorphic converter as claimed in claim 14
the imaging optical system disposed on an object side with respect to the anamorphic converter; and
image pickup means disposed on the object side with respect to the anamorphic converter.

* * * * *